(12) United States Patent
Sproule

(10) Patent No.: US 7,610,575 B2
(45) Date of Patent: Oct. 27, 2009

(54) SYSTEM AND METHOD FOR THE COMPOSITION, GENERATION, INTEGRATION AND EXECUTION OF BUSINESS PROCESSES OVER A NETWORK

(75) Inventor: Craig Sproule, Brisbane (AU)

(73) Assignee: Consona CRM Inc., Indianapolis, IN (US)

(*) Notice: Subject to any disclaimer, the term of this patent is extended or adjusted under 35 U.S.C. 154(b) by 1071 days.

(21) Appl. No.: 10/453,236

(22) Filed: Jun. 2, 2003

(65) Prior Publication Data
US 2004/0133876 A1 Jul. 8, 2004

Related U.S. Application Data

(60) Provisional application No. 60/438,833, filed on Jan. 8, 2003.

(51) Int. Cl.
  G06F 9/44 (2006.01)
  G06F 9/46 (2006.01)
(52) U.S. Cl. .................. 717/103; 717/105; 717/109; 705/8
(58) Field of Classification Search .......... 717/109; 705/32
See application file for complete search history.

(56) References Cited

U.S. PATENT DOCUMENTS 6,347,306 B1 * 2/2002 Swart .................... 705/32
2002/0180789 A1 * 12/2002 Guttmann et al. .......... 345/760
2004/0019542 A1 * 1/2004 Fuchs et al. ............... 705/32

OTHER PUBLICATIONS

"Fulfilling the Web services promise", H. Kreger, Jun. 2003, pp. 29-34. Online retrieved at <http://delivery.acm.org/10.1145/780000/777334/p29-kreger.pdf>.*

"Web services: beyond component-based computing", M. Stal, Dec. 2002, pp. 71-76. Online retrieved at <http://delivery.acm.org/10.1145/580000/570934/p71-stal.pdf>.*

"A Two-Tier Distributed Electronic Design Framework", Kazmierski et al., Dec. 2002, 5 pages. Online retrieved at <http://delivery.acm.org/10.1145/880000/874408/14710227.pdf>.*

* cited by examiner

*Primary Examiner*—Tuan Q Dam
*Assistant Examiner*—Thuy Dao
(74) *Attorney, Agent, or Firm*—Ice Miller LLP

(57) ABSTRACT

A system and method providing an environment for the composition, generation, integration and execution of business processes and/or transactions over a distributed computing-based network. In a preferred embodiment, a business process expert develops a business model by using a network browser to access the composition environment via the network. The preferred embodiment includes a Composer and a Player. The Composer allows a business process engineer to model the processes, process rules and data structures of an entity upon the basis of a plurality of software resources. The Player executes the modeled processes and access relevant data in real-time, according to rules and resources as related within a software structure generated by the business process engineer. The preferred embodiment dynamically constructs web pages based on the process, rule and data definitions prepared by a business process engineer/expert and does so through a Process Interpreter and Grammar Engine so as to encapsulate all the software resources necessary to complete the desired business process without the need of people programming, scripting or coding. Pages are constructed only when required, ensuring that the solutions are flexible, error free and based upon the most current business practices, providing agile, integrated, error free and real-time software solutions capabilities.

50 Claims, 24 Drawing Sheets

An example of the Composer Page

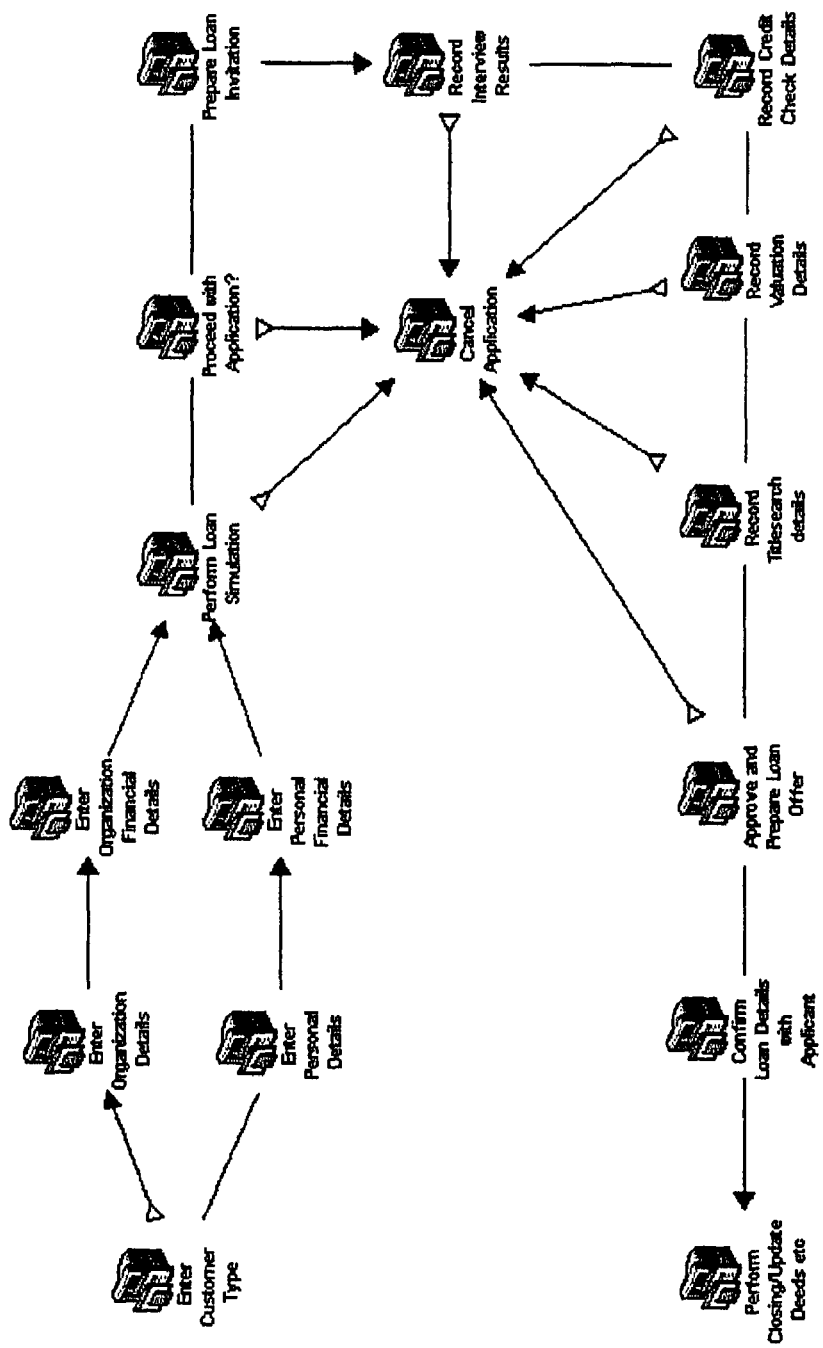
Figure 1: Example of the flow of a business process – Loan Application.

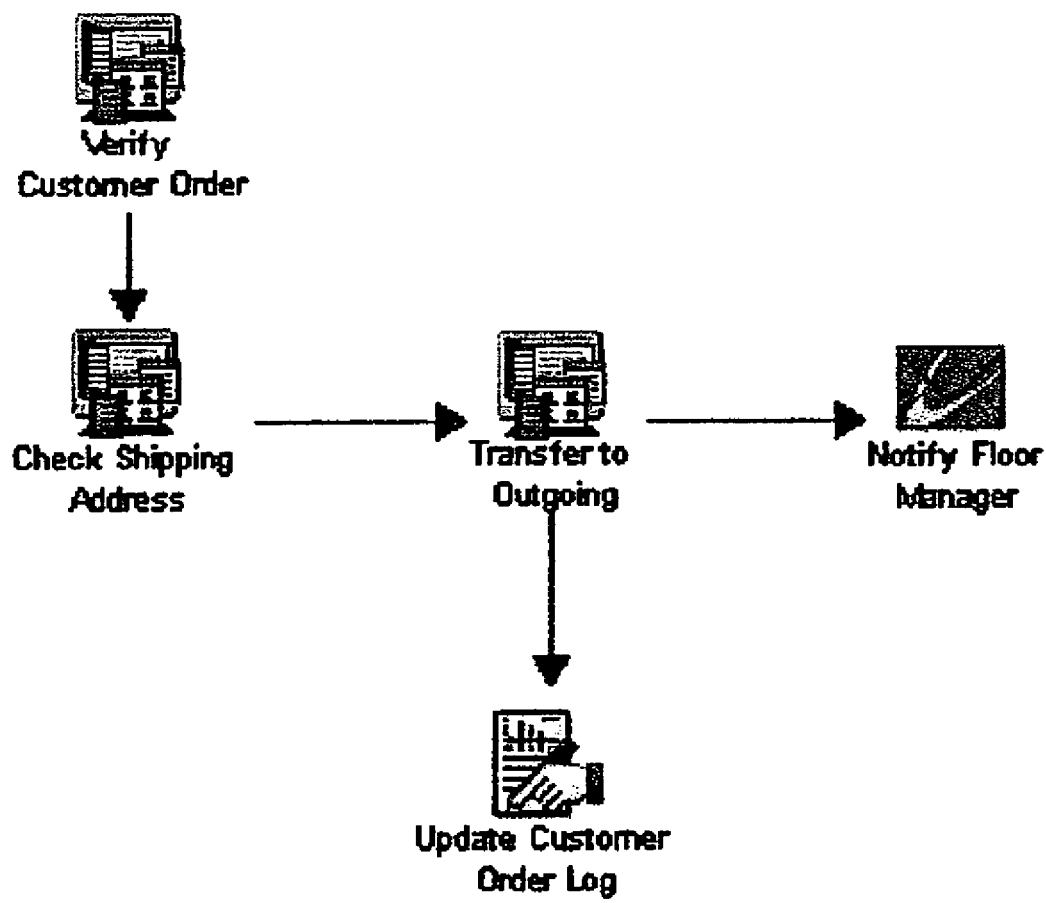
Figure 2: An example of linking activities.

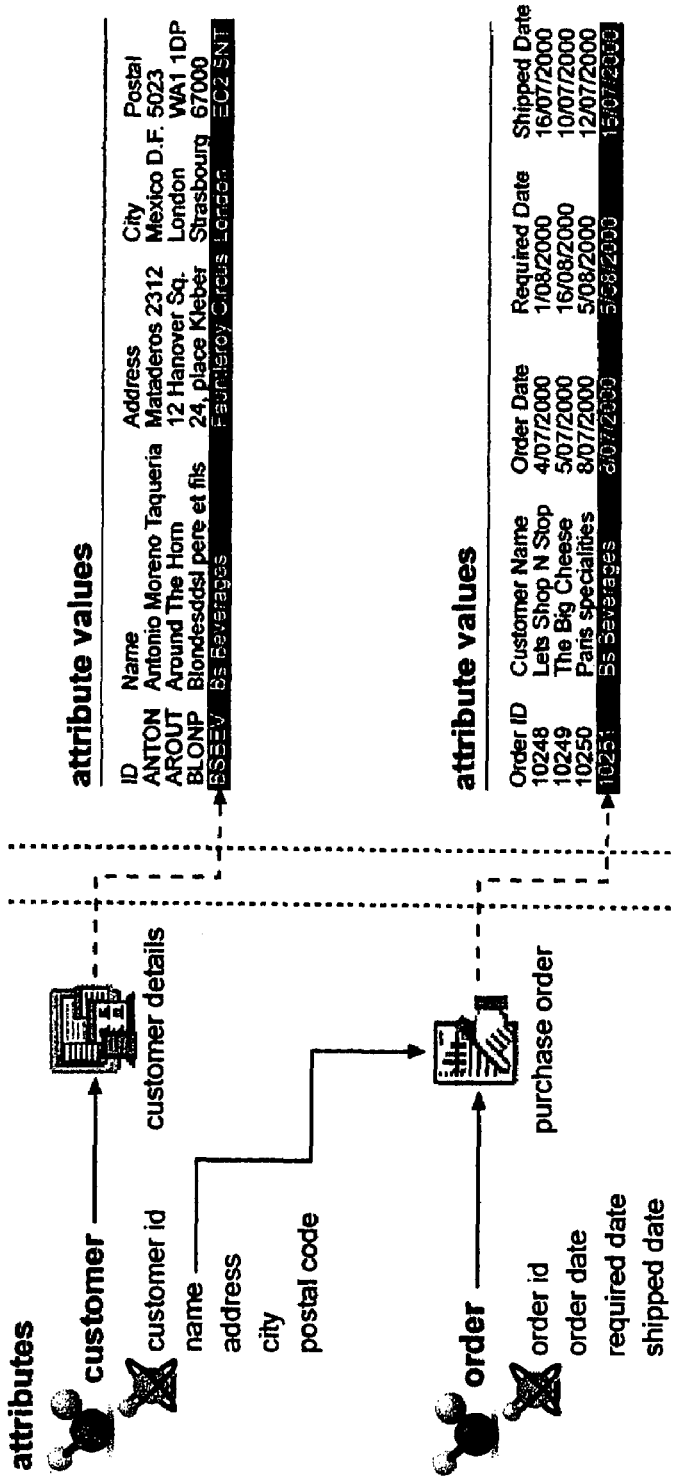
Figure 3: An example of data sets

*Figure 4:* An example of one-to-one (Invoice to Dealer) and one-to-many (Invoice to Invoice Line Item) associations within an activity.

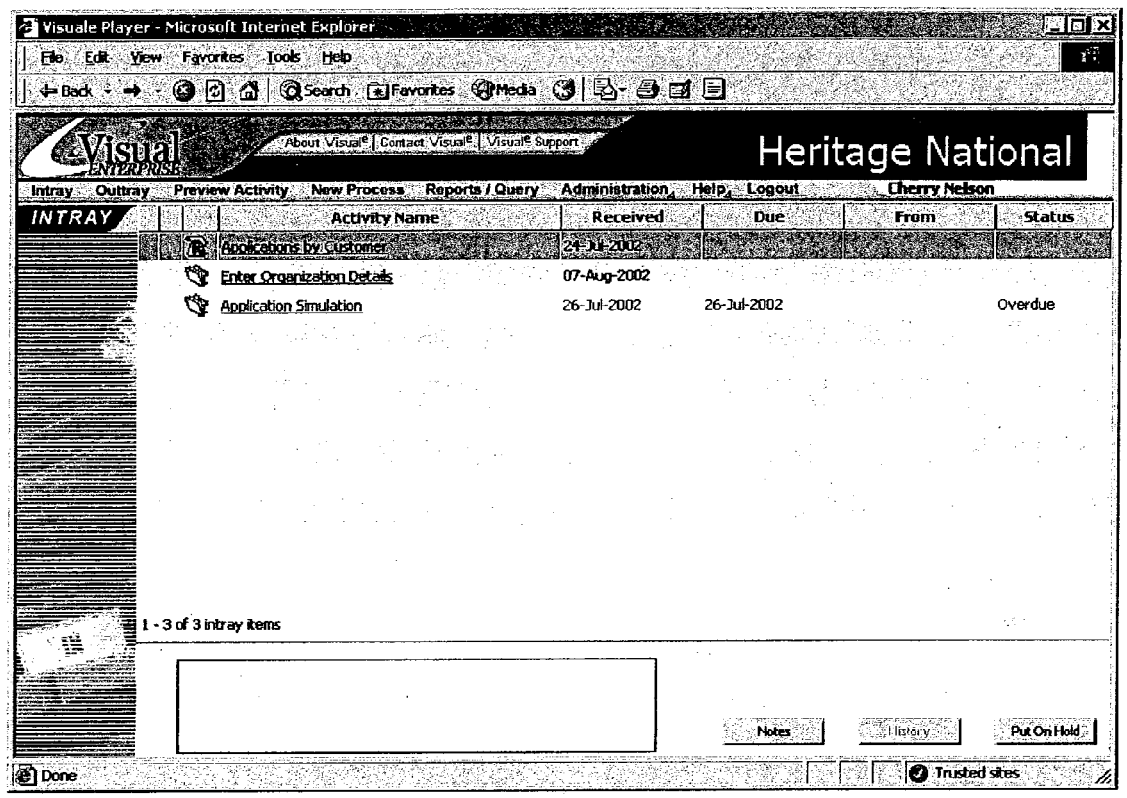
Figure 5: An Example Intray

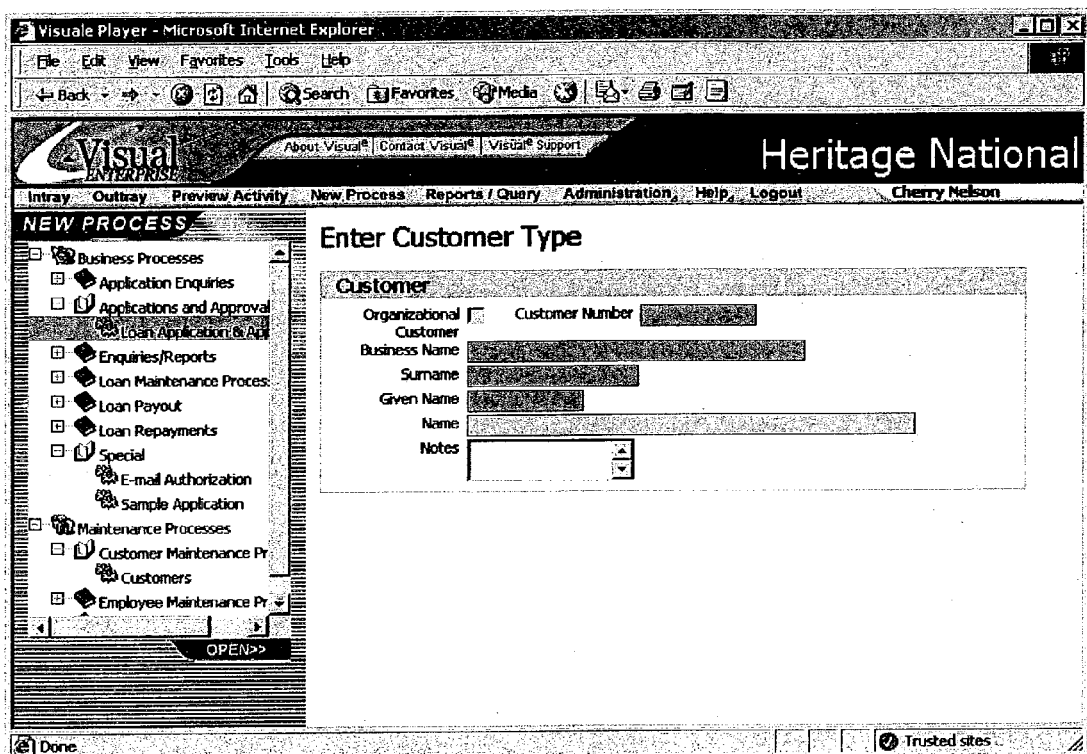
Figure 6: An Example New Process Explorer

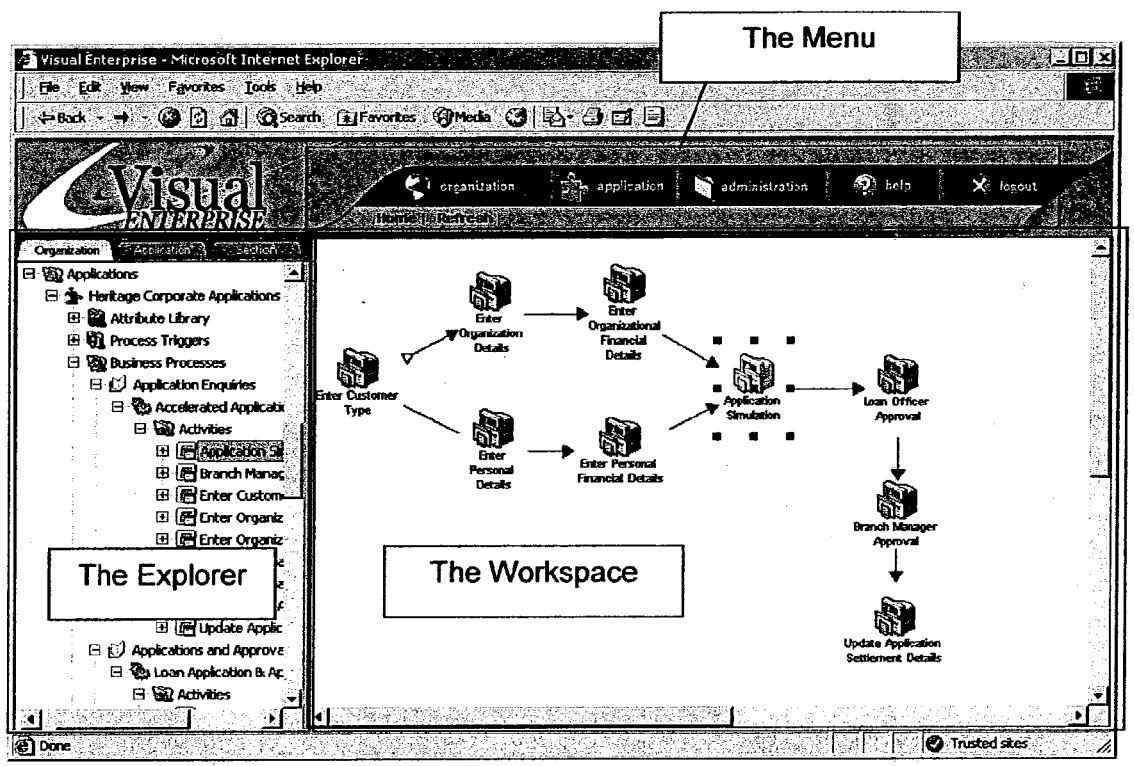
Figure 7: An example of the Composer Page

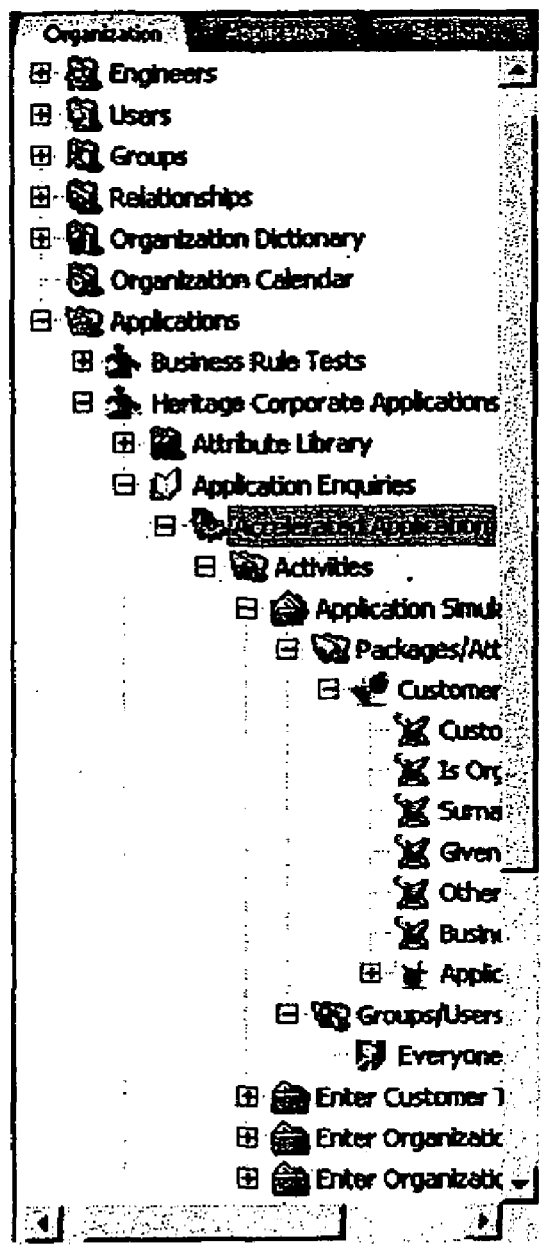
Figure 8: An Example Process Explorer

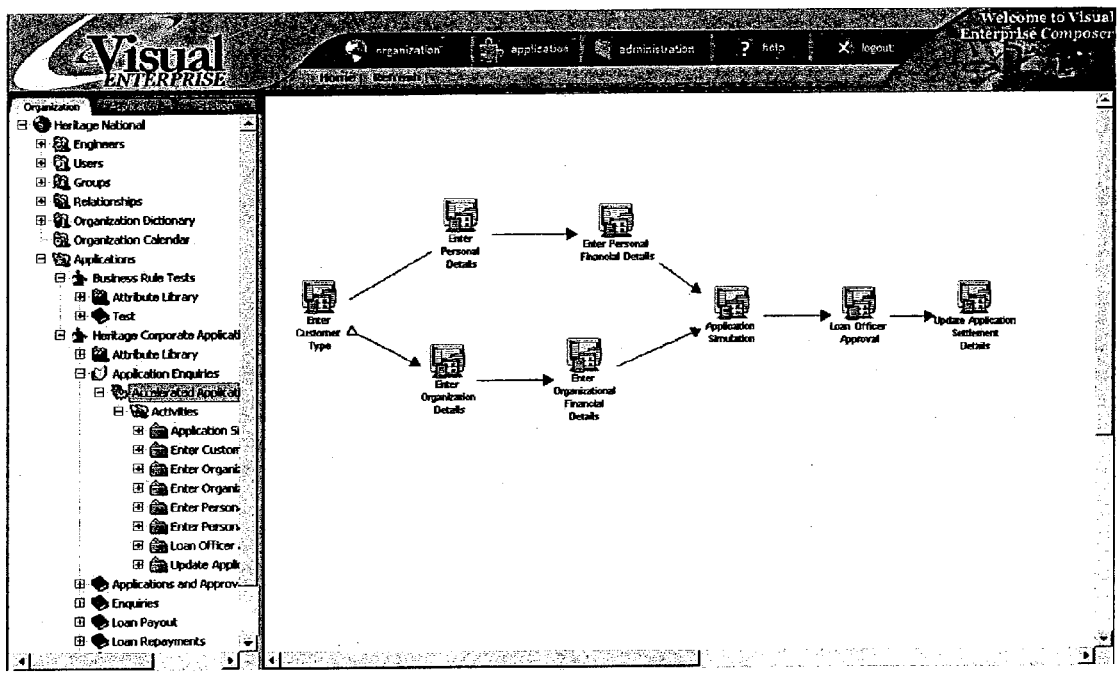
Figure 9: An Example Process Workspace (with Explorer on the left)

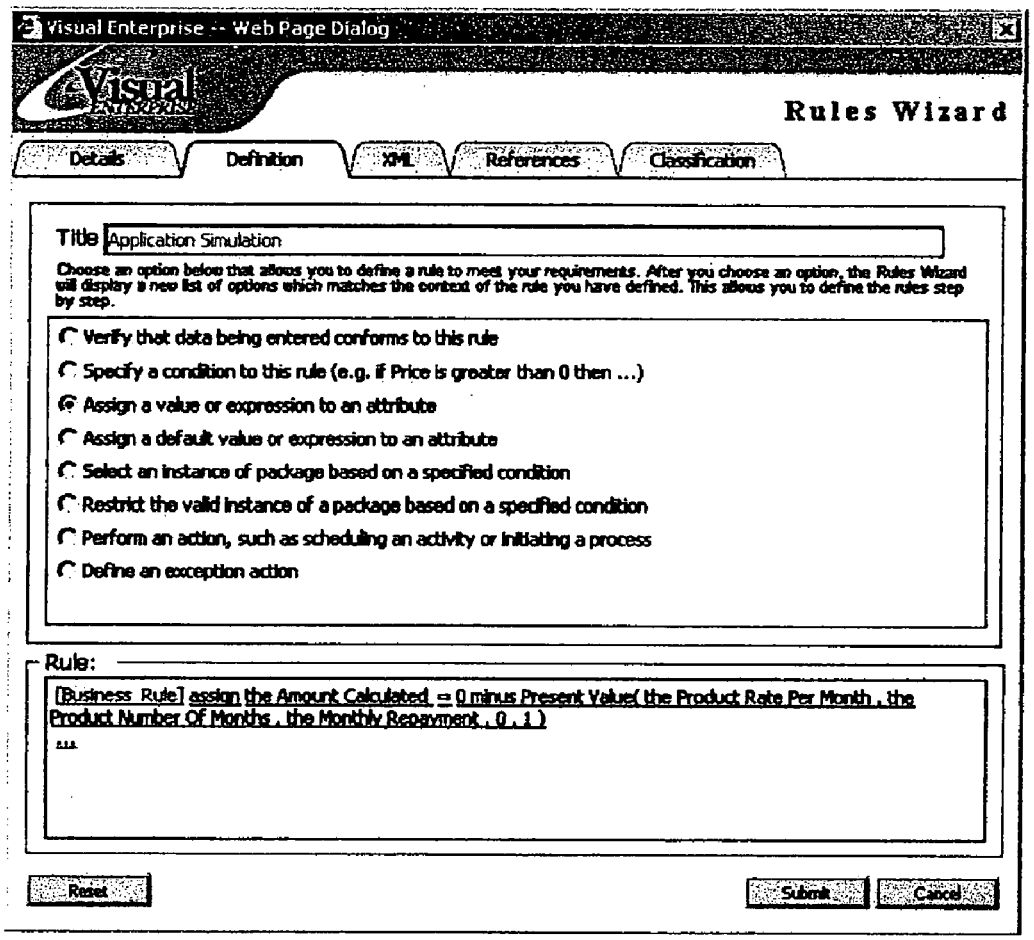
Figure 10: An example Business Rule Composer Definition

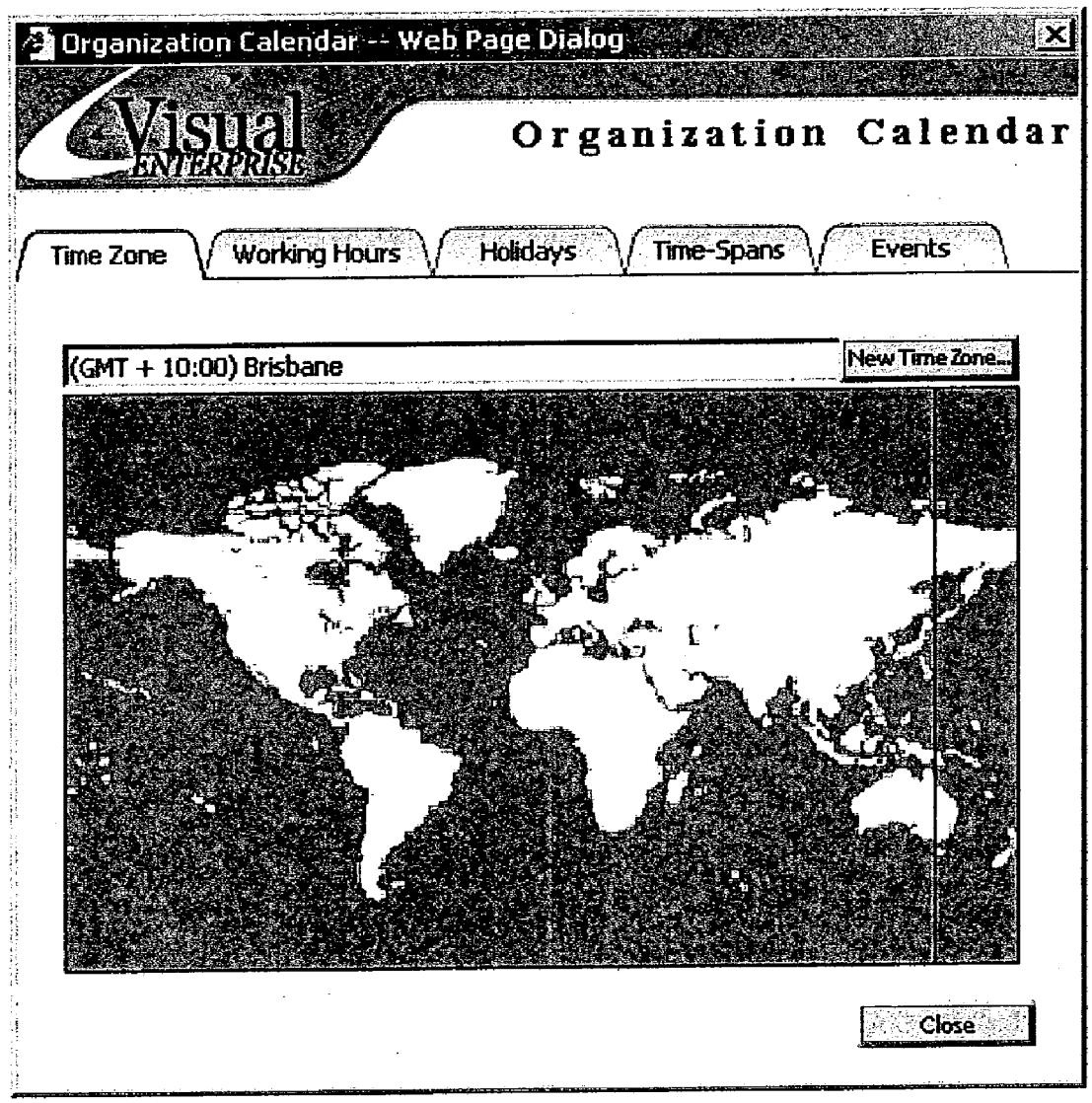
Figure 11: An example of the Calendar

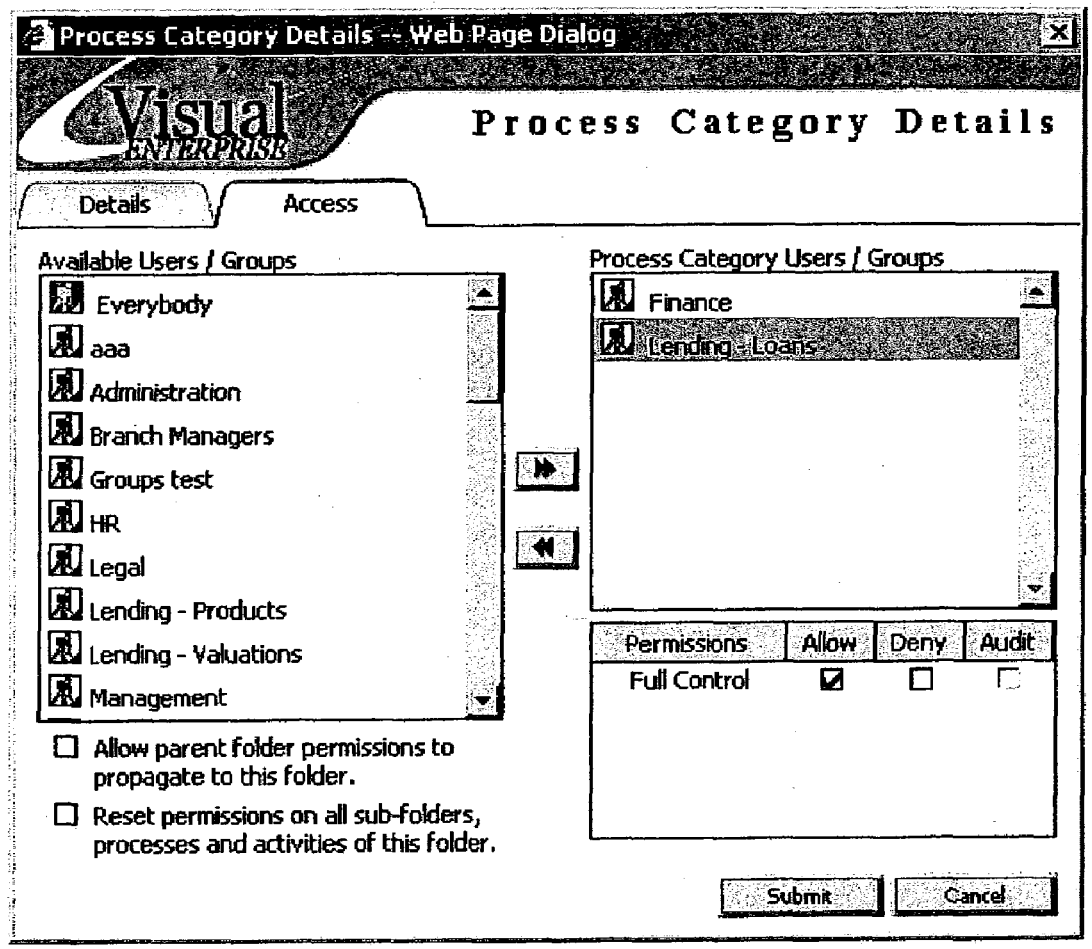
Figure 12: An example of a Process Category Definition

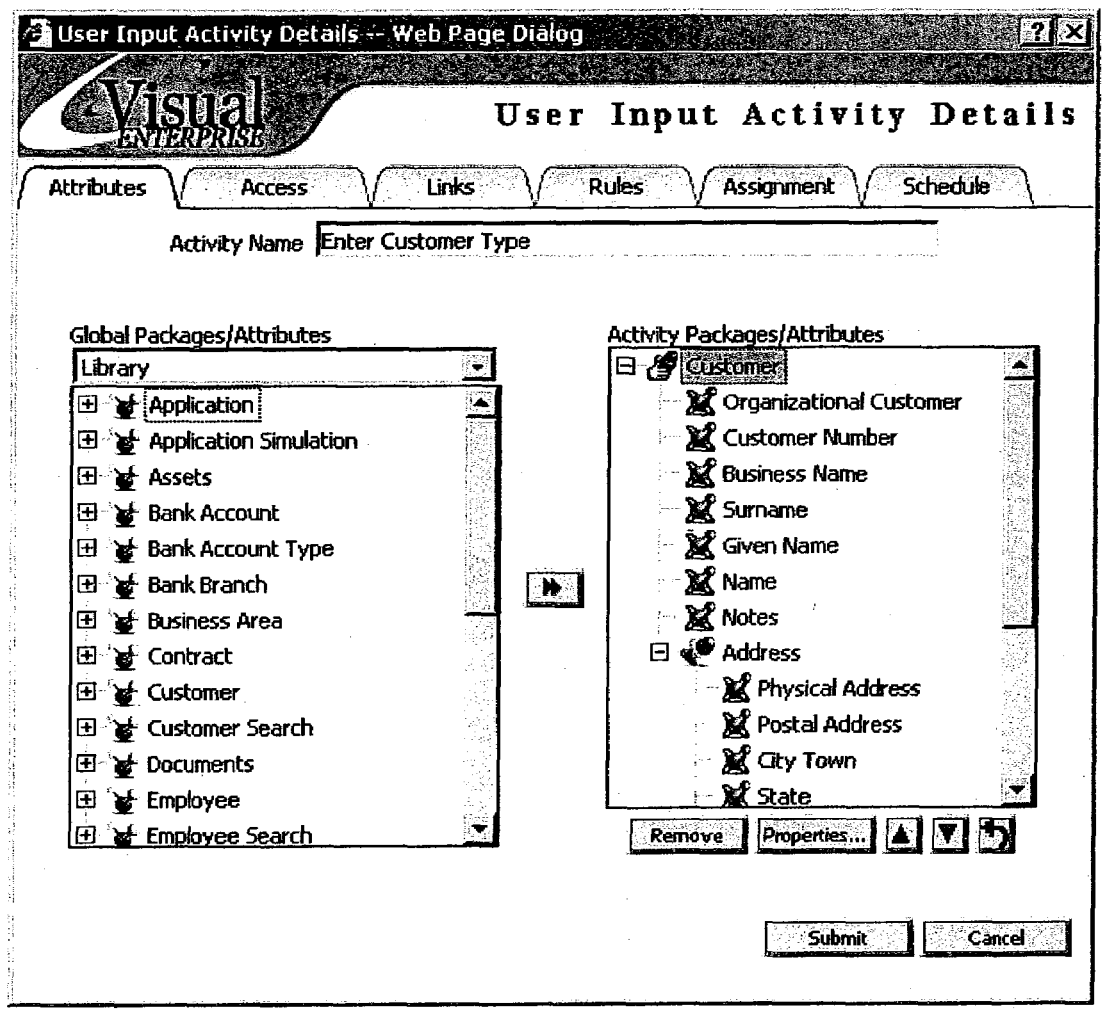
Example Figure 13: An example of defining a User Input Activity

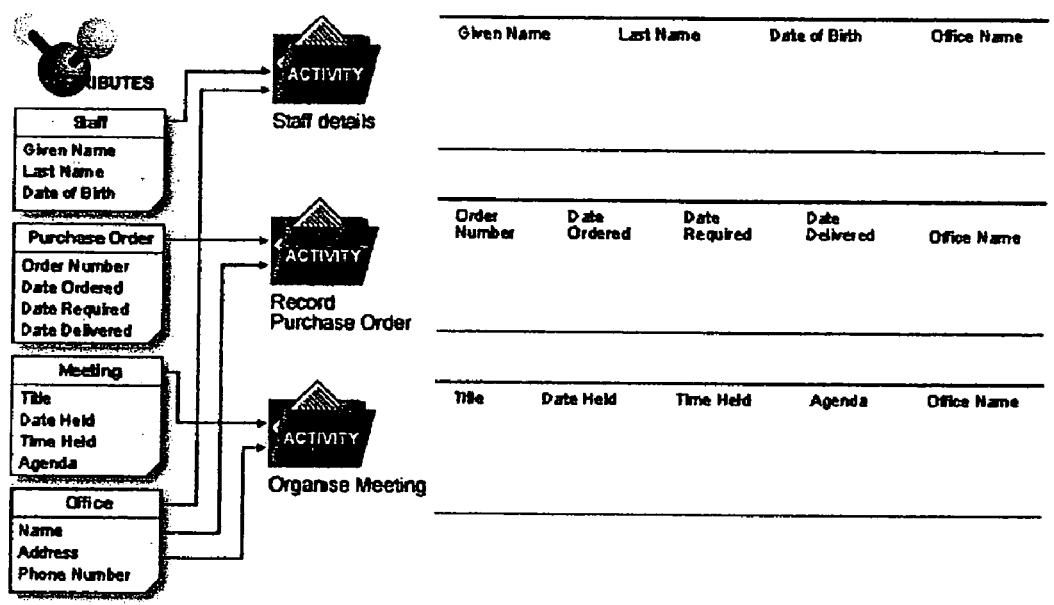
Figure 14: An example of Package Associations

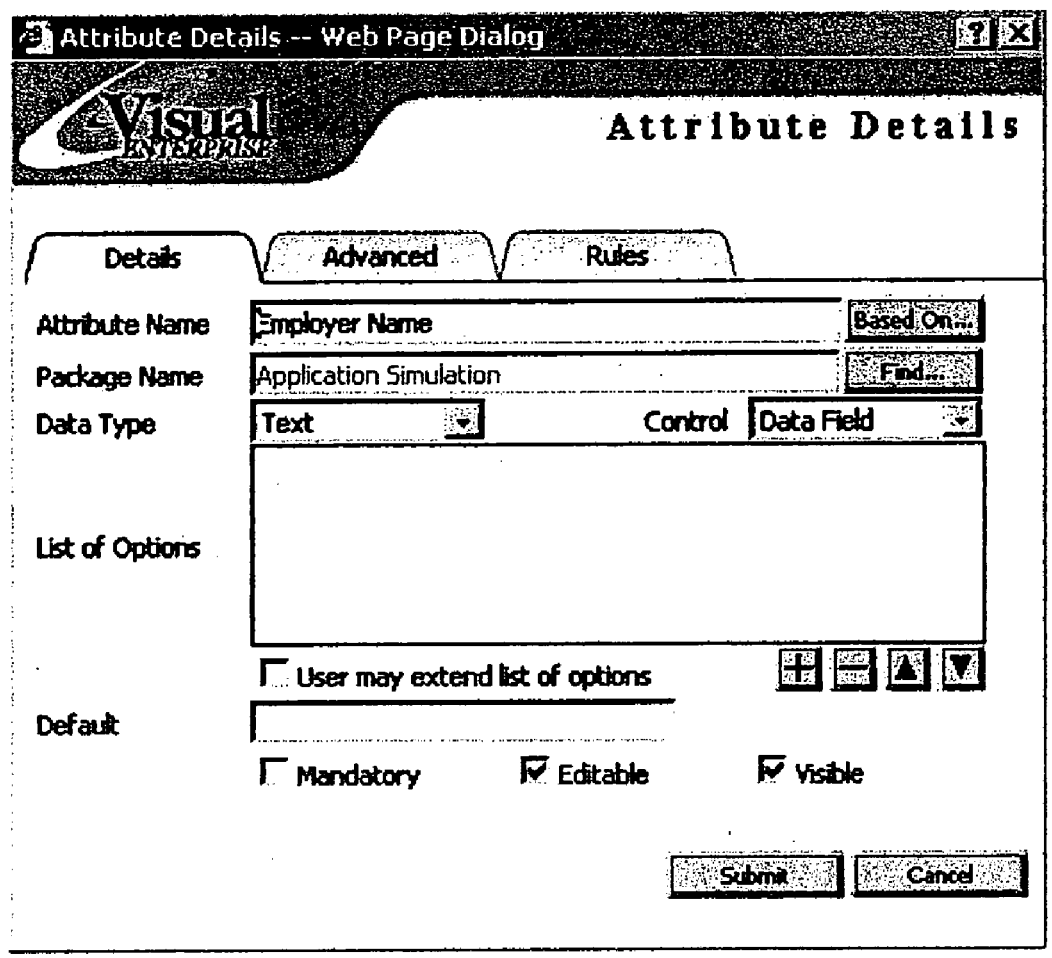
Figure 15: An example of Attribute Definition

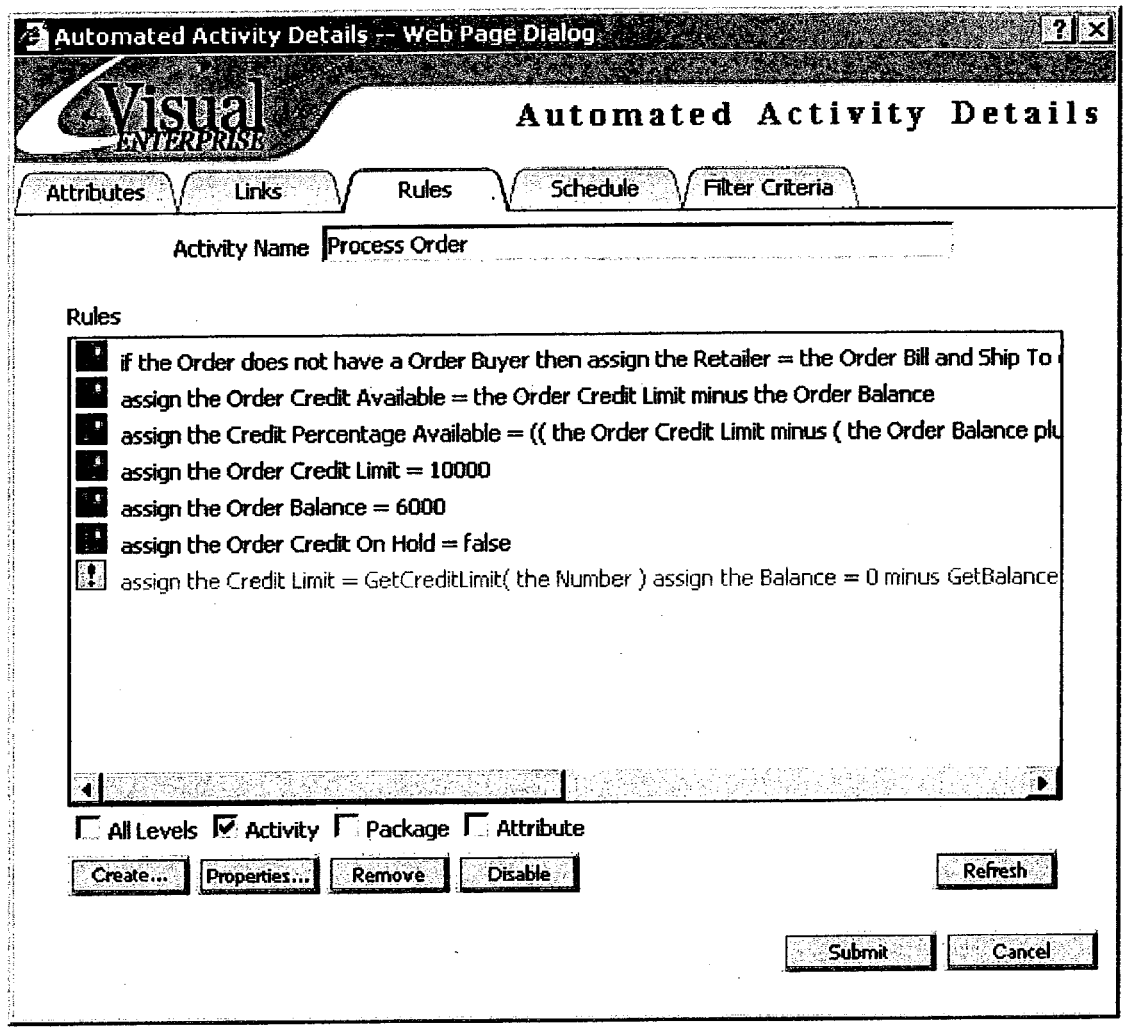
Figure 16: A sample business rules created with the Composer.

Figure 17: An example of an Activity Page

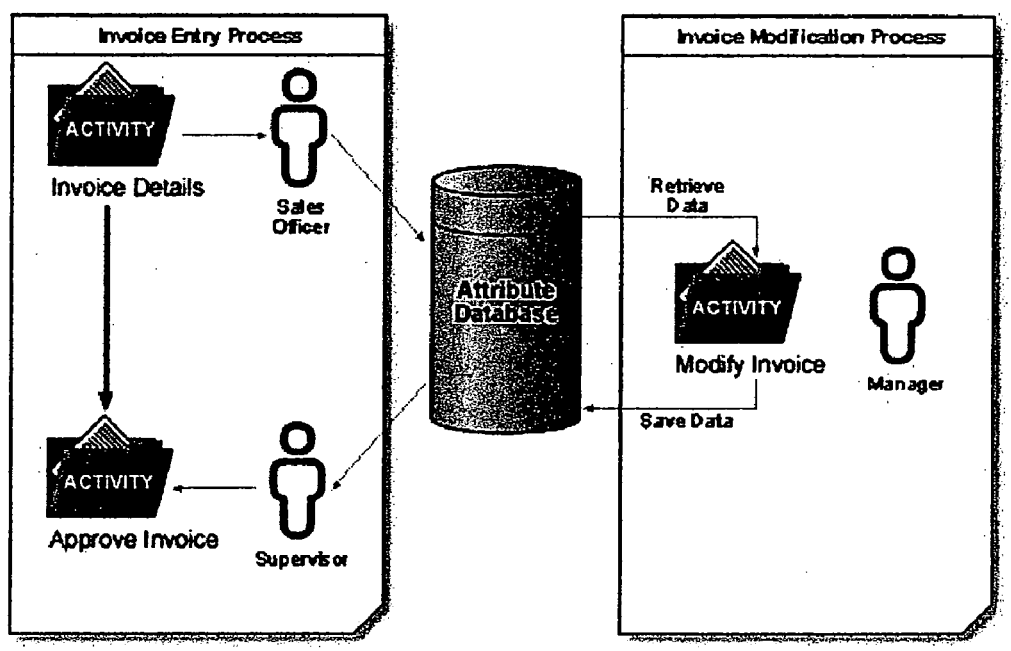
Figure 18: An example of interaction between two processes

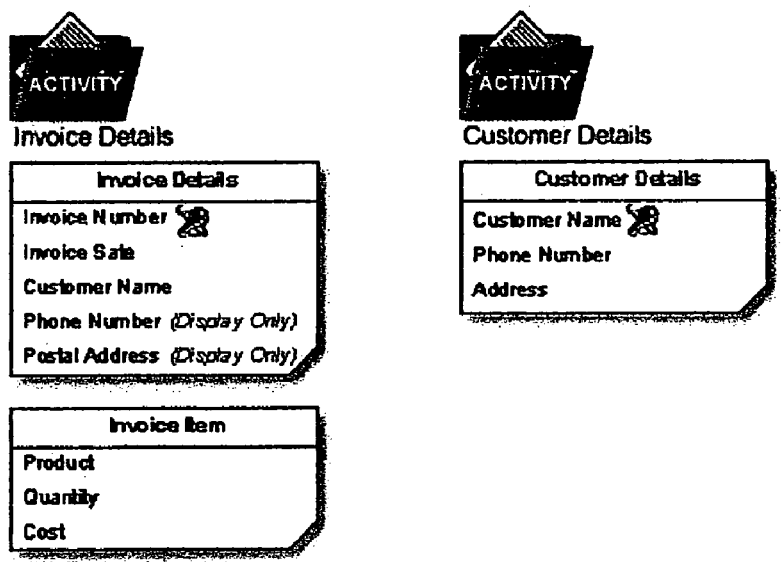
Figure 19: Activity/Package definitions with related attributes.

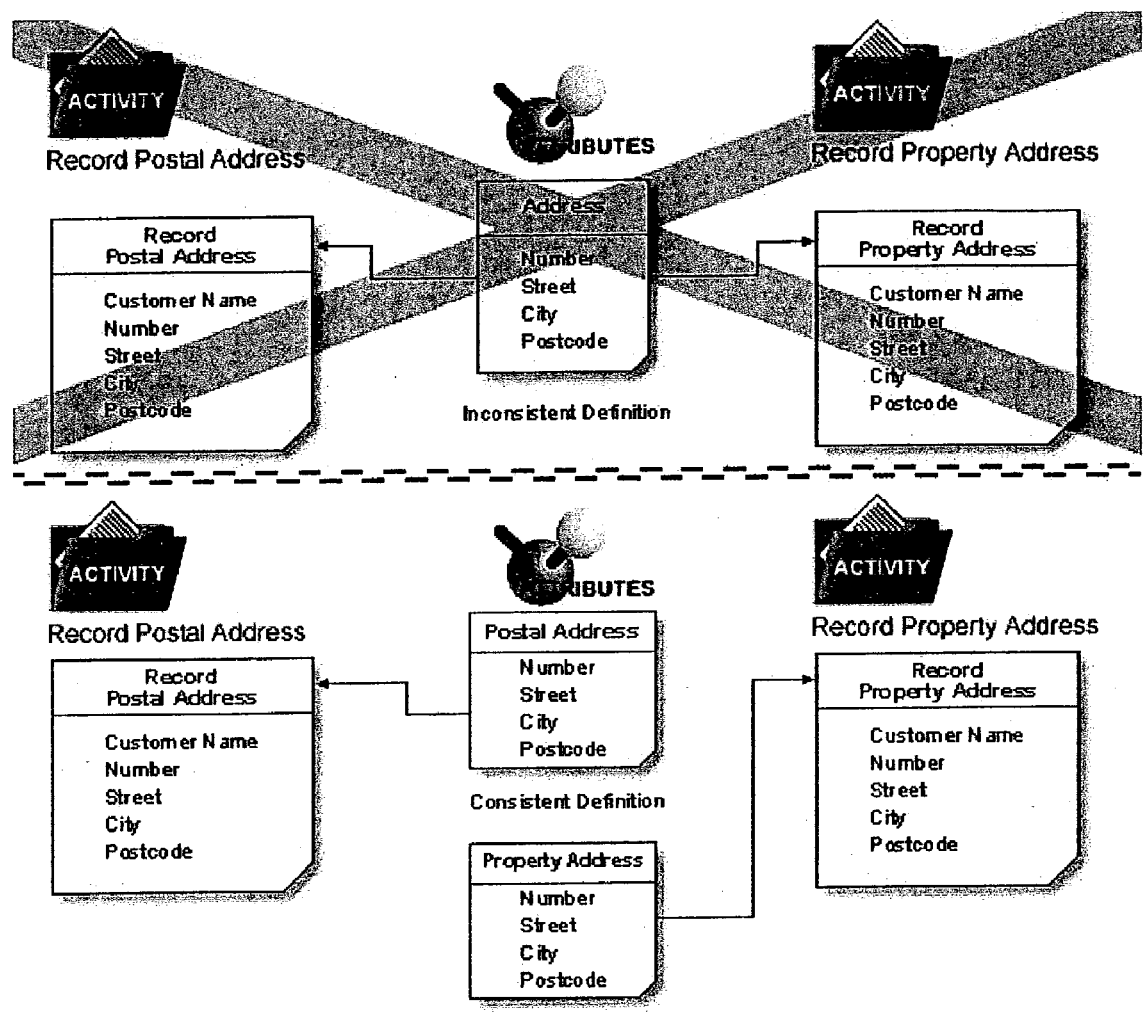
Figure 20: An example of Activity/Package definitions

Figure 21: An example of an Activity Page

```xml
- <XML id="xmlActivityInstance">
  - <ActivityInstance id="2546">
    - <Entity id="4133" OneToMany="0" package="1504">
      - <EntityInstance id="1851">
          <Attribute id="3525" type="String" value="CMQ123" />
          <Attribute id="3526" type="Integer" value="0" />
          <Attribute id="3527" type="String" value="Smith" />
          <Attribute id="3528" type="String" value="Albert" />
          <Attribute id="3529" type="String" value="" />
        - <Entity id="4126" OneToMany="0" package="1491">
          - <EntityInstance id="1853">
              <Attribute id="3427" type="Float" value="5850.00" />
              <Attribute id="3428" type="Float" value="4720.00" />
              <Attribute id="3429" type="Float" value="3180.00" />
              <Attribute id="3444" type="Float" value="150000.00" />
              <Attribute id="3445" type="Float" value="165000.00" />
              <Attribute id="3446" type="Float" value="20000.00" />
              <Attribute id="3447" type="Float" value="170000.00" />
              <Attribute id="3449" type="Float" value="1350.00" />
            - <Entity id="4139" OneToMany="0" link="1523" package="1523">
              - <EntityInstance id="0">
                  <Attribute id="3609" type="Integer" value="" />
                  <Attribute id="3610" type="String" value="" />
                  <Attribute id="3616" type="Float" value="" />
                  <Attribute id="3617" type="Integer" value="" />
                  <Attribute id="3618" type="Float" value="" />
                </EntityInstance>
              </Entity>
            </EntityInstance>
          </Entity>
        - <Entity id="4127" OneToMany="0" package="1492">
          - <EntityInstance id="0">
              <Attribute id="3467" type="Float" value="0.00" />
              <Attribute id="3468" type="Date" value="" />
              <Attribute id="3479" type="Integer" value="" />
              <Attribute id="3478" type="Integer" value="" />
              <Attribute id="4097" type="String" value="0" />
            </EntityInstance>
          </Entity>
        </EntityInstance>
      </Entity>
    </ActivityInstance>
  </XML>
```

Figure 22: A Sample of a XML Activity Data Fragment

SYSTEM AND METHOD FOR THE COMPOSITION, GENERATION, INTEGRATION AND EXECUTION OF BUSINESS PROCESSES OVER A NETWORK

CO-PENDING APPLICATION

This application claims benefit the filing date of Provisional Patent Application Ser. No. 60/438,833 filed on Jan. 8, 2003, by Inventor Craig Sproule.

FIELD OF THE INVENTION

The present invention relates generally to collaborative business processes and transactions. More specifically, the present invention relates to systems and methods for the dynamic creation, generation, integration and execution of business processes and transactions over a network.

BACKGROUND

Enterprise software technology has matured to the point where today many hundreds of thousands of business processes are wholly or partially implemented in software and conducted via communications transacted across distributed networks. These communications networks may comprise elements of more than one electronic messaging system, to include the Internet, Extranets, Intranets, Local Area Networks, Wide Area Networks and other suitable electronic messaging networks or systems known in the art. The capability to rapidly generate new business process software that can smoothly integrate with pre-existing distributed computing environments, software programs, software components, and communications systems can greatly enhance the financial advantage, economic value and effectiveness of the resultant software and the authoring agent.

Traditional application software development has involved business analysts undertaking business process reviews, collecting requirements, and collating business rules in order to produce a general design for a business system. This general design would be expanded to include software developers who would then create a detailed software specification. This detailed software specification would then be handed over to software engineers to prepare functional and technical design documents. A team of programmers and administrators in turn would use these documents to develop an application that provide a certain solution. Once complete, the rigorous testing process would commence. This normally includes code testing, component testing, system testing, field and user testing.

Using the traditional approach, the possibility of errors introduced into the final application due to omissions, inconsistencies, ambiguities or misunderstandings was extremely high. In addition, maintenance and modification of the application may involve, for example, understanding and modifying code associated with the application. This can be difficult due to personnel change, cost, risk, and length of time since the application was developed, etc. All of these factors may contribute to unnecessary delay in responding to business needs.

The advent of web-based business-to-business and business-to-customer systems demands an integrated business application development and delivery environment. Such an environment will allow business to rapidly and directly implement a custom response to a business opportunity, to fine-tune the custom response as the business learns, and to adapt that response as business requirements evolve. It is, therefore, an object of the method of the present invention to enable the authoring and composition of business process models, and the resultant real-time generation, integration and execution of business applications from business process models with little or no coding, programming or scripting.

SUMMARY OF THE INVENTION

Towards this and other objects that will be made obvious in light of the present disclosure, a preferred embodiment of the present invention provides an environment, optionally a runtime environment or with runtime environment aspects, for the composition, generation, integration and execution of collaborative business processes and transactions over a distributed computing-based network.

The method of the present invention optionally enables, in certain preferred embodiments, a creation of a business process flow by a business process engineer or designer that is implemented in a software program and over a distributed computer network, and wherein the engineer or designer builds an abstraction of the business process in software and the software program is generated without software coding or software programming by the designer or engineer.

In a first preferred embodiment of the method of the present invention, the business process designer creates an abstraction of a business process to define the operation and functionality of a software application by using a computer network browser, such as INTERNET EXPLORER™ web browser. The designer's browser may be located on a personal computer, a wireless computational device, or other suitable computational systems or devices known in the art, and having access to a composer software over the Internet. The designer optionally does not need or have a client software on the personal computer, but directs the composer software solely with the browser and via a communications link with the Internet. The designer users the composer to create a graphical representation model of the logical flow and processing of a target business process. The designer additionally builds or selects and designates data structures, data types, and an organizational structure or structures that inform, enable and/or direct the dynamic activity of a software application. The designer additionally uses the browser to inform, designate and/or select external software resources, such as web services made available over the Internet, for access by the software application. The designer may optionally and additionally format reports and messages to be provided by the software application. A user may then use a suitable user's computational device known in the art to direct a software player to generate the application software by employing the instructions, information, software data structures, software logic models, organizational structure, and access to external software resources provided by the designer. The user's computational device may communicate with the player by means of an interface software, such as a browser, and via a communications link, such as an Ethernet link, an Internet dial-up link, a wireless link, or another suitable communications link known in the art. The player may reside entirely outside of the user's computational device. Account access and password protection may be employed to confirm the identity of the user and that the user has properly approved access to use the target application software. The user may be permitted access at one of a plurality of access levels to more than one application software selected from a library of application software programs. The player may then direct the player to generate, or instantiate the target software application and further direct the player to run the generated application software. The target application software may then be created by the player and the target application software will execute. The player may perform external calls, lay out reports and messages, and use the grammar engine to generate scripts needed to generate the target application software. The first preferred embodiment of the method of the present invention may thereby enable a designer and a user without software coding or programming to define, create, access and use the target software application by means of a browser located on a networked computer, and a remotely located composer, software, and other suitable software resources and web services known in the art that are available via a computer network.

A first alternate preferred embodiment of the present invention is called Visual Enterprise™ BPI Software Platform ("VE") and includes the VE Composer™ and the VE Player™. The VE Composer allows a business process engineer/expert/person (terms used interchangeably throughout the document) to model, over a network, the processes, rules and data structures of an entity upon the basis of a plurality of software resources. A software resource may be, in singularity or combination, software resource is selected from the group including a database, a grammar rule, a software object, a data structure, a datum, a universal resource locator, a network address, a data type definition, a data pointer or other suitable software elements known in the art.

The VE Player, by a user at run time, then executes in real time the modeled processes, constructs the page layout and accesses relevant data, according to rules and resources as related within the business model generated by the business process expert. The preferred embodiment dynamically (meaning in real-time) constructs Web pages based on the process, rule and data definitions prepared by the process expert. Pages are constructed only when required, ensuring that the solutions are flexible, dynamic and based upon the most current model revision. The means of doing so is the VE Enterprise Interpreter™, which is inside the VE Player. The VE encapsulates a grammar engine that allows the executable code to be dynamically created without syntax or scripting errors. The preferred embodiment relies upon four main principles of applications development: process, data, rules and calendar. The model generated by the VE Composer accords with the business processes employed by a relevant organization, and may optionally model workflow, work allocation and assignment, process escalation and administration. Modeling data may comprise defining each data attribute, including properties such as its type, e.g., numeric, text, or date, as well as defining associations between attributes. Business policies are reflected in the rules that govern the capture and maintenance of data within the context of each step of a process. The preferred embodiment conforms to at least one time zone, the business/working hours of one or more location, the public holidays observed in designated locales and any other temporal events relevant to the organization's operations.

In one optional aspect of the invention, a method of developing applications is disclosed. Using a communications network browser software, such as INTERNET EXPLORER™ computer network browsing software, or another suitable browser known in the art and suitable for a selected communications network, a business process expert develops an application solutions for an organization by composing a business process model over a computer coupled to a network. The application development environment includes a graphical user interface, such as a browser graphical user interface, that provides, or provides access to, tools, software modules, software components, data sources, web services and other suitable software resources known in the art, for the business process expert to define and interweave data structures, rules, attributes, activities, organization, policies, workflow for processes and applications for an entity and using optionally including preexisting software components related to the entity. Models are related to the organization in a hierarchical structure. Models may include business rules information, calendar information, data information and user information associated with the entity or other entities. An entity may be a person, a corporation, a department, a public or private agent or agency, an association, a society, a software program, or other suitable identity or collective known in the art. Using drag and drop, point and click or voice response actions, a business process expert designs all the elements of the applications in a fashion that models the way the business establishes, or wishes to explore managing and controlling a particular set of business processes, activities or transactions.

In certain alternate preferred embodiments of the method of the present invention, a user, engineer, or business process engineer may integrate a first business process software program with a second business process software program, wherein the first business process software program and the second business process software program communicating via a computer network. Preferred embodiments of the present invention of this type may comprise (1.) interrogating the second business process software program via the computer network to determine how a message containing data may be structured in order to enable the second business process software program to accept the data, (2.) )detecting a set of data that the first business process software program may provide to the second business process software program,(3.) structuring a message for transmission to and acceptance by the second business process software program, the message containing the set of data, and (4.) transmitting the message to the second business process software program via the computer network.

Other features of the present invention will be apparent from the accompanying drawings (found in the attached VE Blueprint) and from the detailed description, which follows.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 1 is an example, from the VE Composers™, of the flow of a business process as seen in the VE Composer. A business process can be of any type, of any length and of any complexity.

FIG. 2 is an example of linking activities. Linked activities can be of any complexity, including, but not limited to, internal, external, automated, launched, messaged, reported and web services types of activities.

FIG. 3 is an example of a data set. Data sets can be text, numeric, date, time span, document, or Boolean and can be accessed both internally and externally to the preferred embodiment.

FIG. 4 is an example, from the VE Player™, of one-to-one (Invoice to Dealer) and one-to-many (Invoice to Line Item) associations within an activity.

FIG. 5 is an example of the VE Player's 'In Tray.' The Player also includes an Out Tray, New Processes, Reporting and Administration.

FIG. 6 is an example New Process Explorer.

FIG. 7 is an example of the VE Composer page. The VE Composer comprises of a main menu, an explorer or navigation section and a workspace where the process models are created and maintained.

FIG. 8 is an example of the process explorer in the VE Composer.

FIG. 9 is an example of the VE Composer's process workspace.

FIG. 10 is an example of Business Rule Composer Definition inside the rules wizard, which is inside the VE Composer.

FIG. 11 is an example of the Organizational Calendar, inside the VE Composer. The calendar consists of Working Hours, Holidays, Date Events and Time Events, all in multiple time zones.

FIG. 12 is an example of a Process Category Definition.

FIG. 13 is an example of defining a User Input Activity.

FIG. 14 is an example of Package Associations.

FIG. 15 is an example of Attribute Definitions.

FIG. 16 is a sample business rules created with the VE Composer.

FIG. 17 is an example of an Activity Page as the Activity Page would appear in the VE Player.

FIG. 18 is an example of interaction between 2 processes.

FIG. 19 is an example of Activity/Package definitions with related attributes.

FIG. 20 is an example of Activity/Package definitions.

FIG. 21 is an example of an activity executing in the VE Player.

FIG. 22 is a sample of a XML Activity Data Fragment.

DETAILED DESCRIPTION

Figure 23:
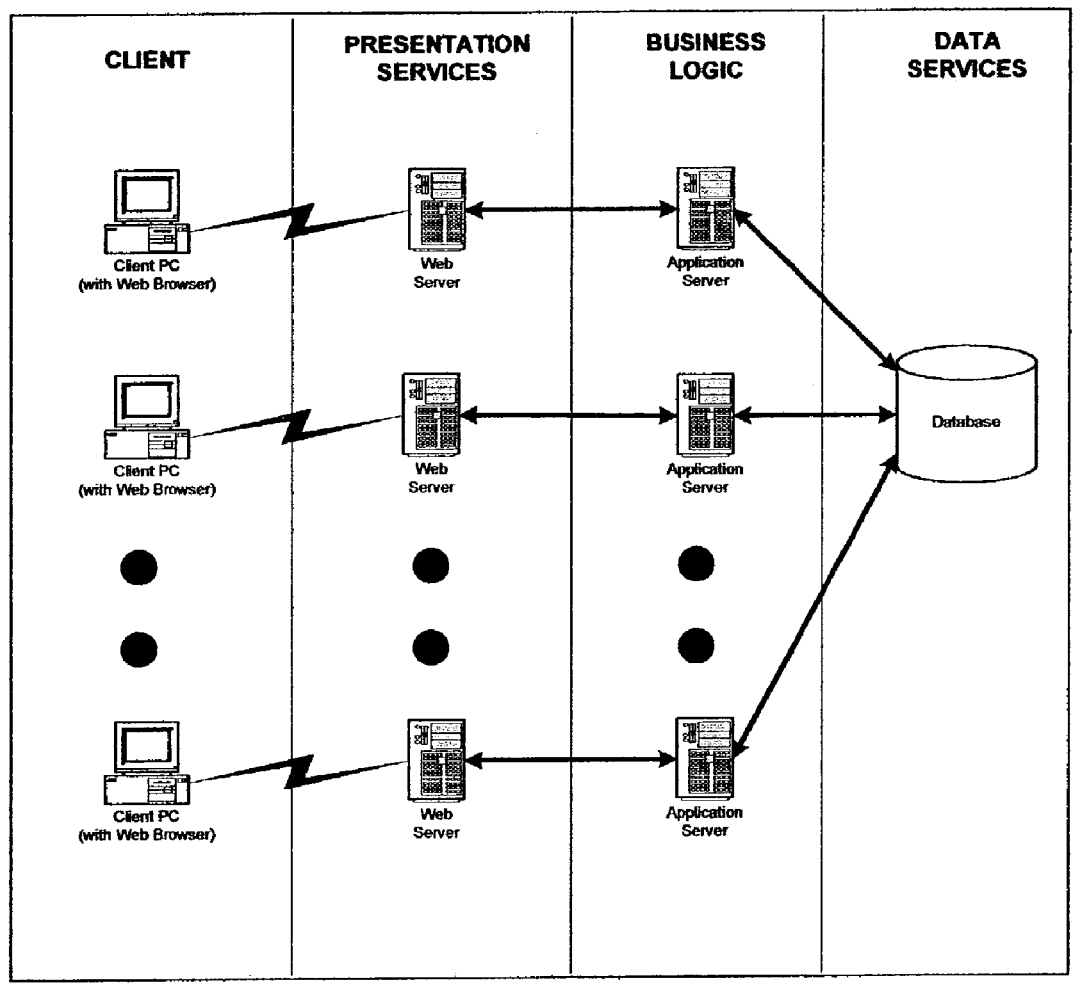
FIG. 23 is an implementation of an alternate preferred embodiment of the method of the present invention in a networked computing environment.

In describing the preferred embodiments, certain terminology will be used for the sake of clarity. Such terminology is intended to encompass the recited embodiment, as well as all technical equivalents, which operate in a similar manner for a similar purpose to achieve a similar result:

Processes (see FIG. 1): A Process is a collection of related activities in a defined workflow that, once completed, execute a specific and well defined business objective, process, collaboration or transaction.

Activities (see FIG. 2): An Activity is the smallest action element of a process. An Activity is normally associated with one step in an overall process. An Activity can be user defined, automated, emailed, reported, queried, messaged, remote, define an event or launch a new process.

Packages (see FIGS. 13 and 14): Packages are similar to database tables. Packages are associated in two ways: 1) independent packages can be loosely associated in a relatively ad hoc way, as required for specific processes, and 2) packages are associated to the point of dependence, for example line items on an invoice. Here the dependent package would be defined as a Sub-Package. Data in a Sub-Package cannot exist independently of the package instance Data is dependent upon. When the 'parent' is deleted, the sub-package data is removed as well.

Attributes (see FIGS. 3, 15 and 20): Attributes are similar to columns in a database table. An attribute defines a collection of values where each instance in the collection conforms to the definition provided by the attribute. Each attribute has a number of properties, such as whether the attribute represents a date, a number, text, etc; how it should be formatted on the page and in reports; input control options, etc. Attributes are defined in collections called Packages, and Packages are associated with each other in various ways. Each Attribute defines the name, data type, size and other properties of the values that will be stored against an Attribute. When a package instance is created, attribute values are created and stored with a reference back to the package and the attribute within the package. A single package instance consists of one set of values. There can be any number of instances of a given package.

Organization (see FIGS. 11 and 12): An Organization is the structure in which the model and the associated application (a collection of processes) executes. An organization may comprise: 1) Engineers, those authorized to design and modify the system, 2) users, those authorized to use the system, 3) Directory; of which a collection of packages and attributes designed for global purposes for the enterprise, and 4) Calendar, which determines the working hours, holidays, etc. of each area of operation for a business entity or entities.

Rules (see FIGS. 10 and 16): Business rules are the policies, regulations and constraints governing the way an organization carries out organizational operations. VE is concerned with those business rules that are in some way related to, or impact upon, the business processes being developed. For example: "the discount must be less than 10%", or "a purchase order form must include at least one item".

Integration: The preferred embodiment supports 5 integration methods:

External Components: VE allows standard COM components to be utilized as part of the native business rule grammar. This is achieved by registering a given COM component using the Composer interface. VE examines that methods implemented by the components and maps all parameters to native VE attribute types. The methods are then dynamically added to the business rule grammar. At business rule execution time, VE performs the necessary interfacing required to make remote procedure calls to the relevant external components.

Remote Data: VE comes standard with a custom web service that can be deployed against any data source supported by the ActiveX Data Objects (ADO), which includes any data source that has an ODBC driver. Through VE accessing the web service, engineers are able to define "remote packages" based on-tables in data sources supported by the web service. Such "remote packages" are treated as if they were native data of the given VE solution. The business rules layer performs all the necessary mechanics to update the data source taking into account the data source's referential integrity.

XML Messages (see FIG. 22): VE allows custom XML (eXtensible Markup Language) messages to be exchanged with external systems via the Internet. An engineer can construct definitions (i.e. using the XML Mapper interface) that describe how to interpret incoming XML messages and convert them to native VE packages and attributes, and vice versa. Again, from the engineer's perspective the XML is treated as if the XML code were native VE data, with the business rules layer performing all the mechanics necessary to convert between the defined XML schema and VE packages and attributes.

SOAP Messages: VE supports both the construction of external SOAP (Simple Object Access Protocols) requests and the ability to respond to external systems making SOAP requests on VE. At its simplest, SOAP identifies a request XML message schema, a response XML message schema, and the mechanism for the communication of these schemas. Using the previously described XML mapping interfaces, engineers define the structure of both incoming and outgoing SOAP requests and treat the schemas involved in these requests as if they were native VE packages and attributes. Again, the business rules layer performs all the mechanics necessary to construct, interpret and dispatch SOAP requests.

Web Services: Visual Enterprise supports both the consumption of external web services and exposing Visual Enterprise processes as web services. The consumption of an external web service is essentially the same as making a SOAP request. The only difference is that an engineer can use the composer to search a UDDI (Universal Directory and Discovery Interface) registry to find the required web service.

In certain alternate embodiments of the method of the present invention, a user, engineer, or business process engineer may integrate a first business process software program with a second business process software program, wherein the first business process software program and the second business process software program communicating via a computer network. Preferred embodiments of the present invention of this type may comprise (1.) interrogating the second business process software program via the computer network to determine how a message containing data may be structured in order to enable the second business process software program to accept the data, (2.) detecting a set of data that the first business process software program may provide to the second business process software program, (3.) structuring a message for transmission to and acceptance by the second business process software program, the message containing the set of data, and (4.) transmitting the message to the second business process software program via the computer network.

In an alternate embodiment of the present invention, a system and method for application development is implemented. An application development environment, optionally a runtime environment, is provided to allow a business process engineer to define and document business processes, data definitions, business rules, transactional, organizational and calendar information. The business process engineer accesses the application development environment, the VE Composer, via a network using a network browser software, or browser to develop applications using one or more business processes consistent with the data definitions, the business rules, workflow and policies and the calendar, event, trigger and organizational information without programming, coding or scripting.

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and methods have not been described in detail so as not to obscure the invention.

A first alternate preferred embodiment of the present invention, or VE, provides business process engineers with an environment, optionally a runtime environment, to define and document business processes, data definitions, business rules and a calendar of events. The VE comprises an environment that includes the VE Composer (see FIGS. 7 and 8). As the Composer has a Web-based browser interface, the business process engineer can use VE from anywhere. All the business process engineer requires is a computer with access to the Internet.

The information recorded by the engineer is used directly to construct the solution, without the need to translate from specifications to source code and without the need for a parsing or compilation. The VE Composer allows the engineer to structure and layout components in a fashion that models the way in which the organization might previously have documented the organizations processes and rules. All of this information can be viewed by management or other interested parties in a transparent manner, as opposed to being hidden away somewhere in computer code.

Further, the VE Composer provides a graphical user interface (GUI), delivered over a network, that allows the business process engineer or person to record all the information pertinent to an organization and relevant procedures and policies, including, but not limited to, organizational structure, calendaring, workflow, rules, organization data definitions, delegation of authority, security and corporate legal structure. The information is used to develop collaborative business process applications and transaction based systems, such as supply chain or customer relationship management, for the organization. The information is used to model the business in a fashion that reflects the way the organization establishes workflow processes and business rules without need for a technical build process (e.g., parsing, compilation, coding or programming). The resultant solution can be viewed by management or other interested parties in the organization in a transparent manner, as long as they have the security to do so.

The VE Player is optionally the environment by which management, staff or other authorized persons of an organization can access the business solution developed by the business process engineers (see FIGS. 5 and 6). The VE Player interface is entirely Web-based, and is accessed via a pre-allocated URL (for example, http://ve.orgname.com). The home page at this address requires the user to supply a login name and password in order to gain access to the site. An Administrator with the appropriate authority creates a login name to grant access to new users. The initial password is allocated by VE and communicated to the user via e-mail. The first time the user logs into the site he is required to select a new password, which will then be used for all subsequent access to the site.

One of the main optional features of the VE Player is the VE Enterprise Interpreter™, which is what translates the model into the application solution. The Enterprise Interpreter is a process interpreter and an engine that drives the execution of the processes, activities, attributes and rules of a VE application. The Enterprise Interpreter can respond to actions taken by a user, such as submitting an activity for completion, initiating a scheduled activity at the required time, or responding to a request from an external process and do so in real time. Once an activity is requested, the Enterprise Interpreter constructs the page, constructs and executes the business logic, determines what database calls are needed, makes any external calls necessary and then executes the process and runs the application. To do this, the Enterprise Interpreter includes a grammar engine that allows the VE Player to automatically create the software code necessary to run an application without syntax or scripting errors.

The Enterprise Interpreter is a multi-threaded environment meaning that the Enterprise Interpreter can handle requests or tasks from multiple users and other sources at the same time. Once that the Enterprise Interpreter has serviced a request, that the Enterprise Interpreter will send a response back to the client, including an indication of whether the request was serviced successfully or not.

FIGS. 1 and 7 are examples of process models built with the VE Composer. The elements (processes and activities) are related to one another in a hierarchical structure and are used by the business process engineer to develop applications. Entities are organizations for which the applications are to be developed. The Engineers are the business process engineers who develop the applications. The Users include management, employees, customers, vendors and partners or other interested parties of the organization who have been granted secured access to use the applications developed by the business process engineers. Groups include positions or roles within the organization against which secured access to a particular process or activity is granted. The Organization calendar (see FIG. 11) provides time zone, working hours, public holidays, and reporting period information as well as other time-related events relevant to the organization. The Organization Dictionary is a template of packages and attribute properties, which is used to create single instance definitions that enable standards to the information collected by the organization and used across application boundaries.

Figure 17:
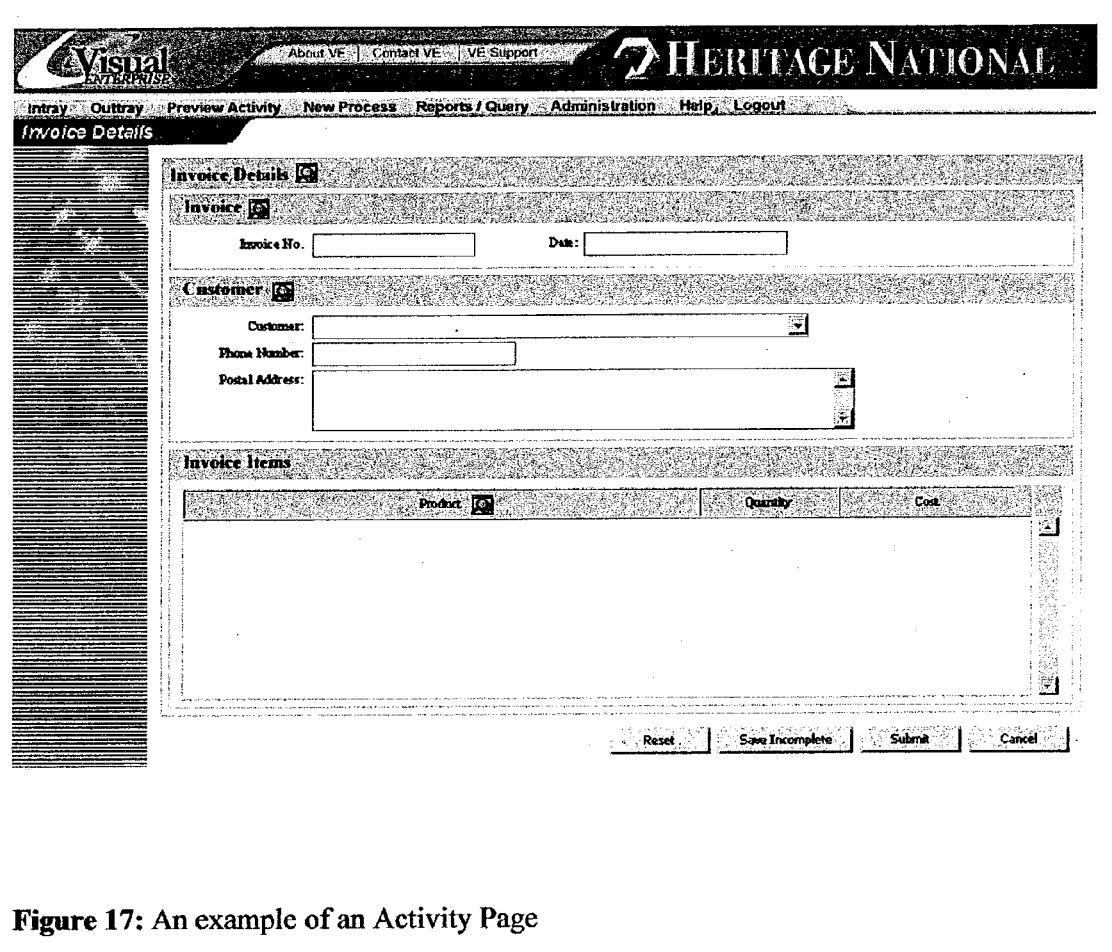
Figure 21:
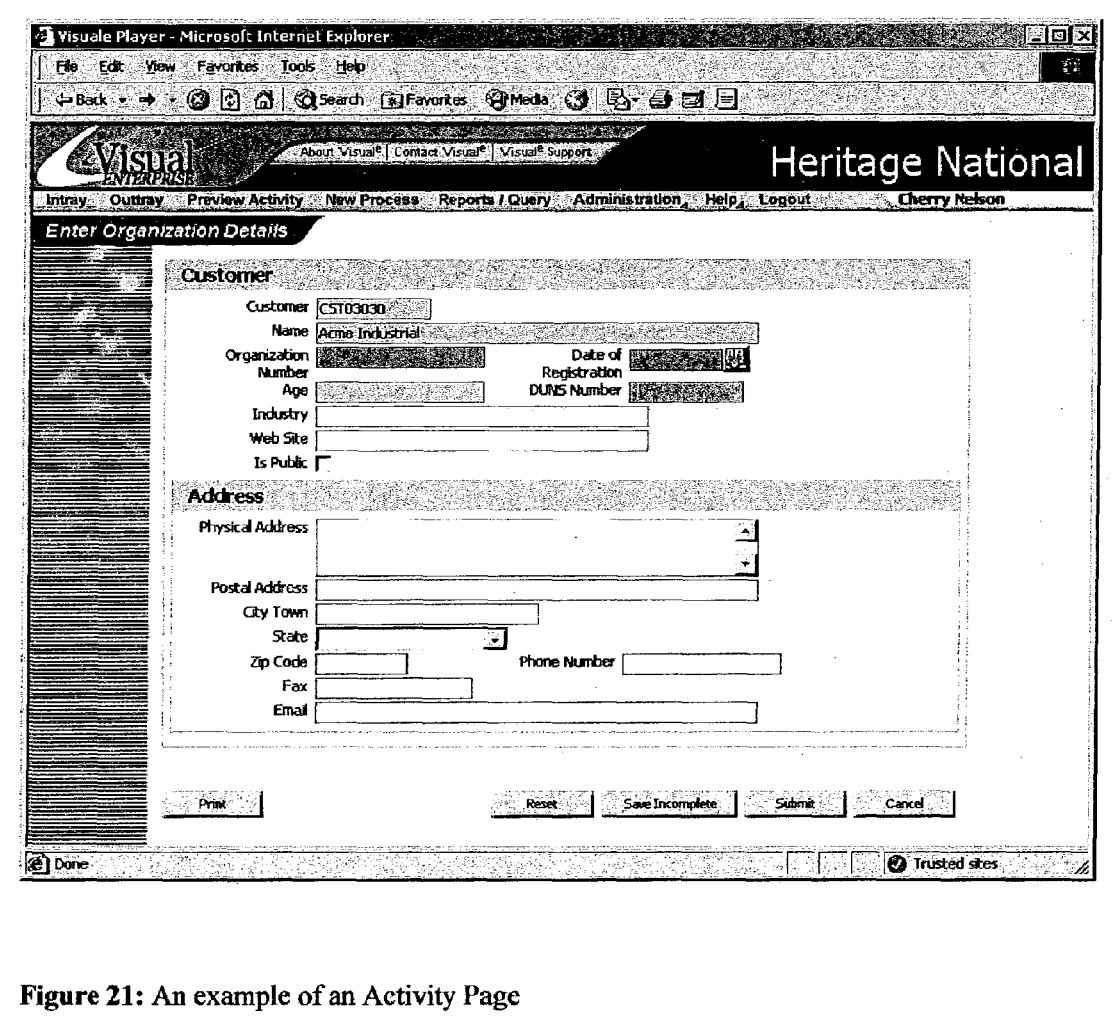

An application (see FIGS. 17 and 21) may be a collection of business processes, data definitions and business rules, which together reflect how an organization or particular section of an organization operates. The attribute library (see FIGS. 15, 18 and 19) is a library of data attributes, which define properties of and relationships between pieces of information collected by the organization. A process is a collection of related processes used to assist users in identifying the correct process to initiate. The process is a series of operations performed to complete a particular function of the organization. The activity (see FIG. 13) is a single operation in the process. The operation may be defined by the business process engineer as to be completed either by a user or to be automated using, for example, a batch process. The data attribute, or element, is a piece of information collected by the organization and is an element of the attribute library. For example (not to be limiting, but for purposes of clarity), information may be a customer name or an invoice number.

One important factor common to many business solutions is to provide a consistent user interface. Consistency can be facilitated through the ability to define a template of attribute definitions. The attribute definitions allow the business process engineer to define properties of an attribute (e.g., data type, default value, whether or not it is mandatory for a user to record a value for the attribute, etc.) Some attribute properties may be specific to a particular data type (e.g., the number of decimal places, etc.), which is specific to numeric attributes. Some attribute properties, while applicable to all data types, may have options that are dependent on the data type. For example (not to be limiting, but for purposes of clarity), the options applicable to the format properties of a numeric attribute are different from the options applicable to a date or time-span attribute.

Attributes defined within each organization's template can be grouped into categories for easy reference. When the business process engineer is creating attributes for a particular application, the attribute's definition can be based on an attribute template. In this way, the attribute inherits properties from the template. The business process engineer may choose to override one or more of these properties. Any attribute properties that are not overridden will continue to be inherited from the template. For example (not to be limiting, but for purposes of clarity), a "Currency" attribute template may be defined in the organization dictionary with the following properties:

| Name | Currency |
|---|---|
| Data Type | Number |
| Control | Data Field |
| Default | 0 |
| Mandatory | No |
| Decimal Places | 2 |
| Display Width | 10 average characters |

The business process engineer may then create, as part of the application, a "Discount" attribute, which is based on the "Currency" attribute template. All of the properties of the "Discount" attribute are inherited from the "Currency" attribute template. A further attribute "Price" may be defined and based on the "Currency" attribute template. However, in this case the engineer may choose to override the Mandatory property to "Yes" and the Display Width property to 12. All other properties are inherited from the currency attribute template. If, at a later point in time, the Display Width property of the "Currency" attribute template is changed to eight (8) then the "Discount" attribute will inherit this new value. The "Price" attribute will not inherit the new value because an old value was overridden. The use of the organization dictionary can greatly reduce the time required to define each of the attributes required for an application. It also means that a later change in requirements relating to the properties of a group of attributes (such as increasing interest calculations from two (2) to three (3) decimal places) can be effected with no programming, coding of scripting.

Each of the attributes may have a number of attribute properties, which dictate the functionality or rules associated with that attribute. For example, the business process engineer can specify that the value of an attribute is selected from one of a list of options. These attribute properties may include:

Data Type: text, number, date, etc.

Control: This property determines the way in which the value of the attribute is collected on displayed on the page.

Control Options: this includes Data Field, Radio Buttons, Check Box, and Drop-down List. Depending on the value of other properties some of these options may not be valid.

Options List: This indicates a list of options from which the user can choose.

Extendable Options: This indicates whether the user can add additional options to the above list.

Default: This indicates a default value for the attribute.

Mandatory: This indicates whether the user must supply a value for the attribute.

Editable: This indicates whether the user can modify the value of the attribute.

Visible: This indicates whether the attribute's value is displayed on the page.

Report Name: The heading or label given to the values of the attribute on any report.

Description: This is a short description of the attribute, which is provided to a user when the mouse is positioned over the attribute.

Minimum and Maximum Values: These properties are equivalent to a business rule that verifies whether the value entered by a user is greater than a minimum or less than a maximum value.

Minimum and Maximum Length (Text Only): These properties control the minimum or maximum length of text that a user is permitted to enter.

Decimal Places (numeric only): This indicates the number of decimal places to which the attribute's values are to be stored.

Units (numeric only): miles, gallons, dollars, etc.

Background and Foreground color: Foreground color is the color of the text entered by the user while background color is the color behind that text.

Input Format: This property controls the acceptable format for a value entered by the user. For example, an input format that specifies two decimal places would prevent the user from entering more than two decimal places.

Output Format: This property controls the format in which values are displayed. For example, an output format that specified one decimal place would display the value with only one decimal place, even though value may be stored to two or more decimal places.

Display Width and Units: These properties control the width allocated for an attribute on the page. The width refers only to the attribute value and not the associated label. The units can be specified as pixels (if extremely accurate sizing is required), inches, centimeters and average character width (proportional fonts mean an exact character width cannot be determined).

This attribute library details the attributes that are collected by the organization as part of relevant operations. For example (not to be limiting, but for purposes of clarity), the organization may collect information about customer names, addresses, phone numbers, purchase order numbers, product names, quantities, etc. Each of these attributes can be grouped into packages of related attributes. For example (not to be limiting, but for purposes of clarity), a "Customer" package would be a collection of attributes related to a customer, including for example, the customer's name, date of birth, gender, etc. A package may also include a number of sub-packages that are also related in some way. For example, an "Invoice" package may contain an "Invoice Item" sub-package. The "Invoice" package would contain attributes for the invoice number, date, etc., while the "Invoice Item" sub-package would contain attributes for the name, quantity and price of the product being purchased. Attributes in the attribute library may be based on an attribute from the organization's template or they may be defined from scratch. An attribute that is based on a template attribute may have the same name as the attribute on which the attribute is based or the name can be changed as required.

The hierarchical structure (as defined in the Explorer—see FIG. 3) allows the business process engineer a structured method to access information in the organization. For example (not to be limiting, but for purposes of clarity), to view details relating to an activity, the business process engineer chooses the application, then the process category and the process before being able to select the relevant activity.

When the organization registration is complete, the administrator and any other authorized business process engineers are sent an e-mail message containing an allocated organization ID, login name and a temporary password. After this message is received, the business process engineer can log into the VE Composer web site. The first time the business process engineer logs into the VE Composer web site, that business process engineer may be required to select a new password, which will be used for all subsequent access to the site. Upon verification of the business process engineer's details, the business process engineer is directed to the VE Composer home page. This page is divided into three distinct areas, including the VE Composer Explorer (see FIG. 8), a process workspace, and a menu bar.

FIG. 7 is a block diagram illustrating components via the VE Composer Explorer that are available in the composer to allow the business process engineer to develop applications for an organization in accordance with one embodiment of the present invention. These components include the process workflows (see FIG. 9), the attributes (see FIG. 15), the business rules (see FIG. 10) and the organization calendar (see FIG. 11). In addition to the above components, other components are also available in the composer and may be used by the business process engineer. For example (not to be limiting, but for purposes of clarity), the VE Composer includes an administration component (not shown) to provide security or access control relating to the business process engineers and the users.

A process workflow includes applications, processes, and activities. To support the applications, the processes, and the activities, the business process engineer design information structures (e.g., data structures) necessary to record and retrieve the attributes. For example (not to be limiting, but for purposes of clarity), an invoicing process needs an invoice, and the invoice includes data such as, for example, invoice number, invoice date, line items, amounts, etc.

The attributes are defined by the business process engineer and can be accessed from any authorized activity in any process workflow. Organizational attributes are defined once and used many times, where specific application packages and attributes are used for specific application and process solutions. An attribute is a piece of information collected by the organization. Each attribute has a number of associated properties such as, for example, an attribute type (e.g., a date, a number, text, etc.), how the attribute is to be formatted on a page and in reports, input control options, etc. The attributes are grouped together into packages that clarify the use of one attribute in relation to the other attributes as described above. The values of an attribute (e.g., a customer's name) are recorded using the processes and the activities defined by the business process engineer. A database maintains the complete collection of the values of the attributes. Each value in the collection represents a single piece of information. For example, each value of the "customer name" attribute represents one customer's name. There is no distinction as to the context of an attribute except for the activity that references that attribute. For example, one activity may be defined to record the details of all customers, while another activity may be defined to record each customer's purchases. The collection of values of the "customer name" attribute may include a value for each recorded customer as well as a value for each time a customer has made a purchase. The attributes may be constrained by the business rules to reflect values allowed by, or imposed upon, the organization. For example (not to be limiting, but for purposes of clarity), valid invoice numbers have to be in a certain range or have certain predefined characteristics.

The business rules relate to the capture and maintenance of attributes within context of processes and govern the way the organization wants to carry out appropriate operations. The business rules are designed by the business process engineer to ensure that an application follows the policies of the organization. The preferred embodiment incorporates and advanced rules engine having 4 elements to the rules structure: Categories, constants, functions and properties and is designed to create any type of rule, including but not limited to mathematical, trigonometric, statistical, comparatives, numeric, error handling, date/time (down to 1 second intervals), escalation, event, security, and time span rules. For example (not to be limiting, but for purposes of clarity), there may be business rules designed to assign default values to the attribute, and there may be other business rules designed to monitor the attribute such that the attribute has valid values and to warn the users when the values are not valid. Another example, a rule can be applied to an activity such as calculating a result dependant on variables, or a rule can trigger an event or launch new processes.

The organization calendar provides calendar information including time zones, business/working hours, holidays, reporting periods, etc. that the organization operates within. The business rules that enforce time constraints operate consistently with the organization calendar. The organization calendar is independent of the process workflows in order to support the organization with offices in different states, times zones, or countries. This allows a single version of a process workflow to operate, for example, in all of the organization's divisions worldwide without modification. The process workflows, the attributes, the business rules, and the organization calendar are described in more details in the following sections.

FIG. 7 is a block diagram illustrating application and process workflows in accordance to one embodiment of the present invention. As described above, process workflows include applications, processes, and activities. Within the application are the processes and activities. The processes include a collection of related activities. Each process includes one initiating activity. The initiating activity may be initiated either by a user, by an event, or by a remote activity such as another application or a web service. For example (not to be limiting, but for purposes of clarity), a daily backup batch process is to run at 10:00 p.m. each night. The process may be constrained by one or more business rules and determines the order or path in which the activities are to be performed. For example (not to be limiting, but for purposes of clarity), some of the activities may be allowed to perform in parallel, while others may not be able to perform until all preceding activities on an relevant path have been completed.

Process category allows grouping or filing of related processes. An organization may have a collection of processes defined by the business process engineer. The process category provides a mechanism to allow the business process engineer and the users to organize and to locate the processes without having to search the entire collection of defined processes. Using the process categories, the business process engineer can define a filing hierarchy to organize the processes. For example (not to be limiting, but for purposes of clarity), a business process engineer who is developing a sales application for an organization may define the following process category hierarchy:

Customer Relationship Management
   1. Marketing Campaigns
   2. Telemarketing
Transactions
   1. Purchasing
   2. Sales
   3. Adjustments
Maintenance
   1. Customers
   2. Suppliers
   3. Staff
   4. Departments
Reporting
   1. Weekly Reports
   2. Monthly Reports
   3. Year to Date Reports
   4. Annual Reports
   5. Ad Hoc Reports Using the above process category example, all processes relating to purchasing may be organized under a purchasing category, etc. To access or to file a process in the purchasing category, the business process engineer simply needs to select the transactions category followed by the purchasing category. Similarly, a user who has been granted secured access to the purchasing process may initiate the purchasing process by first selecting the transactions category.

Process definitions relate to the grouping of related defined activities to form a process. An activity is a collection of one or more related attribute packages designed to add, update and/or query. Rules may be associated with an activity in order to validate the attribute or to perform calculations on the attribute. An activity may result in succeed or fail status. The process uses the status of a current activity to determine which activity or activities are to follow on from the current activity. Each activity may be associated with an access authority. For example, a manager in the organization has default access to an activity that involves approving a loan application. The activities that form a process are linked or joined together according to a workflow defined by the business process engineer. FIGS. 1, 4, 5, and 6 illustrate examples of a loan approval for both the VE Composer and the VE Player. Each block in the loan approval process represents an activity. A directional arrow between two activities represents direction of the workflow. In the graphical user interface of the composer, each block in the loan approval process in FIG. 1 is illustrated using an icon, and the business process engineer can drag and drop activity icons and link these activity icons together to form a process or series of processes such as a message, report, email, automated process, user defined or launched process. For example (not to be limiting, but for purposes of clarity), if the customer equals "IBM" then launch the process called "IBM."

A remote activity type may comprise a process wherein the attribute is retrieved from or submitted to an external system, remote database or web service as part of the operations to be included in a process or activity. The external system may be of any type, including but not limited to, a business-to-business event, a business-to-customer event, a long-lived collaborative process, or a transaction based system. A maintenance activity type is where the user can add, modify or delete attributes in circumstances that may not fall within any formalized process but which, nonetheless, needs to be maintained. An example (not to be limiting, but for purposes of clarity) may be to update a customer's phone number that may have been entered incorrectly. Maintenance activities may not be used as part of a standard business process with other activity types.

Referring to FIGS. 12 and 16, rules information provides a list of rules relevant to the activity, which need to be enforced by an administrator. This is referred to as activity rule. Time criteria information provides properties that dictate any applicable time constraints (e.g., a completion deadline, etc.) that are placed on the activity. Access information provides a list of groups and/or users to whom the activity has been granted access. The groups or users granted access to the first activity in a process (e.g., the initiating activity) determine the users who have the authority to initiate that process. Initiation information includes properties that indicate how to determine the user or users to whom the activity should be allocated. E-mail information provides details relating to the message that is to be sent. Report information provides details about the report that is to be generated. Automated information provides details about import or export file names and formats, etc.

Activities that are defined with the remote type (referred to as remote activities) allow a process to access attributes or functionality external to the application. This includes, for example, gaining access to legacy systems, external components (COM+ or EJB), middleware and other organizations' business solutions. Using SOAP (Simple Object Access Protocol) as an underlying infrastructure, external attributes and functionality can be incorporated seamlessly into a process, as if it was part of the application. SOAP is an eXtensible Markup Language (XML) based protocol that consists of an envelope that defines a framework for describing what is in a message and how to process it, a set of encoding rules for expressing instances of application-defined attribute types, and a convention for representing remote procedure calls and responses. The information transported via SOAP between the application and the remote system includes an XML schema definition that defines the list of packages and attributes (universally identifiable) selected by the business process engineer as part of the remote activity. Other information transported via SOAP includes business rules applicable to the activity that defines conditions to be imposed on the remote activity, and attributes sent to and received from the external system. An acknowledgement scheme is used to indicate success or failure of the operation. For example, the organization may have a legacy system that maintains information of all staff working for the organization. In this case, a process can be developed to allow a user to access that information in conjunction with other associated attributes. The organization may have a legacy system that maintains a general ledger. In this case, activities can be developed to post transactions to that system as part of the processes developed to raise purchase orders, invoices and receipts. When the organization wants to conduct business-to-business transactions with a supplier to order stock, a process can be developed to allow the organization to place an order with the supplier. There may be business rules associated with the order that process has to follow. For example, a rule may state that if the cost is above a predetermined limit then the supplier must seek authorization with the organization before proceeding with the order. The authorization may be obtained by an automated initiation of, for example, an authorization activity. When the supplier is authorized for the cost of the order, that authorization would be transported via SOAP to the supplier whereupon the order can proceed. Alternatively, when the supplier is not authorized, the order is cancelled. It is understood that for the remote activity to operate, the remote system or component also supports the SOAP infrastructure.

A remote activity may be associated with remote attributes. A remote attribute is an attribute used to hold the attributes transmitted to or from the external or remote system as part of a remote activity. Some remote attributes may need to be stored in a local database while others may not. For example (not to be limiting, but for purposes of clarity), attributes defined for customer details stored in a legacy system may not need to be stored in the local database as this would only duplicate the attribute for no additional benefit. On the other hand, attributes defined for a purchase order that is used in a business-to-business transaction with another organization would need to be stored in the local database.

The business process engineer defines the one or more process views of a process. The process view enables the information included in each activity of the process to be tailored according to the user who has access to that activity, for both workflow and security reasons. In defining a process view, the business process engineer defines two components of a view, activity-attributes component and access component. The activity-attributes component is a selection of the activities to be included in the process view, and for each activity, which attributes should be visible to a user. The access component is a list of groups and/or users who have been granted access to the process view. It may be noted that being granted access to a process view is different from being granted access to an activity, and may include a digital certificate (signature) as deemed appropriate by the policy of the organization. Having access to a process view gives a user access to details about the history of a process as the process relates to the activities included in the process view. Having access to a process view may not allow the user to complete anyone of those activities. Having access to an activity, on the other hand, does gives a user the authority to complete that activity no matter which process view is being used.

Every process may have one default process view, which includes every activity in the process and the attributes associated with each activity. A user may have access to more than one process view of a process. In this case, the user is given the option about which process view to use when initiating a process or opening an activity (see FIG. 5). A process view does not affect the links between activities, the rules associated with an activity, the time constraint imposed on an activity, or other properties assigned to an activity. The process view can significantly reduce the number of processes and activities that would otherwise be required to develop an application.

One of the defining differences between the present invention and existing application development environments are the way relationships between various attributes are defined. Instead of using a standard relational database model, the preferred embodiment uses a meta-data repository where attributes and the relationships between attributes are defined by the context in which the attributes are referenced (e.g., packages, activities, and processes). This affects both on the storage of data and the way such data is retrieved. For example (not to be limiting, but for purposes of clarity), using the invoice activity example, with the attributes "Invoice Number Invoice Date", "Customer Name", "Customer Phone Number" (for display only), "Customer Address" (for display only), "Multiple invoice item" attributes. This activity might be used to enter a new invoice. It may be necessary to be able to determine how and when to retrieve the customer's phone number and address. This is done through the definition of packages and key attributes.

Key attributes refer to attributes that are unique. There may be one or more attributes within a package or within an activity that are unique. Using the above example, the business process engineer would specify that the invoice detail attributes were part of the main or controlling package. The invoice item attributes would be part of a separate "Invoice Item" repeating package to allow multiple items to be entered. The "Invoice Number" would then be defined as the key attribute for the main package because the "Invoice Number" is unique. The customer package and therefore the customer attributes (e.g., name, phone number and address) would be linked to the main package. This would indicate a one-to-one relationship between a customer and an invoice.

A unique attribute in one activity may be used as key attribute in other activities. This is because the unique attribute indicates that the result set for any related attributes, in a one-to-one relationship, will contain a single value. For example (not to be limiting, but for purposes of clarity), within an activity to record customer details, both the "Company Name" and "Business Number" attributes may be unique. This means no two companies can have the same name and no two companies can have the same business number. When defining activities that reference customer details, for example, the business process engineer should be able to interchange the company name with the business number when required. In effect, the "Business Number" attribute is an alternate key for the "Company Name" attribute, and the "Company Name" attribute is an alternate key for the "Business Number" attribute.

An attribute, defined in an activity as being unique, may be an alternate key for all of the other unique attributes defined in that same activity. This alternate key relationship extends beyond the activity in which the attributes are defined as unique to any activity in any process.

A search list of activities where both the base attribute and its key attribute are referenced within the same activity can be formed to retrieve data. The search list can be extended to include any activity where the base attribute and an alternate key attribute are referenced. Using the above example, when a "Customer ID" is to be added to the list of customer related attributes, one activity may be defined to collect the "Customer Name" and the "Customer ID" attributes only (both attributes defined as unique keys). A second activity may be defined (either within the same process or in another process) to collect the "Phone Number" and "Address", with the "Customer ID" used as the alternate key attribute. In this case, neither the first activity nor the second activity references all of the attributes "Customer Name", "Phone Number" and "Address". However, for the purpose of retrieving the phone number and address, the alternate key of the "Customer Name" attribute (i.e., the "Customer ID") can be used as the link between all of the attributes.

The above approach of using unique key and alternate key to data retrieval imposes a methodology on the business process engineer that involves retaining a consistent definition of all attributes across all activities and processes. For example (not to be limiting, but for purposes of clarity), if a number of address attributes (e.g., street, city, postcode, etc.) were referenced in one activity as a postal address and in a separate activity as a property address, no distinction is recognized. Separate attributes would need to be defined for postal and property addresses so that the definition of these attributes are consistent in all activities. Thus, in the first scenario an "Address" is sometimes a postal address and sometimes a property address. In the second scenario a "Postal Address" can only be a postal address, and a "Property Address" can only be a property address.

For data consistency, only the latest submitted version of an attribute's value is stored. This means that one process may modify the value of data created by an activity of a second process while that second process is still in progress. For example (not to be limiting, but for purposes of clarity), suppose an invoice entry process consists of two activities, one to enter the invoice details and another to approve the invoice, to be performed by two different users. When a user completes the first activity, the invoice details are submitted to the database. Before the next user (e.g., a supervisor) has the chance to approve the invoice, a third user (e.g., a manager) may run a separate process to modify invoice details. If this manager submits changes to the same invoice before the supervisor begins the approval activity, then these changes will be presented as the invoice details to be approved. If the supervisor has commenced the approval activity but not submitted when the manager submits the changes to the invoice detail then these changes will not be presented to the supervisor. Notification is generated (to a supervisor) to indicate that the data has changed so that the data can be refreshed before approving the invoice. If the supervisor had approved the invoice before the manager tried to modify the invoice details it would be left to the business process engineer to decide whether this was a valid activity or not. It may be a business rule of the organization that approved invoices cannot be modified but can only be cancelled.

When referencing an attribute of a shared relationship in a business rule, the attribute is to be fully qualified to include the relationship. For example (not to be limiting, but for purposes of clarity), an organization may have a business rule that indicates the offices in which staff work must have a phone number. However, this rule may not apply to offices in which meetings are held. In this case, the following business rule, for example, would be too restrictive:

Verify that the Office has a Phone Number

The rule would need to be qualified such that the relationship between "staff" and "office" is included, for example:

Verify that the Staff Office has a Phone Number.

When referring to an attribute (e.g., in a business rule), the business process engineer may refer to a single value or a set of values depending on the context. For example (not to be limiting, but for purposes of clarity), in the context of a sales order, when the business process engineer refers to a customer's name, then the reference is to a single customer. However, when the business process engineer describes the customers who may place an order, the business process engineer may be referring to multiple potential customers' names.

In a natural language, the distinction is made by using the plural form of the noun "name" to distinguish between a single name and a set of names. The description above also uses an apostrophe to indicate a specific reference to the name of a customer as opposed to the name of a staff member or supplier. "Customer" would be classified as a package of attributes and "Name" as an attribute. There is no distinguishing, in terms of syntax, between a single value and a set of values. All attribute values will be part of a set such that a single value is simply a set that contains only one item. This set of values is referred to as an attribute result set.

The packages have a number of package properties, which describe the behavior of the packages. The package properties may include, but is not limited to:

A list of key attributes, which together or in isolation can be used to uniquely identify an instance of the package. For example (not to be limiting, but for purposes of clarity), a customer's name and telephone number might uniquely identify each customer. This information is critical in ensuring that when a user chooses a particular entity that there can be no ambiguity about that choice.

A list of search attributes, which are used to assist users when making a choice from a list of available package instances. For example (not to be limiting, but for purposes of clarity), to assist the user in selecting a customer, the engineer might choose to display the customer's name, date of birth, social security number, phone number and address. By defining all these attributes as search attributes enables the user to choose which criteria to use for the search, e.g. social security number.

Further, where a container package is related on a one-to-many basis with a sub-package, additional properties are maintained on the sub-package. These additional properties may include:

The order in which the package instances is displayed. For example (not to be limiting, but for purposes of clarity), invoice items may be displayed in product code order or in order of price.

A minimum or a maximum number of instances. For example (not to be limiting, but for purposes of clarity), an organization might require an invoice to be limited to 10 items or fewer, or not to be limited at all.

Similar to the attributes having attribute relationships, packages also some relationship to other packages. This is defined in package relationship. In some cases, a number of different packages and the attributes contained therein have a relationship in common with another package. For example, a staff member is related to the office in which he works. A purchase order is related to an office from which that order originates. A meeting is related to an office in which that meeting is held. In this case, the "office" package should not be explicitly defined as a sub-package of each of the "staff", "purchase order" and "meeting" packages as it would not identify the common or shared relationship that exists in each case. Rather, "office" needs to be defined as an independent package so that it can be referred to, as required, across many activities within various processes.

In certain alternate preferred embodiments of the method of the present invention, packages that are the subject of shared relationships are first defined as packages independently of the packages to which they are related. When the definition of these packages is done, they can be linked to these related packages. Alternatively, these packages may be defined implicitly as shared relationships within an activity, based on the fact they are referenced in common. Shared or linked relationships, by default, are defined as "one-to-one" relationships. This can be changed to a "one-to-many" relationship by setting a property of the package.

A package result set is a set of values for each attribute in the package. Each of these sets contain the same number of values, although some of the values may be null or not specified. For example, a customer package may consist of a name attribute and a phone number attribute. For each value of the name attribute in the customer, result set there is a corresponding value for the phone number attribute and vice versa. This does not mean that every customer needs to have a phone number. For those that do not have a phone number the attribute value will be null (e.g., empty, blank). A fully qualified attribute name is one that includes all of the packages to which an attribute belongs. For example (not to be limiting, but for purposes of clarity), "Customer Address City" where City is an attribute of the Address package, which is a sub-package of the Customer package. To display fully qualified attribute names in business rules would overly complicate the reading of a rule. If there can be no ambiguity over the package to which an attribute belongs then only the attribute name is displayed, not the fully qualified name. If there may be ambiguity, for example because there are two "City" attributes, then it may be necessary to qualify the attribute name sufficiently to remove any ambiguity.

A single attribute may be referenced in any number of different activities and processes. When retrieving data, the context in which an attribute is referenced is used to determine the retrieval criteria, and held in the meta-data repository. In order to retrieve data, a relationship list is determined for each attribute within a process. This relationship list is based on explicit relationships that the business process engineer may have defined, along with any implicit relationships in the process definition. This defines a relationship between the attributes of both packages.

When searching for related attribute values, more than one instance may be found that matches with the key value. This set of values forms the result set for the related attributes, as described above. The attribute result set may or may not be appropriate for the definition of the activity within which the attribute is being retrieved. For example (not to be limiting, but for purposes of clarity), a multi-value result set cannot be displayed in a single data field, however it can be displayed in a list or table. In this case, an exception would be raised.

Every activity that allows the user to add or modify attribute values, or that uses business rules to add or modify attribute values does so via one or more data transactions. The transactions are initiated only after the activity has been validated using the associated business rules. A transaction is initiated for each package included in an activity. The transactions are all applied together as a single activity transaction such that the integrity and consistency of the whole activity is maintained. If a single package transaction should fail for any reason then the transactions for all packages in that activity will be reversed. The transactions do not delete data from the database. This is because of the inherent problems associated with deleting data that has already been referenced by other activities. Instead of deleting the data, the data is inactivated such that it cannot be referenced in other activities. The business process engineer thus does not need to be aware of these transactions because they are automatically controlled and managed.

FIG. 16 is a dialog box illustrating different types of business rules and their relationship with one another in accordance to one embodiment of the present invention. Business rules are the rules, regulations and constraints that govern the way the organization carries out its operations. The business process engineer relies on the business rules that are in some way related to, or impact, the business processes being developed. For example (not to be limiting, but for purposes of clarity): "the discount must be less than 10%", or "a purchase order form must include at least one item", etc. The business rules are satisfied at all points in time unless a condition is applied that specifically limits the time-span during which the business rule applies. For example, a discount may be offered only on invoices raised between Christmas and New Year. This business rule will hold true at all points in time, subject to the condition that the discount is only offered between Christmas and New Year. In other words, any attempt to offer a discount outside of those time constraints is rejected.

The business rules may include attributes business rules to apply to attributes, activity business rules to apply to activities, package business rules to apply to packages, and core business rules to apply to an entire application. The attribute business rule may be dependent on the definition of the rule and on the definition of the attributes on which the rule is based. The activity business rule may be dependent on the definition of the activity in the context of which the rule is executed. The package business rules and the attribute business rules may be automatically associated with each activity in which the attribute or attributes are referenced. The business process engineer may elect to turn off or override such a business rule where it is not applicable to a particular activity.

One or more attribute business rules may be applied when an attribute is submitted to the database. For example, the attribute may be submitted to the database in an "update" or in a "modify" activity. Depending on the value of the attribute, the attribute business rule can validate or invalidate the attribute. An attribute business rule such as, for example, "the customer's age is the difference between today and the date of birth" may not be recalculated every day. However, as soon as the age is referenced by an activity, either to display the age to a user or to use the age in some calculation, the attribute business rule will be executed to ensure that the value is correct.

The activity business rules are executed within the context of an activity. The attribute or attributes to which the activity business rule refers may or may not be included in the activity. For example, an activity business rule may be defined against a "Raise Purchase Order" activity, which sets the price of the products being purchased. The activity business rule may be:

Assign the Order Item Price=the Product Unit Price

The "Product Unit Price" may not be one of the attributes listed for inclusion on the activity. This is because the "Item Price" will be visible and to display both attributes would duplicate the price information. If, however, selection of the price is dependent upon criteria, such as the date, then these criteria will need to be specified to retrieve the correct result set for the product price. If a history of prices existed for each product then criteria would need to be added to the rule to uniquely identify the correct unit price, as shown in the following business rule example:

Assign the Order Item Price=the Product Pricing History Unit Price, where today is between the Product Pricing History Start Date and the Product Pricing History End Date. When an activity is opened, any attribute that has already been identified is retrieved from the database. The attribute may have been identified either because it was recorded in an earlier activity or because it has been set by an activity business rule. The attribute may also need to be retrieved from the database at other points in time during the completion of an activity. For example (not to be limiting, but for purposes of clarity), such a situation may occur when the user selects a package instance (e.g., a customer) and the activity definition includes a list of attributes related to that customer (e.g., Name, Phone Number, Date of Birth, etc). An activity business rule may also reference attributes not contained within the activity in order to perform some verification or calculation.

A business rule may be defined to include one or more rule statements. When there are multiple rule statements, all of the statements need to be consistent in type. For example (not to be limiting, but for purposes of clarity), a verification statement cannot be defined in a business rule that also includes an assignment statement. Some business rules may also be specified implicitly via an attribute property rather than explicitly as a business rule statement. For example, a rule that an invoice number can be no longer than seven (7) characters may be specified as a "Maximum Length" property of an attribute. For this reason, business rule functionality may be provided to the business process engineer as a property of an attribute and/or as a business rule statement. The fact that a business rule appears as a statement in this document does not preclude that the functionality may be provided exclusively as a property.

There may be different types of rule statements. For example (not to be limiting, but for purposes of clarity), the rule statements may include:

Logic statement (Passive rule type):
Logic statements include variants such as "if . . . then . . . otherwise", and "based on the value of . . . if it equals . . . ". Repetition variants such as "while . . . do . . . " or "repeat . . . until . . . " are also available.

Verification/Validation/Restriction statement (Passive rule type):
Verification or validation statements test a condition and either report an error or warning or perform some other specified action. A restriction statement restricts the available choices that a user can make to ensure the choice is valid for the particular circumstances.

Assignment statement (Active rule type): Assignment statements can be further categorized into the following:
1. Attribute assignment: assign a value or expression to an attribute.
2. Package assignment: set an instance of a linked package based on specified criteria Action statement (Active rule type): Action statements include the following:
1. "Retrieve" data from the database
2. "Initiate" a process
3. "Schedule" a process that has been initiated but not yet commenced
4. "Initiate" an activity
5. "Schedule" an activity that has been initiated but not yet commenced
6. "Allocate" an activity to a group or a particular user
7. "Create" an audit trail
8. "Execute" an external process.

A business rule may also be defined with one or more error and/or exception conditions. It is understood that an exception condition set may include error conditions. These error and/or exception conditions may include hardware errors, software errors, internal exceptions and external exceptions. The errors and/or exceptions may be raised as a result of the processing of business rules. A hardware error may occur when, for example, a server crashes, when there is insufficient disk space, when a telephone line drops, etc. A software error may occur when, for example, a browser crashes, an operating system hangs, etc. When a hardware or software error occurs, a report of the error is generated to allow whatever remedial action to be taken. If possible, an entry is logged and/or an e-mail message is sent to an administrator detailing the nature of the error. Any further processing of business rules for that activity would be cancelled. The business rules that have already been processed within the transaction during the processing of which the error occurred, would be rolled back and the transactional integrity is maintained for the entire system.

The business rule exceptions can be described as either internal or external to an activity. An internal exception is one where control of the activity remains with the user allowing the user to modify an attribute or attributes such that the verification rules are met. An external exception is one where the activity is automatically cancelled, and the control flows to an activity scheduler via the failure route for that activity. An exception may be, for example, a database exception where a value of an attribute entered by a user does not satisfy one or more business rules, a time-based exception where an activity is not completed within a specified time frame, etc. Most exceptions can be detected and handled during data entry before the commencement of the processing of a transaction. However, if this is not the case then the entire transaction will be rolled back to ensure the integrity and consistency of the database. In the case of an external exception, the handling of the exception is taken outside the control of the user to whom the activity was assigned. The business process engineer is able to define a complete workflow to be followed for each defined exception. This workflow may include, for example, an escalation of the exception should further data or time constraints not be met by the allocated user or users. If both an internal and external exception were to occur within an activity, the activity scheduler is allowed to deal with the external exception. Any data entered for the activity in error would be passed to the "Exception" activity, although the data would not be committed to the database. This allows the user handling the exception to either correct that data, where required, or to reset and then re-enter the data.

The business processes being defined may also require warnings to be issued to users at various stages. This functionality is provided via a variation on the verification/validation business rule definition. This variation would indicate that a warning is to be issued rather than raising an exception. In this case, processing would continue normally once the warning had been issued. Such warnings would be issued before any data being committed to the database.

The business rules defined by the business process engineer may sometimes be conflicting or ambiguous. For example (not to be limiting, but for purposes of clarity), one rule may be defined to offer a discount on certain products at a certain time of year. Another rule may be defined to offer a discount to loyal customers. In one embodiment, when conflicting and ambiguous business rules are detected, the business process engineer is prompted to redefine the conflicting rules or to clarify the ambiguity. This detection is performed when the business process engineer decides to publish an application. Rules that apply to the same attribute or attributes are searched. A conflict resolution form is generated and completed before the application can be published. For example (not to be limiting, but for purposes of clarity), consider the following separate business rules:

If the Order Date is between Halloween and Christmas Eve and the Product Type is equal to S ports Goods then Assign the Discount=10%

If the Customer Status is equal to loyal then Assign the Discount=5%.

In this example, the "Discount" attribute is assigned to the both the first rule and the second rule, and that the conditions applied in each rule may conflict with one another, resulting in an ambiguity. The business process engineer may resolve any ambiguity by combining the two business rules into one business rule. The ambiguity may be resolved by deciding that the "sports goods" discount takes precedence over the "loyal customer" discount. The business process engineer may combine the two rules and form a combined third rule as in the following example:

If the Order Date is between Halloween and Christmas Eve and the Product Type is equal to Sports Goods then Assign the Sports Discount=10%

If the Customer Status is equal to loyal then Assign the Loyalty Discount=5%

Assign the Discount=maximum (the Sports Discount, the Loyalty Discount)

If the organization wants the discounts to be cumulative then another business rule can be formed as in the following example:

Assign the Discount=the Sports Discount+the Loyalty Discount

If the organization does not want to have a discount applied to a particular purchase order then the result of the above rule would be a discount of zero.

The business rules may need to be applied at various stages of an activity or process. In certain circumstances, the business process engineer will determine this stage based on the type or nature of the rule. For example (not to be limiting, but for purposes of clarity), the business process engineer may specify a rule as:

A means of scheduling an activity (wait until a condition holds true)

A pre-condition to an activity

A means of determining the most appropriate user to whom an activity should be assigned A means of setting a default value for an attribute A condition under which an attribute will be hidden (security)

A condition under which an attribute will be protected (security)

A means of reversing an update to an attribute when the value of an attribute on which it is dependent is modified.

There are different stages at which to apply a business rule (taking into account any settings as described above). For example (not to be limiting, but for purposes of clarity), these stages may be at:

On the commencement of an activity (Pre-activity)

During an activity (Mid-activity)

When the user submits an activity for completion (Post-activity)

On commencement of a transaction (Pre-transaction)

On completion of a transaction (Post-transaction).

Pre and post-transaction business rules are defined as being part of the transaction, not external to it, and therefore inherit the same properties as transactional integrity and consistency. When pre-transaction rules are executed, they do so in the context of the previously committed values of each attribute and not the values as specified within the current activity.

The order of processing of an activity transaction is:

Lock all attribute values referenced by the transaction

Execute pre-transaction business rules

Assign package values of each attribute to the database

Execute post-transaction business rules

On success commit (and release locks); otherwise roll back.

Mid-activity business rules are applied whenever a user changes the value of the attribute against which the rule is defined or whenever a user changes the value of any attribute on which that rule is dependent. For example (not to be limiting, but for purposes of clarity), a mid-activity-business rule might be associated with a "Date Of Birth" attribute to the effect "The Date Of Birth must be earlier than today's date". This business rule would be applied to the attribute whenever the user changed the date of birth and moved the cursor away from that attribute. As a further example, a package might be established consisting of "Stock Item", "Quantity" and "Cost" fields. A business rule might be associated with the "Cost" attribute to the effect "Cost equals Unit Price of Stock Item multiplied by Quantity". When the user modifies the attributes on which the "Cost" business rule is based ("Stock Item" or "Quantity") the business rule would be applied and the updated cost would be displayed on the screen. The "Cost" business rule is also dependent on the "Unit Price" attribute however in this example this would be a display only attribute and hence could not be modified by the user. Rules applied as mid-activity business rules will be re-applied when the activity is submitted for completion. This needs to be done in case, in the meantime, another user changes the value of any of the attributes on which a rule is based.

The order in which business rules are executed is determined based on the dependencies of each business rule. For a business rule to be processed correctly it is important to execute that rule only after executing all rules on which the rule is dependent. For example (not to be limiting, but for purposes of clarity), a package may contain four attributes: A, B, C and D (where A, B and C are display only) with the following associated business rules:

$A=B+C+D$ $B=D*4$ $C=D/2$

The order of execution would be set as follows:

$B=D*4$ $C=D/4$ $A=B+C+D$

Following the execution of any part of a business rule that assigns an attribute's value, further execution of the rule is suspended to allow for the execution of any business rule that is dependent on the attribute being assigned. Any such business rule may itself be suspended for the same reason. Once the business rules of the dependent attributes have been executed, execution of the original business rule is resumed. There is no limit on the number of rules that can be suspended at anyone time. This approach could lead to a cyclical reference scenario whereby execution might never end. To prevent this, a business rule that is currently suspended will not be allowed to execute a second time. The following example is based on an "Invoice Number" attribute which contains a cyclical reference but is nonetheless a valid business rule:

If the Invoice does not have a Invoice Number then
Assign the Invoice Number=the Next Invoice Number
Assign the Next Invoice Number=the Next Invoice Number+1
otherwise
Verify the Invoice Number is less than 1000

This business rule is dependent upon both the "Invoice Number" and "Next Invoice Number" attributes. During execution of this business rule, after each assignment statement, execution would be suspended in order to execute any dependent business rules. As a dependent of itself, this business rule would not be re-executed even though in this particular case it would not result in an endless loop. However, if the rule were rewritten as follows, re-execution would result in such a loop:

If the Invoice does not have a Invoice Number then
Assign the Next Invoice Number=the Next Invoice Number+1
Assign the Invoice Number=the Next Invoice Number
otherwise
Verify the Invoice Number is less than 1000

Given that either of the two variants will not be re-executed, the rule would still need to be rewritten if it were to serve the purpose of always verifying an invoice number was less than 1000. Splitting the business rule into two rules as follows would achieve the correct result:

Verify the Invoice Number is less than 1000
If the Invoice does not have a Invoice Number then
Assign the Invoice Number=the Next Invoice Number
Assign the Next Invoice Number=the Next Invoice Number+1

In this case, during execution of the latter rule, after the first assignment statement, execution of the rule would be suspended and the verification rule would be executed as a dependent. If a rule fails, all business rules and transactions would be rolled back.

When a business rule contains conditional logic, the condition will not be pre-evaluated in order to determine the correct execution order for the business rules. This is because the evaluated results of the conditions may change as each rule is executed. This may mean that the correct execution order cannot be determined. In these cases, the business process engineer will be given a warning and may elect to rewrite the rules in question in order to remove any ambiguities.

The business rules are written according to a business rule grammar engine found in the VE Enterprise Interpreter, which is part of the VE Player. The grammar defines the structure and meaning of the rule that can be defined. The grammar also contains a sub-grammar based on a standard algebraic and mathematical grammar. From the grammar, the business process engineer can choose a list of valid options at each point through the process of defining a business rule. When the grammar change the list of valid options will automatically be reconfigured based on the new grammar. Associated with the grammar is a corresponding JavaScript Translation grammar and is what generates the application without syntax errors, being that the grammar engine is fully encapsulated. This grammar defines the valid JavaScript syntax required to translate a business rule into JavaScript just in time for execution.

The business rules created by the business process engineer is constrained by Business Rule Grammar. The grammar is based on the four principles of validation, calculation, condition and action using a combination of set theory and standard mathematical grammar. The grammar is designed such that it can be expanded and enhanced should the need arise. The engineer also has the ability to specify a time-span during which the rule should be in force. If no time-span is specified then the rule will be permanently in force, or at least until the engineer specifies otherwise. The time-span can be based on specific dates and times, such as for example, from January 2002 until December 2002, or it can be based on organization-based events, such as for example, from Christmas until New Year. Rules can be categorized according to definitions created by the engineer. For example, a rule may be placed in a Finance category and a Legal category because the organization perceives it to have both financial and legal implications. These categories can then be used as criteria when searching for particular rules. The definition of a rule is not converted or stored as "code" but is stored as data.

The process explorer (see FIG. 8) provides a simple and efficient means for a business process engineer to create, locate and modify business process definitions. Its structure is based on the hierarchical structure. To locate a process, the business process engineer can either browse through the available applications and process categories or can choose a "find" option. This "find" option will search all the available processes for a process that matches a process name specified by the business process engineer. The process explorer has three modes of operation:

Organization: This mode allows access to all elements of the Composer, such as Processes, Attribute Library, Organization Calendar, Users, Groups, etc.

Application: This mode allows access to all elements of the Composer related to a single application, including Processes and Attribute Library. It excludes elements such as the Organization Calendar, Users and Groups.

Section: This mode allows access to all elements of the Composer related to a selected section of the hierarchy. This could be, for example, the Attribute Library, or a Process Category, including processes, activities, attributes and rules.

The business process engineer can also specify any organizational relationships in which the user is a party, for example, the name of the person who is the user's supervisor or project manager. The business process engineer, when designing the workflow component of a process, can make use of these relationships. For example (not to be limiting, but for purposes of clarity), a "Leave Approval" activity may need to be completed by the office manager of the user who initiated a "Request for Leave". Similarly, a "Timesheet Approval" activity may need to be completed by the project manager of the user who completed the "Record Timesheet" activity. In these examples, there would be a link flowing from the "Leave Approval" activity to the "Request for Leave" activity, and a link flowing from the "Timesheet Approval" activity to the "Record Timesheet" activity.

Groups can be used to control access to particular activities and processes for more than one user. The business process engineer can choose to structure groups in ways that best suit the security model used by the organization. The groups may be structured to model the roles that the organization has created, or the groups may be structured according to categories or types of process and can be nested within other groups. For example (not to be limiting, but for purposes of clarity), the organization may define the following groups:

Purchasing Officer
Purchasing Manager
Sales Officer
Sales Manager
Chief Financial Officer The users in each of these positions would then be allocated to the corresponding group. Access to a "Raise Purchase Order" activity, for example, may then be granted to the Purchasing Officer, the Purchasing Manager, and the Chief Financial Officer groups while access to the Approve Purchase Order activity might only be granted to the Purchasing Manager and the Chief Financial Officer groups. Alternatively, the organization may define the following groups:

Purchasing Approval Sales
Sales Approval

Users would then be allocated to those groups that cover the activities relevant to their role in the organization. For example (not to be limiting, but for purposes of clarity), the Purchasing Manager would be allocated to Purchasing and Purchasing Approval groups. Access to the Raise Purchase Order activity would be granted only to the Purchasing group, while access to the Approve Purchase Order activity may be granted only to the Purchasing Approval group.

Groups can also be defined to belong to other groups. For example, the organization may require three levels of access, Gold, Silver and Bronze whereby users allocated to the Gold group automatically should have access to all processes to which the Silver and Bronze users have access. Thus, users in the Gold group would also be added to the Silver group, and users in the Silver group would be added to the Bronze group. In this way any user added to the Gold group would automatically have access to any process to which a Silver or Bronze user has access.

Groups can be external to an organization or system. An example (not to be limiting, but for purposes of clarity), is where the U.S.F.D.A. needs to determine and approve the quality of produce coming into a food-processing factory. The U.S.F.D.A. is not part of the organization, but is used by the VE System as an external group.

Within any organization, there exists a number of relationships on which workflow is based. For example, a timesheet may need to be approved by the staff member's supervisor. The composer provides the ability for a business process engineer to add these relationships, specify the user's involved in them and then to specify these relationships as a condition of the workflow of particular processes. This is how the preferred embodiment deals with both vertical and horizontal escalation of an activity.

Thus, a web-based application development environment called the VE Composer has been described to allow business process engineers to develop applications by simply designing application specification including workflow processes, business rules and calendar events. Then, using XML and Java, the VE Enterprise Interpreter, through the VE Player, dynamically abstracts, encapsulates and then interprets the specification in real time and delivers the application to the user without any programming requirement imposed on the business process engineers.

The method described above can be stored in the memory of a computer system as a set of instructions (i.e., software). The set of instructions may reside, completely or at least partially, within the main memory and/or within the processor to be executed. In addition, the set of instructions to perform the methods described above could alternatively be stored on other forms of machine-readable media. For the purposes of this specification, the term "machine-readable media" shall be taken to include any media which is capable of storing or embodying a sequence of instructions for execution by the machine and that cause the machine to perform any one of the methodologies of the present invention. The term "machine readable media" shall accordingly be taken to include, but not limited to, optical and magnetic disks.

This VE blueprint section of the present disclosure, consisting of paragraphs 00115 through 00362, describes the features and architecture of Visual Enterprise™ ("VE") business process modeling and management software program. The information provided in this blueprint section is illustrative and not limiting to the scope of the present invention. The VE blueprint provides information regarding certain capabilities, some optional and alternative, of the method of the present invention. The VE blueprint describes how certain alternate preferred embodiments of the method of the present invention may operate from a technical point of view, and how certain alternate preferred embodiments of the method of the present invention can be used to develop business applications.

The Visual Enterprise™ Business Process Integration Software Platform ("VE") provides an environment for the web-based development and deployment of business process systems. It consists of two major environments:

1. The VE Composer™, which allows business process engineers to model the processes of an organization, its rules and data; and
2. The VE Player™, which allows staff, management and others associated with an organization to execute those processes and access data, according to rules laid down by the engineers.

Business process engineers can engineer solutions using Visual Enterprise without the need for programmers to write code. Further, Visual Enterprise is not a code generator. Visual Enterprise dynamically constructs Web pages based on the process, rule and data definitions prepared by the engineers. Pages are constructed only when required, ensuring that the solutions are flexible, dynamic and always up-to-date. Visual Enterprise allows the business solution to grow and change, in a controlled manner, as the organization grows and changes. Control is provided through release and versioning mechanisms.

The Four Cornerstones: Referring now to the Figures and particularly to FIG. 1, Visual Enterprise is built on four main principles of applications development: process, data, rules and calendar.

Process—A business management solution must accord with the business processes employed by the organization and must, therefore, be able to model workflow, work allocation and assignment, process escalation and administration. The use of menu options to implement activities that must be undertaken in sequence, and which require the user to be aware of the correct order in which tasks should be undertaken, fails to model workflow and is not an acceptable solution.

Data—The data needed for an organization to successfully carry out its business is a key part of any business management solution. Modeling this data means defining each data attribute, including properties such as its type (numeric, text, date, etc) as well as defining associations between attributes. For example, the association between a customer and an invoice, or a staff member and a department, must be defined if the processes are to actually reflect the nature of the business.

Rules—Business policies are reflected in the rules that govern the capture and maintenance of data within the context of each step of a process. For example, a manager must approve all orders above a specified limit.

Calendar—An organization operates under many time constraints. It must be aware of at least one time zone, the business/working hours of each office, the public holidays observed in various places and any other events relevant to the organization's operations.

These four cornerstones of Visual Enterprise are expanded upon below in this VE blueprint section. All of the features of Visual Enterprise are built upon one or more of these cornerstones.

The VE Composer

Historically, application development has involved business process engineers or analysts undertaking business process reviews, collecting requirements, and collating business rules in order to produce a Software Requirements Specification. This specification would then be handed over to analysts to prepare functional and technical design documents. A team of programmers and administrators, in turn, would use these documents to develop a solution. The possibility of errors being introduced into the final solution due to omissions, inconsistencies, ambiguities or misunderstandings was extremely high.

Visual Enterprise provides the business process engineer with an environment to define and document business processes, data definitions, business rules and a calendar of events. This environment is called the Composer. As the Composer has a Web-based browser interface the business process engineer can use Visual Enterprise from literally any corner of the globe. All the engineer requires is a computer with access to the Internet.

The information recorded by the engineer is used directly to construct the solution, without the need to translate from specifications to source code and without the need for a parsing or compilation. The Composer allows the engineer to structure and layout components in a fashion that models the way in which the organization might previously have documented its processes and rules. All of this information can be viewed by management or other interested parties in a transparent manner, as opposed to being hidden away somewhere in computer code. The main elements of the Composer are:
    A graphical process definition system,
    An application attribute (data definition) library,
    A business rule definition system,
    An organization calendar, and
    An administration section supporting the security model associated with engineers and application users.

Entity Hierarchy

The Processes, Data, Calendar, and Rules that Visual Enterprise depends upon are modeled as a hierarchical set of entities. The four principal entities are supplemented by many other entities, each of which supports and expands upon the four principals. An overview of this hierarchy along with a brief description of the entities appears below. Organization—The organization for which the solution is being engineered.
    Engineers—The business process engineers who are engineering the applications.
    Users—The management, employees or other interested parties of the organization who have been granted access to use the applications.
    Groups—Positions or roles within an organization against which access to a particular process or activity is granted.
    Calendar—Time zone, working hours, public holidays, reporting periods and events relevant to the organization.
    Organization Dictionary—A template of attribute properties, which can be used to assist the application of standards to information collected by the organization.
    Application—A collection of business processes, data definitions and rules, which together reflect how an organization or particular section of an organization operates.
    Attribute Library—A library of attributes defining the properties of and associations between pieces of information collected by the organization.
    Process Category—A collection of related processes used to assist users in identifying the correct process to initiate.
    Process—A series of steps performed to complete a particular operation or function of the organization
    Activity—A single step in a process. A user may complete an activity or it may be automated, such as a batch process.
    Attribute—A piece of information collected by the organization, such as a Customer Name or Invoice Number.

The Composer presents the information to the engineer according to this hierarchical structure. For example, to view details relating to an activity the engineer must first choose the application, then the process category and the process before being able to select the relevant activity.

The VE Player

The Player is the Visual Enterprise environment that runs the business solutions engineered using the Composer. The Player, like the Composer, has a Web-based browser interface allowing users access to the organization's business processes via the Internet. The main elements of the Player are:
    An Intray that presents the user with a list of activities to be completed. Each of these activities is one step of a business process that has already been initiated.
    An OutTray that allows the user to view details of activities already completed by that user.
    A New Processes facility for authorized users to initiate new processes.

When the user opens an activity the Player dynamically constructs browser-based forms with the appropriate attributes and associated labels. All relevant business rules, including validation and calculations, are constructed dynamically and built into the page. Both the Player and Composer have in-built security to ensure only authorized users and engineers have access to specific activities within the organization's processes, data and rules.

This section looks at the four Visual Enterprise cornerstones of Process, Data, Rules and Calendar in detail.

Processes

A process is a collection of related activities in a defined workflow. Each process has one initiating activity. This activity may be initiated either by a user or by an event. Users must have access rights in order to initiate a process. Examples of events that could trigger a process include: a time constraint, such as a process which must run at 10:00 pm each night; or a condition being satisfied, such as a process which must run once stock gets below a certain level. The workflow determines the order in which activities are undertaken. Some activities may be able to be undertaken in parallel, which is controlled by the way that activities are linked and associated with each other and the placement of process synchronization conditions (Activity Link Join Methods).

Activities: An activity is a collection of one or more related data attribute packages designed to add, update and/or query data. Rules associated with an activity may be used to validate data or to calculate values such as totals, tax amounts, due dates, etc. An activity may either succeed or fail. The success status is used by the process workflow to determine which activity or activities are to follow on from the current activity. A number of different types of activities may be defined. These include:

- User Input activities where a user is expected to enter or view data, such an activity to raise a purchase order.
- Message activities, which allow a message to be sent to one or more people, such as an activity to notify a customer by e-mail that his application has been approved.
- Report activities, which allow a predefined report to be generated at a particular point in a process, such as an activity to print an invoice.
- Automated activities, which allow data to be processed without any user input. The selection of data and how it is processed is based on the definition of the activity created by the business process engineer.
- Remote activities, which allow direct access to external databases.
- Web Service activities, including both consumer and provider activities, which allow web services to be integrated into workflow as part of a standard business process.
- Maintenance activities, which allow data to be maintained outside the realms of a standard process, such as an activity to maintain customer details like phone number, maiden name, etc.

Data: The smallest unit of data in Visual Enterprise is the Attribute. Attributes are defined in collections called Packages, and packages are associated with each other in various ways. Each Attribute defines the name, data type, size and other properties of the values that will be stored against it. When a package instance is created, attribute values are created and stored with a reference back to the package and the attribute within the package. A single package instance consists of one set of values. There can be any number of instances of a given package.

Packages can be associated in two ways: independent packages can be loosely associated in a relatively ad hoc way, as required for specific processes. There is no need to predefine package associations in the Library, although that is always a useful option when relatively strong, commonly used associations are defined (e.g. Customer/Invoice). The second type of package association is used where packages are associated to the point of dependence, for example Line Items on an Invoice. Here the dependent package would be defined as a Sub-Package. Data in a Sub-Package cannot exist independently of the package instance it is dependent upon. When the 'parent' is deleted the sub-package data is removed as well.

Attributes: An attribute defines a collection of values where each instance in the collection conforms to the definition provided by the attribute. Each attribute has a number of properties, such as whether the attribute represents a date, a number, text, etc; how it should be formatted on the page and in reports; input control options, etc. Each attribute value, such as a customer's name or birth date, is recorded using the business processes and activities defined by the business process engineer. The database maintains the complete collection of values for each attribute, together with references to the package in which the attribute is defined. No distinction is made as to the context of an attribute except by the activity that references that attribute. For example, one activity might be defined to record the details of all customers, while a second might be defined to record each customer's purchases. The collection of values of the "customer name" attribute would include a value for each recorded customer as well as a value for each time a customer has made a purchase.

Packages: a package is a collection of related attributes. For example, a Customer package would be a collection of attributes related to a customer, such as the customer's name, date of birth, gender, etc. A package may also include sub-packages that define data dependent on the main package. For example, an Invoice package may contain an Invoice Item sub-package. The Invoice would contain attributes for the Invoice Number, Date, etc., while the Invoice Item would contain attributes for the Quantity and Price of each product being purchased.

A package may have a single instance of a sub-package, such as between an Invoice and a Dealer package where there can be only one dealer per invoice. Alternatively, a container package may have many instances of a sub-package, such as between an Invoice and Invoice Line where there can be many Invoices Lines per Invoice.

Data Transactions: Every activity that allows the user to add or modify attribute values, or that uses business rules to add or modify attribute values does so via one or more data transactions. The transactions are initiated once the user chooses the Submit button but only after the activity has been validated using the associated business rules. A transaction is initiated for each package included in an activity. The transactions are all applied together as a single activity transaction such that the integrity and consistency of the whole activity is maintained. If a single package transaction should fail for any reason then the transactions for all packages in that activity will be reversed.

Visual Enterprise transactions will not delete data from the database. This is because of the inherent problems associated with deleting data that has already been referenced by other activities. Instead of deleting data Visual Enterprise will inactivate data such that it cannot be referenced in new activities.

The business process engineer does not need to be aware of transactions because they are controlled and managed entirely by Visual Enterprise.

Rules: business rules are the policies, regulations and constraints governing the way an organization carries out its operations. Visual Enterprise is concerned with those business rules that are in some way related to, or impact upon, the business processes being developed. For example: "the discount must be less than 10%", or "a purchase order form must include at least one item".

Business rules must be satisfied at all points in time unless a condition is applied that specifically limits the time-span during which the rule applies. For example, a discount may be offered only on invoices raised between Christmas and New Year. This rule will hold true at all points in time, subject to the condition that the discount is only offered between Christmas and New Year. In other words, Visual Enterprise would reject any attempt to offer a discount outside of those time constraints.

It should be recognized that if a rule is applied when data is submitted to the database the only opportunity for a rule to be invalidated is when that data is updated or modified. For this reason Visual Enterprise does not continually apply rules to ensure that they still hold true. Instead it applies the appropriate rules whenever data is accessed, added, modified or submitted. A rule such as "the customer's age is the difference between today and the date of birth" is not recalculated every day. In theory, at a given point in time the value of the age will not be correct. However, as soon as the age is referenced by an activity, either to display the age to a user or to use the age in some calculation, the rule will be executed to ensure the value is correct.

Calendar: Visual Enterprise allows an organization to define events relevant to the organization. These might include an Overnight Processing event, an End of Month event, an End of Financial Year event, a Plant Maintenance Shutdown event, etc. The business process engineer can then associate specific business processes or rules with these events. This removes the need for systems administrators to schedule batch jobs for overnight or end of month processing. It also means that should the organization wish to change its end of month processing from the last day of the month to the last working day this can be done by a business process engineer changing the definition of a single event. In fact, this example would only require the engineer to select one option indicating that if the event fell on a non-working day to move the event to the previous working day.

The calendar can be divided into five components:
Time Zone—this enables the engineer to select the time zone in which the organization operates. Visual Enterprise supports multiple time zones. Individual calendars for departments, offices, etc. can be defined, each with its own time zone. Visual Enterprise performs time zone conversions wherever they are required.
Working Hours—specifying the standard working hours for an organization enables Visual Enterprise to know which times are in and which are out of business hours.
Public Holidays—by defining the holidays observed by the organization Visual Enterprise is able to move events, as specified by the engineer, which fall on a non-working day. Lists of predefined standard public holidays are available on a country-by-country and state-by-state basis.
Time Spans—an engineer can define the standard reporting periods that are used by an organization, such as a Financial Year or Sales Period.
Events—engineers can define absolute or relative events and either one-off or recurring events. A relative event is one that occurs at a set time-span before or after another event.

Management, staff or other authorized persons of an organization can access the business solution developed by the business process engineers by this environment. The Player interface is entirely Web-based, and is accessed via a pre-allocated URL (for example, http://ve.orgname.com). The home page at this address requires the user to supply a login name and password in order to gain access to the site. An Administrator with the appropriate authority creates a login name to grant access to new users. The initial password is allocated by Visual Enterprise and communicated to the user via e-mail. The first time the user logs into the site he is required to select a new password, which will then be used for all subsequent access to the site.

The InTray: Once verified, the user is directed to the Intray. This page displays a list of the activities awaiting completion. It includes both new activities and partly completed activities that the user is currently working on. The activities assigned to a user are determined by the process workflow (as defined by the business process engineers). The engineer can set a number of properties for each activity, which dictate how each activity should be allocated and assigned. For instance, an engineer may specify that the manager of the user who completed the previous activity in the process must complete an activity. An example of this might be a Request For Leave process where the manager of the employee requesting leave must approve the application. Alternatively, an engineer may specify that an activity can be completed by any one of a number of users. A call center may have a Support Call process where an activity can be completed by any one of a team of technicians. The first available technician can elect to take the next waiting support call.

The InTray displays a list of activities by name, along with a number of associated details including:
The date the activity was received,
The date by which the activity is due to be completed,
The user from whom the activity originated (this is the user who completed the previous activity in the process workflow),
A status indicating whether the activity is overdue, due today, tomorrow, next week, etc.

The user can also add, view, or modify notes entered by users who have completed prior activities in the process. Users completing subsequent activities in the process can, in turn, view these additional notes. Some additional optional features of the InTray include:
Access to a history of the process of which an activity is part, including details of who completed each step and the date each step was completed.
Unopened activities are bolded to ensure they are clearly distinguishable from activities that the user has already viewed or partially completed.
Users can place an activity on hold. This would be a standard procedure where all of the information required to complete an activity is not yet available. The business process engineer can place time constraints on an activity such that if the information is not entered within a particular time-span then the process can be escalated.
Activities available to a group of users can be reassigned to the pool should the user decide that he or she is unable to complete the activity. Activities can be reassigned either by the user or by an administrator.

To open an activity the user simply clicks on the activity name. User Interface activities are laid out automatically in accordance with the definition constructed down by the business process engineer in the composer. The user completes the activity by entering the relevant data for the required attributes in the appropriate fields. As the information is recorded any associated business rules are executed to ensure the data is valid and to carry out any calculations required. Once the page is filled out, the user clicks on the Submit button in order to submit the data to the database. At this point, where required, rules are re-executed to ensure other users have not made changes, subsequent to the original evaluation of the rule, which might affect upon the validity of the data. At regular intervals the Intray is refreshed to ensure the user has access to the latest list of activities. The Intray is also refreshed when an activity is submitted to ensure the completed activity is removed from the list.

The OutTray: When the user completes an activity it is removed from the Intray and moved to the user's OutTray. The user can access the OutTray from a menu at the top of the page. The OutTray will initially display all activities completed during the current day. To access activities completed earlier the user can either choose to view activities completed on a particular date or search for all activities of a particular type completed during a specified date range.

As with the Intray, the OutTray displays a list of activities by name, along with a number of associated details including:
The date the activity was completed,
The date by which the activity was due to be completed,
The activity's status at the time it was completed.

The user can also view any notes associated with the process of which the activity is a part. This includes notes recorded by users who have completed prior activities in the process and notes recorded by users who have completed subsequent activities in the process. Further, the user has access to a history of the process of which the activity is a part; including details of who completed each step and the date each step was completed.

Initiating a process: As well as completing activities that are a part of an existing process, the Player allows authorized users to initiate new processes. The New Process page lists all processes to which the user has been granted access (by the business process engineers). These processes are displayed in an explorer-like hierarchy based on the process categories designed by the engineers.

A preview of the first user interface activity in the process is displayed, to ensure that the selected process is the correct one. Only processes that have a user interface activity as the first activity can be initiated from the New Process explorer. User interface activities are dynamically laid out on the page without any need for the business process engineer to specify the position of each attribute on the page. The properties of each attribute determine the field order, the width of each field, whether a data field, multi-line text box, radio buttons or check box should be used, the background and foreground colors, etc. Once a the user has opened a new process by clicking the Open button, the process becomes identical to that where the user completes an activity from the Intray. Upon completion, the activity is added to the OutTray and the process workflow then initiates the next activity in the process and allocates it to the appropriate users.

If the user chooses to cancel the activity instead of submitting it then the whole process is revoked. In effect this is the same as if the process had not been initiated.

Administration: From time to time issues arise that prevent users from being able to complete one or more activities. The Composer allows the business process engineer to design the workflow such that if an activity is not started or completed by a specified date then the process will automatically escalate. Should this occur then the activity is automatically removed from the user's Intray and either reallocated or a new activity initiated in its place. However, there may be occasions where no escalation has been specified or where it is not desirable to wait until the due date. For example, if an employee goes on leave without clearing his Intray then the organization may wish to reassign all of the outstanding activities to other users.

The Administration section allows an appropriately authorized administrator to reassign one or more activities from a user's InTray to another user or group of users. This option can be accessed via the Administration menu at the top of the page.

As with the InTray and OutTray the Administration page also allows the user to view a history of a process of which a particular activity in a particular user's InTray is a part.

The VE Composer: This is the environment used by business process engineers to define and document the processes, data, rules and calendar used by the organization. The Composer interface is entirely web-based, and is accessed via a URL. This page requires the engineer to supply an organization ID, login name and password in order to gain access. The organization ID is allocated by Visual Enterprise when the organization is first registered. An administrator or business process engineer with the authority to grant access to new engineers allocates the login name. The initial password is allocated by Visual Enterprise and communicated to the engineer via e-mail. The first time the engineer logs into the site he is required to select a new password, which is then used for all subsequent access to the site.

After verifying the engineer's details, the Composer page is displayed. This page is divided into three areas:
The Explorer, which is located on the left-hand side of the page.
The Workspace, which is located on the right-hand side of the page. When the engineer is not working on a specific process this workspace allows access to general Visual Enterprise information, such as tutorials, latest product news, etc.
The Composer Menu Bar. The menus on this bar allow access to features of the Composer, such as the Attribute Library, Organization Calendar and Administration functions.

The Explorer: The main purpose of the Explorer is to provide a simple and efficient means for an engineer to create, locate and modify business process definitions. Its structure is based on the Visual Enterprise entity hierarchy outlined above. The Process Explorer has three modes of operation, namely:Organization—This mode allows access to all elements of the Composer, such as Processes, Attribute Library, Organization Calendar, Users, Groups, etc.
Application—This mode allows access to all elements of the Composer related to a single application, including Processes and Attribute Library. It excludes elements such as the Organization Calendar, Users and Groups.
Section—This mode allows access to all elements of the Composer related to a selected section of the hierarchy. This could be, for example, the Attribute Library, or a Process Category, including processes, activities, attributes and rules.

The Process Workspace graphically displays the workflow of a selected process. It can be used to view or modify the flow or to modify details about any of the activities that make up the process.

Activities can be dragged and dropped within the workspace. As the engineer defines each new activity, workflow links can be established with existing activities. In this way the process workflow can be defined and reviewed before having to specify the attributes, rules and other activity-based properties. Managers or other interested parties can be granted read-only access to these processes in order to review and sign-off on the workflow. This helps to ensure that the process flows are correct before adding the more detailed parts of the process definition.

Organization Dictionary: An important factor in any business solution is to provide a consistent user interface. Visual Enterprise facilitates this consistency making it possible to define attribute definition templates. These definitions allow the engineer to define attribute properties such as the data type, a default value, whether or not it is mandatory for a user to record a value for the attribute, etc. Some of the properties are specific to a particular data type, such as the number of decimal places, which is specific to numeric attributes. Some properties, while applicable to all data types, have options that are dependant on the data type. For example, the options applicable to the format properties of a numeric attribute are different from the options applicable to a date or time-span attribute. Attributes defined within each Organization's template can be grouped into categories for easy reference. When engineers create attributes for a particular application, they can choose to base the definition on an attribute from the template. In this way the attribute inherits all of its properties from the template. The engineer may choose to override one or more of these properties. Any not overridden continue to be inherited from the template.

For example, a Currency attribute may be defined in the Organization Dictionary with the following property values as shown in Table 1:

TABLE 1

| Property | Value |
| --- | --- |
| Name | Currency |
| Data Type | Number |
| Control | Data Field |
| Default | 0 |
| Mandatory | No |
| Decimal Places | 2 |
| Display Width | 10 average characters |

An engineer may then create, as part of the application, a Discount attribute, which is based on the Currency attribute template. All of the properties are inherited from the Currency attribute. A further attribute, named Price, may be defined and also based on the Currency attribute. However, in this case the engineer may choose to override the Mandatory property to "Yes" and the Display Width property to 12. All other properties are inherited from the template. If, at a later point in time, the Display Width property of the Currency attribute is changed to 8 then the Discount attribute will inherit this new value. The Price attribute, however, will not as its value was overridden.

The use of the Organization Dictionary can greatly reduce the time required to define each of the attributes required for an application. It also means that a later change in requirements relating to the properties of a group of attributes (such as increasing interest calculations from 2 to 3 decimal places) can be effected with much less effort.

Attribute Library: Each application developed using Visual Enterprise requires an Attribute Library. This library details the attributes that are collected by the organization as part of its operations. For example, an organization collects information about customer names, addresses, phone numbers, purchase order numbers, product names, quantities, etc.

These attributes are grouped into packages of related attributes. For example, a Customer package would be a collection of attributes related to a customer, such as the customer's name, date of birth, gender, etc. A package may also sub-packages. For example, an Invoice package may contain an Invoice Item sub-package. The Invoice would contain attributes for the Invoice number, date, etc., while the Invoice Item would contain attributes for the name, quantity and price of the product being purchased. Each sub-package represents a (possibly) multivalued data group that is dependent on the 'parent' package. If an instance of the parent is deleted then so are all instances of its sub-packages. For example, deleting an Order deletes all its contained Line Items.

Package properties include:
A list of key attributes that uniquely identify an instance of the package. For example, a customer's name and telephone number might uniquely identify each customer.
A list of search attributes that are used to assist users when making a choice from a list of available package instances. For example, to assist the user in selecting a customer, the engineer might choose to display the customer's name, date of birth, and phone number. By defining these as search attributes, the user can see the values displayed and search by any of them.

Additional properties are maintained on multi-valued sub-packages, including:
The order in which the package instances should be displayed. For example, should invoice items be displayed in product code order or in order of price?
Whether there is a minimum or a maximum number of instances. For example, an organization might require an invoice to be limited to 10 items or fewer, or not to be limited at all.

Library attributes can be based on the Dictionary or they can be defined from scratch. An attribute that is based on a Dictionary attribute can have the same name as the attribute on which it is based or the name can be changed as required.

The Business Rule Wizard, or Rule Wizard, allows the engineer to define rules wherever they are needed. For example:
Against an attribute in the Attribute Library.
Against a package in the Attribute Library.
Against an activity in a process.
On a conditional workflow link.
As a search condition to restrict associated package instances.
In a process trigger.

The Composer guides the engineer through the process of defining a rule, step by step. At each step the engineer simply chooses the appropriate option. The Composer also has two sub-components tailored towards mathematical and algebraic expressions. Called the Expression Builder and the Condition Builder, these components operate like a calculator. This approach allows these sorts of rules to be defined quicker than would be the case with an options-based approach.

The Composer's options are based on the Visual Enterprise Business Rule Grammar. The grammar is based on the four principles of validation, calculation, condition and action using a combination of set theory and standard mathematical grammar. The grammar has been designed such that it can be expanded and enhanced as the need arises. The engineer also has the ability as part of the Composer to specify a time-span during which the rule should be in force. If no time-span is specified then the rule will be permanently in force, or at least until the engineer specifies otherwise. The time-span can be based on specific dates and times or it can be based on organization-based events.

Rules can be categorized according to definitions created by the engineer. For example, a rule may be placed in a Finance category and a Legal category because the organization perceives it to have both financial and legal implications. These categories can then be used as criteria when searching for particular rules.

The definition of a rule is not converted or stored as "code" but is stored as data. The Player environment accesses this data and the appropriate logic is applied to ensure that the conditions laid out by the rule are met.

Organization Calendar: The five components of an organization's calendar are all accessed from a common dialog. This dialog contains tabs that allow the details associated with each component to be defined and maintained.

Time Zone: The time zone is automatically set based on the country and state entered by the organization as part of the registration process. If necessary, an alternative time zone can be selected.

The time zone may optionally be used by Visual Enterprise to handle time zone conversion, which may be necessary, either because some users are operating in a different time zone or the organization is operating in a different time zone to the database server.

An organization's work hours will tend to be constant over time. When they change Visual Enterprise maintains both the old working hours and the new hours. The period of time between the start of new working hours and the end of those working hours, when a new set is defined is called a cycle. Features and rules associated with cycles include:
- A new cycle can be defined ahead of time so that there is a seamless transition from one set of working hours to another.
- Only details about the working hours for the current (most recent) cycle can be modified.
- The working hours for the current cycle can be removed, effectively re-instating the working hours from the old cycle.
- A new cycle cannot be defined which comes into effect before the current cycle.

Most organizations operate on a recurring weekly period whereby, for example, the working hours may be from Monday to Friday, 8:00 am to 5:00 pm. Some organizations will have working hours that are different on some days of the week. For example, the hours may be Monday to Friday, 7:00 am to 3:00 pm and Saturday, 8:00am to 12:00 am. Visual Enterprise allows a variety of different configurations, including specifying non-working time within a block of working time. The latter could be used, for example, to record meal break times.

Different parts of an organization may have different working hours. Visual Enterprise provides the ability for an engineer to establish separate but linked calendars for different entities. For example, a calendar might be established for each of the departments within an organization to cater for the different workings hours between manufacturing, delivery, sales, finance, etc.

Holidays: Whilst public holidays are normally standard for organizations, there are occasions where staff may be required to work on some public holidays. For this reason Visual Enterprise allows an engineer to choose whether or not to set the standard public holidays for an organization. If standard public holidays are set the engineer can still choose to remove one or more of those holidays that may not be applicable. An engineer can also define additional holidays that may not be standard for the particular state or country in which the organization operates.

The standard public holidays need only be set once, and do not need to be set each year. Visual Enterprise has a definition of each holiday so that it can calculate the day on which it will fall each year. Should a state or federal government change the date on which a holiday falls it would be necessary for an engineer to modify the definition of the holiday to reflect that change.

When Visual Enterprise needs to determine whether a particular date is a working day or not, the organization's defined working hours are first checked. If there are no working hours for that particular day then it is a non-working day. If there are working hours defined then Visual Enterprise will check whether that date is defined as a holiday. If it is, then the date is a non-working day.

Time Span: A Time Span defines a recurring time period. There are predefined Time Spans that cannot be changed (second, minute . . . year). In addition, an engineer can create additional Time Spans such as a 4-week month, or an 8-hour shift. An event is generated each time the time span recurs. These events can be referred to in rules, and they can be used to schedule processes and activities.

Administration: From time to time administrative tasks must be performed by business process engineers. These tasks include:
- Registering an Organization
- Administering security and permissions for Business Process Engineer
- Administering security and permissions for users
- Creating and maintaining access Groups
- Maintaining Relationships between staff members to reflect the current organization structure.

In order to begin developing an application with Visual Enterprise, an administrator or engineer must first register the organization. The Visual Enterprise home page contains a link to the registration page. This page requires details about the organization, such as the organization name and address, to be recorded. Details about the administrator, such as the name, phone number, chosen login name and e-mail address, are also required. Optionally, the administrator can also register the names of other staff or related parties as Visual Enterprise engineers.

Once the registration is complete, the administrator and any other registered engineers are sent an e-mail message containing an allocated organization ID, login name and password. As soon as this message is received the engineer should log into Visual Enterprise where they will be required to select a new password.

Engineers or other appropriate persons are granted authority to perform certain tasks or operations within the Composer environment of Visual Enterprise. These include the authority to manage engineers and users, maintain the attribute library, maintain the calendar, and to design processes. An engineer may be a business process engineer who designs processes or maintains the attribute library, or it may be someone from management who simply wants to be able to view details of existing processes and how they have been structured.

Over time an organization may wish to grant new engineers access to the applications being developed, modify details of existing engineers or revoke an engineer's access. Each of these procedures can be performed from the Engineer List dialog box. The process of adding a new engineer is the same as adding an engineer during the registration process. Additionally, an existing user may need to be granted access to Visual Enterprise as an engineer. It is important when adding the new details that the option indicating the engineer is already an existing user be selected. This prevents having to maintain two sets of details and also prevents the user having to remember two login names and passwords.

Users: A Visual Enterprise user is anyone working for or who has an interest in an organization, and who has been granted access to one or more of the processes of that organization. The details that need to be collected for a user are similar to those that are collected for an engineer: name, phone number, login name, and e-mail address. The mechanism for informing the user of the allocated login name and password are also the same.

The security mechanism that determines the processes to which a user has access, however, are quite different from those for an engineer. Authorizations, particularly in medium to large organizations, are usually based on groups or roles. This makes the process of resetting the security for a user who has changed role much simpler. Access to particular activities within a process can be based on specific groups so that when a user changes roles only the group or groups to which that user belongs needs to be changed. The security for that user will automatically be reset based on the new groups. The engineer can also specify any organizational relationships in which the user is a party, for example, the name of the person who is the user's supervisor or project manager. An engineer, when designing the workflow component of a process, can make use of these relationships. For example, a Leave Approval activity may need to be completed by the Office Manager of the user who initiated a Request for Leave. Similarly, a Timesheet Approval activity may need to be completed by the Project Manager of the user who completed the Record Timesheet activity.

As outlined in the section above on Users, Groups can be used to control access to particular activities and processes. The engineer can choose to structure groups in ways that best suit the security model used by the organization. They could be structured to model the roles that an organization has created or they could be structured according to categories or types of process. For example, one organization might define the following groups:

Purchasing Officer
    Purchasing Manager
    Sales Officer
    Sales Manager
    Chief Financial Officer The users in each of these positions would then be allocated to that group. Access to a Raise Purchase Order activity might then be granted to the Purchasing Officer, Purchasing Manager and Chief Financial Officer groups whilst access to the Approve Purchase Order activity might only be granted to the Purchasing Manager and Chief Financial Officer groups.

Alternatively, an organization might define the following groups:

Purchasing
    Purchasing Approval
    Sales
    Sales Approval

Users would then be allocated to those groups that cover the activities relevant to their role in the organization. The Purchasing Manager would be allocated to Purchasing and Purchasing Approval. Access to the Raise Purchase Order activity would be granted only to the Purchasing group, whilst access to the Approve Purchase Order might be granted only to Purchasing Approval.

Groups can also be defined to belong to other groups. For example, an organization might require three levels of access, Gold, Silver and Bronze whereby users allocated to the Gold group automatically should have access to all processes to which the Silver and Bronze users have access. To this end, as well as the list of Bronze users, the Silver group would be added to the Bronze group. As well as the list of Silver users, the Gold group would also be added to the Silver group. In this way any user added to the Gold group would automatically have access to any process to which a Silver or Bronze user had access.

Relationships: Within any organization there exist a number of relationships on which workflow is based. For example, a timesheet might need to be approved by the staff member's supervisor. Visual Enterprise provides the ability for an engineer to add these relationships, specify the user's involved in them and then to specify these relationships as a condition of the workflow of particular processes.

Processes are one of the four cornerstones of Visual Enterprise. The Explorer provides a hierarchical view of an organization, its applications and the processes and activities in each, while the Process Workspace graphically presents process workflow. Visual Enterprise has a number of different entities, described in detail below, that are directly related to a process.

Process Categories: Process categories are like folders that an engineer can use to provide structure to the list of processes that users see on the New Process page in the VE Player. An organization may have dozens or even hundreds of defined processes. For example, an engineer developing a sales application may define the following process category hierarchy:

Customer Relationship Management
        Marketing Campaigns
        Telemarketing
    Transactions
        Purchasing
        Sales
        Adjustments
    Maintenance
        Customers
        Suppliers
        Staff
        Departments
    Reporting
        Monthly Reports
        Year to Date Reports
        Whole of Year Reports All processes relating to purchasing would be defined against the Purchasing category and so on. For an engineer to access one of these processes he would simply need to select the Transactions category followed by the Purchasing category. Likewise, for a user (who has been granted access) to initiate one of these processes he would need to make the same selections.

The security associated with each of the processes in a given category will have some similarities. For this reason, Visual Enterprise allows the engineer to specify the default access for any process added to that category.

Process Definition: The construction of a process involves a number of steps, most of which relate to the definition of the activities that make up that process. The initial step is to define the process itself, and its user access. The next step is to add activities to the process and to define the workflow or links that join these activities together. After creating each activity the engineer may choose to define the additional information that is required to fully build a process. Alternatively, the engineer may choose to leave the detailed information to a later time, once the links between the activities have been defined. As each activity is added an icon is added to the Process Workspace to graphically represent each step in the process. The engineer can position this icon in the Workspace as required to display the overall flow of the process. The positioning is a matter of personal choice. Some may prefer processes to flow from left to right on the page, others from top to bottom, or a combination thereof. At regular intervals or when the engineer moves to a new process, the graphical layout is automatically saved to the database. If an icon is moved by mistake then the engineer can choose to refresh the layout from the last saved position.

Activity Definition: An activity can be defined as one of a number of types:

- User Input activities where a user is expected to enter or view data, such an activity to raise a purchase order.
- Message activities, which allow a message to be sent to one or more people, such as an activity to notify a customer by e-mail that his application has been approved.
- Report activities, which allow a predefined report to be generated at a particular point in a process, such as an activity to print an invoice.
- Automated activities, which allow data to be processed without any user input. The selection of data and how it is processed is based on the definition of the activity created by the business process engineer.
- Remote activities, which allow direct access to external databases.
- Web Service activities, including both consumer and provider activities, which allow web services to be integrated into workflow as part of a standard business process.
- Maintenance—where the user can add, modify or delete data in circumstance which may not fall within any formalized business process but which, nonetheless, needs to be maintained.

Associated with an activity is a series of information, which can be divided into a number of groups. Some of this information is dependent upon the activity type, however it includes:

- Attributes—a list of attributes to be displayed, used or collected by the activity. This list is created by selecting packages and attributes from either the Attribute Library, the Organization Dictionary or from a previous activity in the process.
- Links—details about the activities that precede and succeed the activity, including any conditions associated therewith.
- Rules—a list of rules relevant to the activity, which need to be enforced by Visual Enterprise.
- Time Criteria—properties that dictate any time constraints, such as a completion deadline, that are placed on the activity.
- Access—a list of groups and/or users to whom the activity has been granted access. The groups or users granted access to the first activity in a process determine the users who have the authority to initiate that process.
- Initiation—properties that indicate how to determine the user or users to whom the activity should be allocated.

Visual Enterprise supports a variety of integration techniques. These range from low-level external components integrated through rules, to web services activities. Using the appropriate technique, the engineer, with assistance from technicians familiar with the access techniques and data structures, can integrate VE processes with virtually any external process or data source.

- External Components provide access to COM+ or EJB components.
- Web Services provides access to web service providers. Web service provides can be other systems within the firewall or external providers. Web service consumers rely on SOAP and XML to communicate via HTTP with web service providers. VE supports both web service provider and consumer activities that seamlessly incorporate these services into a Visual Enterprise process, as if it was part of the business solution.
- Remote Activities allow external data sources to be read and written, as if they were native VE Packages.

Typical examples of remote activities are:

Example 1: An organization may have a legacy system that maintains details of all staff working for the organization. A process can be developed which uses a remote activity to provide a user with access to that information in conjunction with other data stored in the Visual Enterprise database.

Example 2: An organization may have a legacy system that maintains a General Ledger. Activities can be developed that access external components to post transactions to that system as part of the business processes developed to raise purchase orders, invoices and receipts.

Example 3: An organization may wish to conduct business-to-business transactions with a supplier to order stock. A process can be developed that allows the organization to place an order with the supplier, including any rules that might be associated with that order. For example, a rule might state that if the cost is above a defined limit then the supplier must seek authorization with the organization before proceeding with the order. Such authorization would be obtained by the automated initiation of an activity in the relevant user's Intray (as defined by the process workflow). If the user authorized the cost of the order then that authorization would be transported, again via SOAP, to the supplier whereupon the order could proceed (or be cancelled if authorization was not obtained). N.B. For this functionality to operate the remote system or component must support the SOAP infrastructure.

Process Views: Within any organization, different staff may have different views of exactly what is entailed in any given process. This may be because certain steps in the process are not relevant to some users, or that some information collected or displayed by an activity should be restricted to certain users. For example, an engineer may have defined a process to collect information about a new staff member. This may include personal details, contact details, payroll details, etc. The information may be collected over a series of activities by different staff within the organization. A staff member from the Personnel department may initiate the process; the new staff member may themselves fill in the personal details; and a staff member from the Payroll department may complete the payroll details. The final activity in the process may revert to the Personnel department. It may be a requirement of the organization that the staff member's salary not be displayed to anyone in the Personnel department with the exception of the Personnel Manager.

Visual Enterprise allows an engineer to define one or more views of a process, which enables the information included in each step of the process to be tailored according to the user who has access to that step. The engineer must define two components of a view:

- Activity/Attributes—this is a selection of the activities to be included in the view, and for each activity, which attributes should be visible to the user.
- Access—this is a list of groups and/or users who have been granted access to the view. Being granted access to a view is quite different from being granted access to an activity. Access to a view gives a user access to details about the history of a process, as it relates to the activities included in the view. It does not, by itself, allow a user to complete any one of those activities. Access to an activity, on the other hand, does gives a user the authority to complete that activity no matter which view is being used.

Every, or each process, may optionally have one default view, which includes every activity and those attributes assigned to each activity. Any given user may have access to more than one view of a process. If this is the case then the user is given the option of which view to use when initiating a new process or opening an activity.

Neither the links between activities, nor the rules associated with an activity, nor the time criteria nor assignment properties are affected in any way by a view.

Attributes: Attributes are one of the four cornerstones of Visual Enterprise and as such it is important to understand the relationship between attributes and packages, attributes and processes, and attributes and business rules.

Cardinality of Package Associations: Associations between attribute packages in Visual Enterprise are described in each direction independently. If we look at two packages, A and B, then the association of A to B is described separate from B to A. The complete list of possible associations between the two packages is as shown on Table 2 as follows:

TABLE 2

| A → B | B → A |
|---|---|
| One-to-one (each A has only one B) | One-to-one (each B has only one A) |
| One-to-many (each A has many Bs) | One-to-one (each B has only one A) |
| One-to-one (each A has only one B) | One-to-many (each B has many As) |
| One-to-many (each A has many Bs) | One-to-many (each B has many As) |

There are two ways in which packages can be associated:

A sub-package/super-package association implies a one-to-one association from the sub-package to its super-package. That is, the sub-package must belong to just one super-package. For example, a Customer may have an Address sub-package. In the other direction, super-packages can have a one-to-one or a one-to-many association with a sub-package. For example, a Customer may have a one-to-many association with an Income History sub-package. In all cases sub-packages depend for their identity on their associated super-package. If the super-package data is deleted then the sub-package data is deleted with it.

A linked package is not dependant on another package. Instead, it defines an association between independent packages. For example, an Invoice may link to a Customer, and a Loan Application may also link to a Customer. In this case, a Customer can exist without any Invoice or Loan Application being created. Links can be either one-to-one or one-to-many. If the Invoice or Loan Application is deleted, there is no effect on the Customer.

Package Associations: Some kind of association exists between most attributes of an organization. These associations exist between individual attributes and also between packages. For example, a customer name attribute is directly associated with a customer phone number attribute; an invoice number is directly associated with an invoice item. These associations are defined explicitly by the way in which the engineer creates attributes within packages. A name and phone number might both be defined as attributes under a customer package. This implies a direct one-to-one association. The invoice number might be defined as an attribute and invoice item as a package, both under an invoice package. Stock item, quantity and cost attributes may further be defined under the invoice item package. This implies a one-to-one association between all of the invoice item attributes and also between the invoice number and the invoice item attributes.

Associations are also defined implicitly by the way in which attributes are used within an activity. An invoice activity may include the invoice number attribute as well as the customer name attribute. This defines an implicit association between the invoice package and the customer package because they are referenced in the same activity. This is despite the fact there is no explicit association defined between the two packages. Typically, an invoice will contain one or more invoice items whereas it will contain a single invoice number (a one-to-many association). The business process engineer can define this association by creating the attributes within a package and specifying that an invoice may contain many invoice items.

In some cases, a number of different packages and their contained attributes have an association in common with another package. For example, a staff member is associated with the office in which they work; a purchase order is associated with the office from which that order originates; a meeting is associated with the office in which that meeting is held. In this case, the office package should not be explicitly defined as a sub-package of each of the staff, purchase order and meeting packages as it would not identify the common or shared association that exists in each case. Rather, Office needs to be defined as an independent package, so that it can be referred to, as required, across many activities within various processes.

Packages that are the subject of shared associations should first be defined as packages independently of the packages with which they are associated. Once this has been done they can be linked to their associated packages. Alternatively, they can be defined implicitly as shared associations 0within an activity, by the simple fact they are referenced in common.

When referencing an attribute of a shared association in a business rule, it is important to fully qualify the attribute to include the association. For example, an organization might have a business rule that indicates the offices in which staff work must have a phone number, however this rule might not apply to offices in which meetings are held. In this case, the following business rule would be too restrictive:

Verify that the Office has a Phone Number.

The rule would need to be qualified such that the association between Staff and Office is included:

Verify that the Staff Office has a Phone Number.

Attribute References: When referring to an attribute (for example in a business rule), a business process engineer may either be referring to a single value or a set of values depending on the context. In the context of a sales order, if the engineer refers to a customer's name he is referring to a single customer. If, on the other hand, the engineer is describing the customers who may place an order then he might refer to the potential customers' names. This would be referring to all customers.

In a natural language, the distinction is made by using the plural form of the noun "name" to distinguish between a single name and a set of names. The description above qualifies the name as "customer's name" to indicate a specific reference to the name of a customer as opposed to the name of a staff member or supplier.

Using Visual Enterprise, "customer" would be defined as a package of attributes and "name" as an attribute. Visual Enterprise does not distinguish, in terms of syntax, between a single value and a set of values. All attribute values are part of a set such that a single value is simply a set that contains only one item. This set of values is known as a result set. Both attributes and packages have result sets. An attribute result set is a set of values for that attribute. A package result set is a set of values for each attribute of the package. Each of these sets must contain the same number of values, although some of the values may be null or not specified.

For example, a customer package may consist of a name attribute and a phone number attribute. For each value of the name attribute in the customer result set there must be a corresponding value for the phone number attribute and vice versa. This does not mean that every customer must have a phone number. For those that do not have a phone number the attribute value will be null (empty, blank).

A fully qualified attribute name is one that includes all of the packages to which an attribute belongs. For example, "Customer Address City" where City is an attribute of the Address package, which is a sub-package of the Customer package. To display fully qualified attribute names in business rules would overly complicate the reading of a rule. If there can be no ambiguity over the package to which an attribute belongs then Visual Enterprise will display only the attribute name, not the fully qualified name. If there could be ambiguity, for example because there are two "City" attributes, then Visual Enterprise will qualify the attribute name sufficiently to remove any ambiguity.

Attribute Result Sets: Business rules are executed within the context of an activity. This is true even where a rule has been defined in the Attribute Library against a package or an attribute. The attribute or attributes to which a rule refers may or may not be included in the activity. For example, a rule may be defined against a "Raise Purchase Order" activity, which sets the price of the products being purchased. The rule might be:

Assign the Order Item Price=the Product Unit Price

The Product Unit Price may not be one of the attributes listed for inclusion on the activity. This is because the Item Price will be visible and to display both attributes would duplicate information.

If, however, selection of the price is dependant upon criteria, such as the date, then these criteria will need to be specified to retrieve the correct result set for the product price. If a history of prices existed for each product then criteria, along the lines of the example below, would need to be added to the rule to uniquely identify the correct unit price:

Assign the Order Item Price=the Product Pricing History Unit Price where today is between the Product Pricing History Start Date and the Product Pricing History End Date Data Retrieval: When an activity is opened any data that has already been identified, either because it was recorded in an earlier activity or because it has been set by a business rule, is retrieved from the database. Data may also need to be retrieved from the database at other times during the completion of an activity. Such a situation would occur when:

The user selects a package instance (such as a Customer) and the activity definition includes a list of attributes related to that customer (such as the Name, Phone Number, Date of Birth).

A business rule references data not contained within the activity, in order to perform some verification or calculation.

Attribute Properties: There are a number of properties relating to attributes, which dictate the functionality or rules associated with that attribute. For example, the engineer can specify that the value of an attribute must be selected from one of a list of options. These properties include:

Data Type—such as Text, Number, Date, etc.

Control—this property determines the interface between the user and attribute in the Player environment. Options include Data Field, Radio Buttons, Check Box, and Drop-down List. Depending on the value of other properties some of these options may not be valid.

Options List—indicates a list of options from which the user can choose.

Extendable Options—whether or not the user can add additional items to the Options List.

Default—the default value for the attribute.

Mandatory—whether or not the user must supply a value for the attribute.

Editable—whether or not the user can modify the value of the attribute.

Visible—whether or not the attribute's value is displayed on the page.

Tooltip—a short description of the attribute that is displayed when the mouse is positioned over the attribute in the Player environment.

Minimum and Maximum Values—these properties are equivalent to a business rule that verifies whether the value entered by a user is greater than a minimum or less than a maximum value.

Minimum and Maximum Length (Text Only)—these properties control the minimum or maximum length of text that a user is permitted to enter.

Decimal Places (numeric only)—the number of decimal places to which the attribute's values are to be stored.

Units (numeric only)—such as miles, gallons, dollars, etc.

Background and Foreground color—foreground color is the color of the text entered by the user while background color is the color behind that text.

Input Format—this property controls the acceptable format for a value entered by the user. For example, an input format that specifies two decimal places would prevent the user from entering more than two decimal places.

Output Format—this property controls the format in which values are displayed. For example, an output format that specified one decimal place would display the value with only one decimal place, even though it may be stored to two or more decimal places.

Display Width and Units—these properties control the width allocated for an attribute on the page. The width refers only to the attribute value and not the associated label. The units can be specified as pixels, inches, centimeters and average character width.

Business Rules: Business rules are another component of the four cornerstones. Each business rule is dependant, not only on the definition of the, rule, but also on the definition of the attributes on which the rule is based and the context in which the rule is executed. There are many types of business rule. The major determinant is the rule type (logic, verification, assignment, or action), which determines how the rule interacts with the process in which it runs.

Business Rule Types: Business rules fall into two categories: active or passive. An active business rule is one that affects the value or state of a Visual Enterprise attribute, package, activity or process. For example, "Assign the Price=the Quantity multiplied by the Unit Price" or "If the Total Price is greater than $1,000 then execute the Authorization by Sales Manager activity". The order in which active business rules are applied can be critical to the correct processing of rules. Visual Enterprise automatically determines the correct order, based on logical dependencies between the rules. A passive business rule is a business rule that performs some verification or validation and results in either a success or failure. For example, "New accounts can only be opened where the customer has provided proof of identification". The order in which passive business rules are applied will not affect the outcome.

Business rules may be associated with activities, packages and individual attributes. Package and attribute business rules are automatically associated with each activity in which the attribute or attributes are referenced. The business process engineer may elect to turn off or override such a business rule where it is not applicable to a particular activity.

A business rule may comprise a single statement or it may consist of a number of statements. In the latter case all of the statements must, in certain preferred embodiments of the method of the present invention, be appropriate in type. For example, a verification statement cannot be defined in a business rule that also includes an assignment statement. Some business rules may also be specified implicitly via an attribute property rather than explicitly as a business rule statement For example, a rule that an invoice number can be no longer than 7 characters may be specified as a "Maximum Length" property of an attribute. The fact that a business rule appears as a statement in this VE blueprint section does not preclude that the functionality may be provided by Visual Enterprise exclusively as a property.

Business Rule Composition: After creating a business rule, the next step is to select the type of rule. The rule type determines the type of statements that the rule can contain, as per Table 3 below:

TABLE 3

| Rule | Type |
| --- | --- |
| Verify that data being entered conforms to this rule | Constraint |
| Select a package | Constraint |
| Restrict a package | Constraint |
| Specify a condition to this rule | Logic |
| Assign a value | Active |
| Assign a default value | Active |

In certain preferred embodiments of the method of the present invention constraint and logic rules are passive. The constraint and logic rules may optionally be applied to ensure that conditions are met, even where the constraint and logic rules are unable to change attribute values. Active rules can change the value of an attribute. The order in which the passive rules are evaluated may not significantly affect an implementation of a preferred embodiment of the present invention, but the order in which active rules are evaluated can be important because active rules often calculate a value based on other attribute values, which may in turn be affected by other active rules. If the sequence in which the rules were evaluated was allowed to change then the outcome could be different.

To prevent inconsistencies that arise from changes to the evaluation order, Visual Enterprise determines rule dependencies automatically. (Please note the section on Execution Order for more details.} Logic rules include variants such as "if . . . then . . . otherwise . . . " and "based on the value of . . . if it equals . . . ". Repetition variants, such as "while . . . do . . . " or "repeat . . . until . . . ", are also available. Verification or validation statements test a condition and either report an error or warning or perform some other specified action. A restriction statement restricts the available choices that a user can make to ensure the choice is valid for the particular circumstances.

Assignment statements can be further categorized into:
Attribute assignment—assign a value or expression to an attribute.
Package assignment—set an instance of a linked package based on specified criteria
Action statements include those to:
Retrieve data from the database.
Initiate a process.
Schedule a process that has been initiated but not yet commenced.
Initiate an activity.
Schedule an activity that has been initiated but not yet commenced.
Allocate an activity to a group or a particular user.
Create an audit trail.
Execute an external process.
External processes may be referenced by any of the types of statement detailed above. For example, an external process may be required to validate a credit card number; it may be required to retrieve an external document, which is then assigned to an attribute; or it may be required to send a message to a telephone pager. An external process, if it were to be included in a transactional rule, would need to provide transactional integrity and consistency by means of methods to begin, commit and rollback a transaction.

Visual Enterprise makes a distinction between errors resulting from hardware or software deficiencies and exceptions raised as a result of the processing of business rules. An example of an error might include:
A hardware failure, such as the server crashing, insufficient disk space or a telephone line dropping out
A software failure, such as the browser crashing or the operating system hanging.
An example of an exception might include:
A data-based exception where a value of an attribute, as entered by the user, does not satisfy one or more business rules; or
A time-based exception where an activity is not completed within a specified period.

Should an error occur, Visual Enterprise attempts to report the error to the user, allowing the user to take whatever remedial action is required. If possible, Visual Enterprise logs an entry and/or send an e-mail message to an administrator detailing the nature of the error. Any further processing of business rules for that activity is cancelled. Business rules already processed within the transaction, during the processing of which the error occurred, are rolled back.

Business rule exceptions can be described as either internal or external to an activity. An internal exception is one where control of the activity remains with the user allowing the user to modify an attribute or attributes such that the verification rules are met An external exception is one where the activity is automatically cancelled and control flows to the activity scheduler via the failure route for that activity. Most exceptions can be detected and handled during data entry before the commencement of the processing of a transaction. However, if this is not the case then the entire transaction will be rolled back to ensure the integrity and consistency of the database.

In the case of an external exception, the handling of the exception is taken outside the control of the user to whom the activity was assigned. The business process engineer is able to define a complete workflow to be followed for each defined exception. This workflow may include an escalation of the exception should further data or time constraints not be met by the allocated user or users. If both an internal and external exception were to occur within an activity Visual Enterprise would immediately allow the workflow activity scheduler to deal with the external exception. Any data entered for the activity in error would be passed to the "Exception" activity however it would not be committed to the database. This would allow the user handling the exception to either correct that data, where required, or to reset and then re-enter the data.

The business processes being defined may also require warnings to be issued to users at various stages. Visual Enterprise provides this functionality via a variation on the verification/validation business rule definition. This variation would indicate a warning was to be issued rather than raising an exception. In this case, processing would continue normally once the warning had been issued. Such warnings would optionally be issued before any data being committed to the database.

Attribute Associations: One of the defining differences between Visual Enterprise and other application development environments is the way associations between various attributes are defined. Although Visual Enterprise is built on a standard relational database, the engineer sees associations within the context of the packages, activities and processes in which they are referenced. This affects both on the storage of data and the way such data is retrieved. For example, in continuing the invoice activity example, which has been used earlier in this disclosure, the following attributes may be included:

Invoice Number
Invoice Date
Customer Name
Customer Phone Number (display only)
Customer Address (display only)
Multiple invoice item attributes This activity might be used to enter a new invoice. Visual Enterprise needs to be able to determine how and when to retrieve the customer's phone number and address. This is done through the definition of packages and key attributes.

In the above example, the business process engineer would specify that the invoice detail attributes were part of the main or controlling package. The invoice item attributes would be part of a separate Invoice Item repeating package to allow multiple items to be entered. The Invoice Number would be defined as the key attribute for the main package.

The customer package and therefore the customer attributes (name, phone number and address) would be linked to the main package. This would indicate a one-to-one association from the invoice to the customer (and a one to many association from the customer to the invoices). For details on how the customer phone number and address are retrieved refer to the section below on Data Retrieval.

Data Consistency: As a multithreaded, multi-user system, Visual Enterprise must ensure that data is consistent across processes. It is also possible for an engineer to define inconsistent rules. Visual Enterprise detects such inconsistencies and ensures that they are resolved before the application is used.

Process Interactivity: Visual Enterprise only stores the latest submitted version of an attribute's value. This means that one process may modify the value of data created by an activity of a second process while that second process is still in progress. For example, consider an invoice entry process that consists of two activities, one to enter the invoice details and a second to approve the invoice, each step to be performed by at least two different users. When a user completes the first activity, the invoice details are submitted to the database. Before the next user (e.g., a supervisor) has the chance to approve the invoice, a third user (e.g., a manager) may run a separate process to modify invoice details. If this manager submits changes to the same invoice before the supervisor begins the approval activity then these changes will be presented as the invoice details to be approved.

If the supervisor has commenced the approval activity but not submitted when the manager submits the changes to the invoice detail then these changes will not be presented to the supervisor. Visual Enterprise will, however, notify the supervisor that the data has changed so that he can refresh the data before approving the invoice.

If the supervisor had approved the invoice before the manager tried to modify the invoice details it would be left to the business process engineer to decide whether this was a valid activity or not. It may be a business rule of the organization that approved invoices cannot be modified but can only be cancelled.

Ambiguous Rules: It is possible for a business process engineer to define conflicting or ambiguous business rules. For example, one rule may be defined offering a discount on certain products at a certain time of year. Another rule may be defined which provides a discount to loyal customers. Does this mean that loyal customers receive an additional discount if they purchase the specially discounted products or do they simply receive the greater of the two discounts?

Visual Enterprise optionally detects conflicting and ambiguous business rules and prompt the engineer to redefine the conflicting rules or to clarify the ambiguity. This will be done when an engineer chooses to publish an application by searching for rules that apply to the same attribute or attributes. It will then generate a conflict resolution form that must be completed before the application can be published. For example, suppose the following separate business rules were defined:

If the Order Date is between Halloween and Christmas Eve and the Product Type is equal to Sports Goods then
    Assign the Discount=10%
If the Customer Status is equal to loyal then
    Assign the Discount=5%

Visual Enterprise would detect that the Discount attribute was being assigned by two separate rules and that the conditions applied in each case may conflict, resulting in an ambiguity. The engineer could resolve any ambiguity by combining the two rules into one. The decision might be that the sports goods discount takes precedence over the loyal customer discount.

If the business wanted to give the maximum discount, catering for situations where the discount percentages may change from time to time then the two rules could be combined as follows:

If the Order Date is between Halloween and Christmas Eve and the Product Type is equal to Sports Goods then
    Assign the Sports Discount=10%
If the Customer Status is equal to loyal then Assign the Loyalty Discount=5%
Assign the Discount=maximum (the Sports Discount, the Loyalty Discount)

If the business wanted the discounts to be cumulative then the rule would be specified as:
    Assign the Discount=the Sports Discount+the Loyalty Discount If no discount applied to a particular purchase order then the result of the above rule would be a discount of 0.

Data retrieval: A single attribute may be referenced in a number of different activities and processes. When retrieving data Visual Enterprise uses the context in which an attribute is referenced to determine the retrieval criteria In order to retrieve data, Visual Enterprise determines an association list for each attribute within a process. This list is based on explicit associations that the business process engineer may have defined as well as any associations implicit in the process definition. An implicit association is one where two unlinked packages have been included in the same activity. This defines an association between the attributes of both packages.

When the value of an attribute is either entered by the user or retrieved by Visual Enterprise the value of any related attributes will optionally, in turn, be retrieved. Let's extend the earlier example of the entry of an invoice to an activity that allows the invoice to be modified. The invoice number would again be defined as a key attribute. When the user enters an invoice number Visual Enterprise will retrieve the values for any related attributes, in this case the invoice date, customer name and invoice items. The customer phone number and address are not directly related to the invoice number, as they were not input in the same activity as the invoice number.

The customer phone number and address are related attributes of the customer name because they belong to the same package. As soon as Visual Enterprise retrieved, the customer name (as a result of the user entering an invoice number) Visual Enterprise would in turn retrieve the associated phone number and address.

When searching for related attribute values more than one instance may be found which matches the key value. This set of values forms the result set for the related attributes. The result set may or may not be appropriate for the definition of the activity within which the attribute is being retrieved. For example, a multi-value result set cannot be displayed in a single data field however it can be displayed in a list or table. In this case, an exception would be raised.

Key Attributes: One or more attributes within a package or activity may be unique. For example, within an activity to record customer details both the company name and business number may be unique. This means no two companies can have the same name and no two companies can have the same business number.

Unique attributes in one activity will typically be used as key attributes in other activities. This is because they guarantee that the result set for any related attributes, in a one-to-one association, will contain a single value. When defining activities that reference customer details, for example, the business process engineer should be able to interchange the company name with the business number as and when required. In effect the business number is an alternate key for the company name and the company name is an alternate key for the business number.

An attribute that is defined as being unique within an Activity is an alternate key for all of the other unique attributes defined in that same activity. This alternate key association extends beyond the activity in which the attributes are defined as unique to any activity in any process. When, for the purpose of retrieving data, Visual Enterprise builds a search-list of activities where both the base attribute and its key attribute are referenced within the same activity, the search-list will be extended to include any activity where the base attribute and an alternate key attribute are referenced.

To continue the above example, let's add a Customer ID to the list of customer related attributes. One activity might be defined to collect the name and ID attributes only (both defined as unique). A second activity may be defined (either within the same process or in another process) to collect the phone number and address, with the ID used as the key attribute. In this case no one activity references the customer name, phone number and address. However, for the purpose of retrieving the phone number and address, the "Customer Name" attribute's alternate key, "Customer ID", can be used as the link between all attributes.

The above approach to data retrieval imposes a methodology on the business process engineer that involves retaining a consistent definition of all attributes across all activities and processes. For example, if a number of address attributes (street, city, postcode, etc.) were referenced in one activity as a postal address and in a separate activity as a property address Visual Enterprise would not recognize the distinction. Separate attributes would need to be defined for postal and property addresses so that the definition of these attributes was consistent in all activities. In other words, whereas in the first scenario an "Address" is sometimes a postal address and sometimes a property address, in the second scenario a "Postal Address" is only ever a postal address and a "Property Address" is only ever a property address.

Business rules may need to be applied at various stages of an activity or process. In certain circumstances, the business process engineer will determine this stage based on the type or nature of the rule. The engineer may specify a rule as:
  A means of scheduling an activity (wait until a condition holds true)
  A pre-condition to an activity
  A means of determining the most appropriate user to whom an activity should be assigned
  A means of setting a default value for an attribute
  A condition under which an attribute will be hidden (security)
  A condition under which an attribute will be protected (security)
  A means of reversing an update to an attribute when the value of an attribute on which it is dependent is modified.

Visual Enterprise will determine the appropriate stage at which to apply a business rule (taking into account any settings as described above). These stages are:
  On the commencement of an activity (Pre-activity)
  During an activity (Mid-activity)
  When the user submits an activity for completion (Post-activity)
  On commencement of a transaction (Pre-transaction)
  On completion of a transaction (Post-transaction).

Pre and post-transaction business rules are defined as being part of the transaction, not external to it, and therefore inherit the same properties as transactional integrity and consistency. When pre-transaction rules are executed, they do so in the context of the previously committed values of each attribute and not the values as specified within the current activity.

The order of processing of an activity transaction is:
  Lock all attribute values referenced by the transaction.
  Execute pre-transaction business rules.
  Assign package values of each attribute to the database.
  Execute post-transaction business rules.
  On success commit (and release locks); otherwise roll back.

Mid-activity business rules are applied whenever a user changes the value of the attribute against which the rule is defined or whenever a user changes the value of any attribute on which that rule is dependent For example, a mid-activity business rule might be associated with a "Date Of Birth" attribute to the effect "The Date Of Birth must be earlier than today's date". This business rule would be applied to the attribute whenever the user changed the date of birth and moved the cursor away from that attribute.

As a further example, a package might be established consisting of "Stock Item", "Quantity" and "Cost" fields. A business rule might be associated with the "Cost" attribute to the effect "Cost equals Unit Price of Stock Item multiplied by Quantity". When the user modifies either of the attributes on which the "Cost" business rule is based ("Stock Item" or "Quantity") the business rule would be applied and the updated cost would be displayed on the screen. The "Cost" business rule is also dependent on the "Unit Price" attribute however in this example this would be a display only attribute and hence could not be modified by the user.

Rules applied as mid-activity business rules will always be re-applied when the activity is submitted for completion. This needs to be done in case, in the meantime, another user changes the value of any of the attributes on which a rule is based.

Execution Order: The order in which business rules are executed is determined by Visual Enterprise based on the dependencies of each business rule. For a business rule to be processed correctly it is important to execute that rule only after executing all rules on which the rule is dependent. For example, a package may contain four attributes: A, B, C and D (where A, B and C are display only) with the following associated business rules:

A=B+C+D
B=D*4
C=D/2

Visual Enterprise would set the order of execution as follows:

1. B=D*4
2. C=D/2
3. A=B+C+D

Following execution of any part of a business rule that assigns an attribute's value, further execution of the rule is suspended to allow for the execution of any business rule that is dependent on the attribute being assigned. Any such business rule may itself be suspended for the same reason. Once the business rules of the dependent attributes have been executed, execution of the original business rule is resumed. There is no limit on the number of rules that can be suspended at any one time.

This approach could lead to a cyclical reference scenario whereby execution might never end. To prevent this, a business rule that is currently suspended will not be allowed to execute a second time. The following example is based on an "Invoice Number" attribute which contains a cyclical reference but is nonetheless a valid business rule:

If the Invoice does not have a Invoice Number then
   Assign the Invoice Number=the Next Invoice Number
   Assign the Next Invoice Number=the Next Invoice Number+1 otherwise
   Verify the Invoice Number is less than 1000

The exemplar business rule above is dependent upon both the "Invoice Number" and "Next Invoice Number" attributes. During execution of this business rule, after each assignment statement, execution would be suspended in order to execute any dependent business rules. As a dependent of itself this business rule would-not be re-executed even though in this particular case it would not result in an endless loop. However if the rule were rewritten as follows, re-execution would result in such a loop:

If the Invoice does not have a Invoice Number then
   Assign the Next Invoice Number=the Next Invoice Number+1
   Assign the Invoice Number=the Next Invoice Number otherwise
   Verify the Invoice Number is less than 1000

Given that either of the two variants will not be re-executed, the rule would still need to be rewritten if it were to serve the purpose of always verifying an invoice number was less than 1000. Splitting the business rule into two rules as follows would achieve the correct result:

Verify the Invoice Number is less than 1000
If the Invoice does not have a Invoice Number then
   Assign the Invoice Number=the Next Invoice Number
   Assign the Next Invoice Number=the Next Invoice Number+1

In this case during execution of the latter rule, after the first assignment statement, execution of the rule would be suspended and the verification rule would be executed as a dependent. Were it to fail, all business rules and transactions would be rolled back.

Where a business rule contains conditional logic, Visual Enterprise will not pre-evaluate the condition in order to determine the correct execution order for business rules. This is because the evaluated results of conditions may change as each rule is executed. Even though in certain circumstances the results may be consistent, Visual Enterprise will not endeavor to detect these circumstances. This may mean Visual Enterprise is unable to determine the correct execution order. In these cases the business process engineer will be given a warning and may elect to rewrite the rules in question in order to remove any ambiguities.

Visual Enterprise business rules are based on a purpose-designed grammar. The grammar defines the structure and meaning of the rule that can be defined. The full grammar is outlined in an appendix to this document The grammar also contains a sub-grammar based on a standard algebraic and mathematical grammar.

From the grammar, Visual Enterprise is able to determine a list of valid options from which an engineer can choose at each point through the process of defining a rule. Should the grammar change in any way at some time in the future, Visual Enterprise will automatically reconfigure the list of valid options based on the new grammar. Associated with the grammar is a corresponding JavaScript Translation grammar. This grammar defines the valid JavaScript syntax required to translate a business rule into JavaScript just in time for execution.

Enterprise Interpreter: The Enterprise Interpreter is the engine that drives the execution of the processes, activities, attributes and rules of a Visual Enterprise application. It can respond to actions taken by a user, such as submitting an activity for completion, initiating a scheduled activity at the required time, or responding to a request from an external process.

The Enterprise Interpreter is a multi-treaded environment meaning that it can handle requests or tasks from multiple users and other sources at the same time. Once it has serviced a request, it will send a response back to the client, including an indication of whether the request was serviced successfully or not Player Activity Page: A number of the requests to the Enterprise Interpreter are initiated from the Player activity page. The major requests from this page include:

Initiate a new process.
Open an existing activity from the Intray.
Submit an activity.
Cancel an activity.

When a new process is initiated, the Enterprise Interpreter creates a new process instance, against which is collected a number of related properties, such as the date and time the process was initiated, and the user who initiated the process. Each process instance may progress through different stages:

Initiated—a process may be initiated either by a user or by an event
Completed—a process is deemed to have completed when the last of its activities has been completed.

Exception—an exception is deemed to have occurred in a process when an exception occurs on one of its activities and that exception prevents the process from completing.

Cancelled—a process can be cancelled by an administrator.

At each stage additional properties are collected similar to those mentioned above. The Enterprise Interpreter also maintains data on each of the activities that are a part of the process, including the application data (attributes) collected by those activities.

The first activity in the process is also initiated at this time. If it is a user input activity then the activity is opened and displayed to the user.

Open an Existing Activity: When the user opens an activity the Enterprise Interpreter retrieves a number of different types of data in order to display the activity to the user. The Enterprise Interpreter may also record a number of properties relevant to the activity and the stage to which the activity has progressed. An activity can progress through the following stages:

Initiated—this stage occurs either when a new process is initiated or when a previous activity in the process is completed.

Allocated—this stage represents the allocation of the activity to a group of users, which may occur as soon as the activity is initiated. If the activity is scheduled then this stage will not occur until the scheduled date and time.

Assigned—this stage occurs when the activity has been assigned to a single user. If the assignment properties of an activity identify a single user then the activity is assigned as soon as it is allocated. If, on the other hand, the properties identify a number of possible users then the activity is assigned when the first of those users opens the activity.

Started—this stage indicates that the activity has been opened by a user or that an automated activity has commenced processing.

Incomplete—an activity can be saved by a user whilst incomplete if he does not have sufficient information or time to submit the activity.

On Hold—a user can place an activity on hold if the information required to complete an activity will not be available for some time.

Completed—this stage occurs when a user successfully completes an activity or, in the case of an automated activity, when the activity has finished processing.

Exception—this stage is reached if an exception occurs which prevents the activity from being completed. This may be because the user has not completed the activity by a completion deadline.

At each of these stages, properties relevant to the stage are recorded in the database. These properties are similar to those recorded for the different stages of a process and together they present a workflow history of the process.

The information or data that the Enterprise Interpreter needs to retrieve when an activity is opened includes:

The list of package, attributes and associated properties included in the activity definition.

Details of all of the business rules that apply to the activity.

The application data that has already been recorded in previous activities.

This information is used to build the activity page that will be displayed to the user. It will also be used to validate data recorded by the user and perform any calculations thereon.

When the user submits an activity all of the data entered by the user is passed to the Enterprise Interpreter. It is the role of the Enterprise Interpreter to process each of the business rules associated with the activity, and if there are no errors, to submit the data to the database. Once this has been done, the activity is progressed to the completed stage. The Enterprise Interpreter also determines whether there are any activities that should follow and if so it initiates those activities. If any of those activities is allocated to the user submitting the former activity then the Enterprise Interpreter will automatically open that activity for the user. This allows a seamless workflow whereby the user is not required to always return to the Intray in order to open the next activity in the process. If the user is not ready to complete the new activity then it can be cancelled or saved incomplete.

Cancel an Activity: To cancel an activity means that the completion of the activity is temporarily cancelled, not permanently. The activity can only be permanently cancelled by canceling the entire process. To do otherwise would contravene the workflow requirements designed by the business process engineer. When an activity is cancelled, it remains in the user's Intray and must be completed at a later time. Any data entered by the user since the activity was opened will be discarded and no business rules will be executed. The Enterprise Interpreter may not be required to perform any processing when an activity is cancelled.

Enterprise Interpreter Engine: The first task to be completed by the Enterprise Interpreter for any request is to verify the authenticity of the request The data sent to the Enterprise Interpreter with any request must include the organization, user and session keys. The Enterprise Interpreter sends these keys to the client browser or remote device when the user logs into Visual Enterprise. The organization and user keys are hidden keys allocated by Visual Enterprise when the organization is registered and the user granted access. They are never communicated to users or engineers. A new session key is allocated by Visual Enterprise each time a user logs in. Likewise, this is a hidden key not communicated to users or engineers. Further, the session key is allocated using a one-way encryption algorithm, such that it cannot be "guessed" by someone trying to gain unauthorized access to an organization's processes or data Mode of Operation: The general operation followed by the Enterprise Interpreter when a user logs into Visual Enterprise to open and complete an activity is described in the steps below. Note that various exceptions and options will cause deviations to these general steps.

1. The user logs into Visual Enterprise and a session key is returned to the browser or remote device. It is stored as a hidden object not visible or accessible to the user. The login request is made to the server via ASP pages and the Execution Mode Process Server. The session key is used in all future communications with the Enterprise Interpreter. The reader may assume that the session key will be checked using the Security Processor for all communications, although this will not be described in the following steps to avoid complicating the discussion. Similarly, references to the ASP pages and the Execution Mode Process Server will be restricted to points where these add significant functionality; generally all traffic flows through these components and this can be assumed.

2. The Intray page is displayed upon receipt of a successful login. The Intray page on the client requests all active activities allocated to the current user. The Activity Sequencer handles all requests for details of activities and processes to which the user has been granted access. The list of processes is displayed when the user chooses the New Process option. To reduce download times, new processes are grouped under categories and only the processes of selected categories are displayed.
3. From the Intray the user may select a new activity, a previously opened activity, or an activity placed on-hold. The request for an activity is passed to the Execution Mode Process Server, which will coordinate other components as follows:
   If the request is for a new process then control is passed to the Activity Sequencer to create a new Process Instance. The first activity of the new process is identified at which point processing continues along common lines for both new and existing activities.
   Control is passed to the Activity Sequencer to retrieve various details and properties of the activity including the attribute names, default values, the screen controls to be used, and the order in which the attributes are to be displayed. The Activity Sequence may also be required to progress the activity to the Started stage if it is not already. This will prevent other users from being assigned to the same activity.
   The Data Coordinator is the next component to get control. This component retrieves any data that is to be included in the activity and that has been recorded earlier in the process.
   Control then passes to the Rules Processor to process any pre-activity rules. Such rules may pre-populate attribute values with a default value, such as today's date. The Rules Processor also builds, for return to the client browser or remote device, the JavaScript translations of any mid-activity business rules identified as being able to be processed on the client.
   Finally, control passes to the Response Coordinator to build the HTML and JavaScript page definition, which will allow the user to complete the activity.
4. As the user records values for each of the attributes on the page a number of mid-activity business rules may need to be processed. There are three distinct types of rules that can be triggered during the completion of an activity prior to the activity being submitted:
   A rule that retrieves data from the database for the purpose of providing the user with a list of options; typically be triggered by the user clicking a "Find Button" or expanding a drop-down list A request is made to the Enterprise Interpreter to process these rules.
   A rule that involves only data already available on the page. Entering or modifying the value of an attribute on which the rule is dependant would trigger this. Such rules can be processed within the client browser or remote device so no request is made to the Enterprise Interpreter.
   A rule that references data not available on the page. Again, entering or modifying the value of an attribute would trigger this type of rule. A request is made to the Enterprise Interpreter to process these rules.
No data is added to or modified in the database during this processing. Only the values of attributes on the page are updated.
5. When the user presses the Submit Button, a request is sent to the Enterprise Interpreter to submit the activity. The request is passed to the Execution Mode Process Server, which will coordinate other components as follows:
   Control is passed to the Activity Sequencer to retrieve various details and properties of the activity.
   The Rules Processor is invoked to execute all of the business rules associated with the activity, including those already processed by the client.
   If no exceptions are raised then control is passed to the Data Coordinator to submit the data to the database.
   The Activity Sequencer then gets control, firstly to progress the activity to the completed stage. At this point all updates to the database are committed. The Activity sequencer then determines whether there are any subsequent activities to be initiated. If any of these activities are dependent on a condition then the Rules Processor will be invoked to test that condition.
   Finally, if one of the new activities has been allocated to the current user then the Response Coordinator is invoked to build the HTML and JavaScript page definition for the new activity.
6. The new activities that have been initiated will be visible in the Intrays of the relevant users allocated to each activity.
7. Either the next activity will be displayed or the user will be redirected to the Intray. The process can then repeat from step 3.

Active Server Pages: The Active Server Pages serve as an interface between the client browser and the Enterprise Interpreter. The ASP pages present the data that comes from the Enterprise Interpreter in a way acceptable to the client browser, including packaging data into XML fragments where required. Only minimal processing occurs in ASP pages. These pages invoke the Enterprise Interpreter components.

Response Coordinator: The role of the Response Coordinator is to format a response to requests relating to activities from the client browser or external device. The response is in the form of an XL fragment, which includes all of the relevant information requested. For example, the activity data component of such a fragment would be structured as shown in FIG. 22.

The Response Coordinator formats a number of different types of data:
   Activity Definition—including relevant activity, package and attribute properties. These properties include details about the display width of an attribute, its input and output formats, etc.
   Business Rules—JavaScript translation of all rules to be executed on the client as the user enters data, as well as references to all rules that must be executed on the server.
   Activity Data—as shown above.
   Validation Errors—details of any errors that may have been detected during server-side execution of business rules.

The nature of the response to the client is also dependant upon the type of request. These include request to:
   Preview an activity—only the Activity Definition needs to be included in the response.
   Open an activity—the Activity Definition, Business Rules and Activity Data all need to be included in the response.
   Execute rules—the response is only in terms of a success or failure or the rule(s) with details of any errors being included.
      Submit an activity—this involves the same response as per executing rules and, depending upon workflow, it may also include that required to open a subsequent activity.

No distinction is made in the response in relation to the device from which the request originated. The format of any response is the same whether the request came from a client browser or from any form of external device, such as a handheld device.

The Rules Processor The Rules Processor controls all aspects of the determination, translation and execution of business rules. It can be called upon to perform a number of tasks:

Prepare all aspects of an activity pertaining to business rules.

Execute a rule or list of rules associated with an activity.

Execute a condition associated with a particular link between two activities in the workflow.

Execute selected rules relating to specific tasks, such as the setting of time criteria or the determination of the assignment of an activity to a user.

Execute a condition associated with a data-based event.

The preparation of an activity involves retrieving the list of rules that apply to the specified activity and determining the trigger point for each of these rules. Some may need to be triggered when an activity is loaded, others when the user changes the value of a particular attribute or when the activity is submitted Once the trigger points have been calculated, the Rules Processor makes a determination on whether each rule can be executed by the client browser or whether the nature of the rule requires execution to be performed by the server. The latter will be required whenever the rule refers to one or more attributes that are not included on the activity, and hence not available to the client.

The Rules Processor is also required to determine the correct execution order and dependency list for all rules. The algorithm used to do this involves calculating the attribute dependency list for each rule and ensuring that a rule that assigns or modifies the value of an attribute is ordered before any rule that references that attribute.

Before any rule can be executed, it must be translated to JavaScript. This translation is always performed Just-in-Time. The definition of Just-in-Time is different depending on whether the rule is to be executed on the client or on the server. For server-side execution, the rule is literally translated just in time for it to be executed. However, for client-side execution, the rule is translated to JavaScript when the request is made to open an activity. The translation is packaged up with other data by the Response Coordinator and returned to the client browser. The translation is done at this time for performance reasons, so that control does not need to be returned to the server to execute such rules. This greatly improves performance, as Visual Enterprise is able to make use of the normally under-utilized and dedicated processing power of client processors.

The final task of the Rules Processor is to execute rules. This involves calling on the JavaScript Interpreter to execute each translated rule, making available to it the value or values of any attributes the rule might reference. The Rules Processor also takes the results of the execution, whether that be successful or not, and returns them to the Enterprise Interpreter. At this point the processing will vary depending upon the nature of the request:

For a submit request, if the processing was successful then any assignments will be taken by the Data Coordinator to be stored to the database. If the execution of one or more rules resulted in an exception then the details of that exception will be taken by the Response Coordinator and returned to the client.

For a mid-activity request, all assigned values will be taken by the Response Coordinator and returned to the client Details of any exceptions will similarly be dealt with.

For the execution of a specific condition or rule, the results are returned to the Enterprise Interpreter to control the processing of workflow or other processing.

Activity-Sequencer. The Activity Sequencer performs several functions related to activities. Where a response is required, the data will be packaged in an XML fragment. Functions performed by the Activity Sequencer include:

Retrieve a list of activities to be included in the user's Intray.

Retrieve a list of process categories to which a user has access.

Retrieve a list of processes, for a selected category, to which a user has access.

Create a new Process Instance. A process instance is an instantiation of the process being initiated. When the Activity Sequencer creates a new instance it also identifies the first activity of that process to be initiated. Other activities in the process are not initiated until all preceding activities have been completed. Depending on the flow of the process, or if the process is cancelled, some activities may never be initiated for a particular process instance.

Allocate an activity to a user or groups of users who have been granted access.

Assign an activity to a user. This assignment is based on options specified by the business process engineer. One of those options is to assign the activity to the first user who opens it Mark an activity as completed.

If there are events dependant upon the initiation or completion of an activity then the Activity Sequencer will invoke the Event Scheduler to initiate those events. Such events include:

A start deadline for an activity—the Activity Sequencer requests that such events are cancelled when the activity has been started before the deadline.

A completion deadline for an activity—the Activity Sequencer requests that such events are cancelled when the activity has been completed before the deadline.

A scheduled time for the activity to start

Other events, which are relative to the initiation or completion of an activity.

Data Coordinator: The role of the Data Coordinator is to retrieve, add, modify or delete application data It can be called upon to perform a number of specific tasks:

Retrieve all of the data associated with a particular activity instance. This includes retrieving data submitted by prior activities of the process as well as retrieving the default values of any attributes not yet recorded.

Retrieve specific data associated with the instances of a particular package. For example, retrieve a list of customers, including the customer name, date of birth, social security number, etc.

Retrieve data associated with a specific instance of a particular package.

Add data associated with a new instance of a particular package to the database.

Update data associated with an existing instance of a particular package in the database.

Remove data associated with an existing instance of a particular package in the database.

Retrieve data linked to an existing instance of a particular package from the database. For example, retrieve the pricing history of a particular product.

The Data Coordinator must deal with differing versions of data It must cater for the fact that the value of an attribute requested by an activity may not exist This may be because the attribute itself did not exist when the data associated with the selected package instance was first added. For example, a customer may not originally have defined a phone number attribute. Details of any customers added to the database at the time will therefore not have a phone number, even though subsequently a phone number attribute is added to the package. Depending upon the options selected by the business process engineer, if no phone number exists the user may either be required to enter one before being able to submit changes to the customer details or may be able to continue without one.

Event Scheduler: The Event Scheduler accepts requests to initiate time-based events and to cancel time-based events. The scheduler will place all events into an event queue in sorted date/time order. Details recorded in the event queue include:

The type of event
The date and time the event will occur.
The action to be performed when the event does occur.

The Activity Sequencer and the Services Queue are the primary sources of events.

Enterprise Monitor: Users can initiate processes and activities via the Intray or New Process options. Processes and activities may also be initiated as a result of time-based and data-based events. These events include:

A scheduled time has been reached
A signal from an external source that Visual Enterprise is monitoring is detected
Data meets a pre-defined rule.

The Enterprise Monitor is used to initiate processes or activities based on events rather than user control. Examples include end of month processing and workflow exception handling when activities are not completed within a specified time.

The Enterprise Monitor continually scans the Event Queue waiting for the specified date and time to arrive. Data-based events are added to the queue with the current date and time to ensure they are processed immediately. The queue contains details of the action to be taken when the event occurs. Possible actions include:

Initiate a process
Initiate an activity
Raise an exception on an activity
Initiate a service, such as printing a report The Enterprise Monitor is also responsible for detecting data-based events. A databased event is one that occurs when a condition based on one or more items of data is met. For example, "Initiate the Stock Ordering process when the Stock Quantity drops below a pre-defined threshold". Continually testing these conditions would be an intensive operation. Visual Enterprise will only test these conditions whenever any attribute referenced in the condition has been modified. Once the condition is met the event will be added to the Event Queue and handled by the Enterprise Monitor as outlined above. Some activities will submit operations to the Services Queue, such as printing, waiting for remote events or file operations. These activities may require a confirmation before starting the next activity. Once the Enterprise Monitor receives this confirmation it will initiate the next activity via the Execution Mode Process Server.

Services Queue: Visual Enterprise has a transaction server at its core that receives requests to perform operations. The transaction must ensure the consistency of the underlying data and hence cannot allow multiple accesses to the same data while an update is occurring. To keep data consistent, it is necessary to guarantee that only one activity updates any given piece of information. To reduce the chance of a conflict, a transaction must occur in the smallest possible time.

To avoid any long operation from tying up the transaction engine, operations such as loading-remote data, sending emails, and printing are performed outside the main transaction. These are submitted to the Services Queue. If an activity relies on the outcome of the Services Queue operation then the Enterprise Monitor will be notified of the outcome and the process can be progressed accordingly.

Security: Visual Enterprise deals with a variety of different types and models of security. Each one is designed to handle a specific purpose. For example, user authentication is used to ensure that only valid users can log into the site, session authentication is used to prevent unauthorized users gaining access to the site via means commonly referred to as "hacking", while the secure sockets layer is used to protect the privacy of an organization data as it is transported across the internet between a user and the Visual Enterprise server.

Registration: The registration process is designed to allow an organization to grant access to authorized business process engineers and users. It generates an Organization ID, which is one of the three pieces of information required by a user or engineer to gain access to the site. As well as incorporating the first five characters of the organization name, it includes a component that is randomly generated to greatly reduce the risk of an unauthorized user being able to guess the ID.

A registered organization may optionally also allocated a unique key, not communicated with engineers or users, which is used as part-of the session authentication process. As part of the registration process, access may be ted to the administrator (who has registered the organization) to enable him to grant access to engineers and users.

The registration process may also prevent or impede an individual or organization from "squatting" on the name of another organization. It does so by allowing any number of organizations to be registered with the same name. Only the unique Organization ID, and not the Organization Name, is used when gaining access to Visual Enterprise, or when undertaking business-to-business or business-to-customer transactions.

User Authorization: User (and Engineer) authentication revolves around the three authenticators: Organization ID, login name and password. The Organization ID is explained in the section above on registration. If an organization would like to allow users to log into the Player without having to specify the Organization ID, then an administrator can set up a secure web site that allows this to happen. The organization can place its own security measures on that site (on the organization's own server) to prevent unauthorized access. That site would require the user to supply the login name and password and then transmit those details, along with the Organization ID (built into the page) to the Visual Enterprise site.

Only those engineers authorized by the organization can grant access to new engineers and users. When such access is granted the engineer determines the login name, thus ensuring it conforms to a company standard. Only the same authorized engineers can change this name.

Visual Enterprise generates the initial password for all engineers and users when access is granted to an engineer or user. At this time, the three pieces of information, Organization ID, login name and password are communicated to the engineer or user via e-mail. As soon as the engineer or user logs into the site he or she is required to change the password to one of his or her choosing. The password may be randomly generated to reduce the risks associated with an administrator allocating a password that is commonly known across the organization. The use of e-mail to transport this information is an efficient method that reduces the risk of the details being written on paper when communicated via the telephone.

Session Authentication: Every time the engineer or user chooses an option, or enters data that requires the client browser to communicate with the Composer Server or Enterprise Interpreter, Visual Enterprise optionally verifies that the session is authentic. Visual Enterprise does so by checking three pieces of information against session information stored on the server.

Firstly, Visual Enterprise verifies that the organization key, allocated when an organization is registered and stored in the client browser when the user logs into the site, matches that stored on the server. This key is never communicated to a user or engineer and could not accurately be guessed.

Secondly, Visual Enterprise verifies that the user key, allocated when the user is granted access: to Visual Enterprise and stored in the client browser when the user logs into the site, matches that stored on the server. This key is never communicated to a user or engineer and could not accurately be guessed.

Finally, Visual Enterprise verifies that the session key, allocated when the user logs into the site and stored in the client browser, matches that stored on the server. This key is never communicated to a user or engineer and is constructed using a non-reversible encryption algorithm. Every time the user logs into the site a new session key is generated.

These three checks provide a triple level of session authentication.

Secure Sockets Layer: Visual Enterprise implements the Secure Sockets Layer (SSL) version 3.0 protocol, a security protocol that provides communications privacy over the Internet The protocol allows client/server applications to communicate in a way that is designed to prevent eavesdropping, tampering, or message forgery and uses digital certificates for authentication.

The primary goal of the SSL Protocol is to provide privacy and reliability between two communicating applications. The protocol is composed of two layers. At the lowest level, layered on top of a reliable transport protocol (e.g., TCP), is the SSL Record Protocol. The SSL Record Protocol is used for encapsulation of various higher-level protocols. One such encapsulated protocol, the SSL Handshake Protocol, allows the server and client to authenticate each other and to negotiate an encryption algorithm and cryptographic keys before the application protocol transmits or receives its first byte of data. One advantage of SSL is that it is application protocol independent. A higher-level protocol can layer on top of the SSL Protocol transparently. The SSL protocol provides connection security that has three basic properties:

- The connection is private. Encryption is used after an initial handshake to define a secret key. Symmetric cryptography is used for data encryption (e.g., DES, RC4, etc.)
- The peer's identity can be authenticated using asymmetric, or public key, cryptography (e.g., RSA, DSS, etc.).
- The connection is reliable. Message transport includes a message integrity check using a keyed MAC (Medium Access Control). Secure hash functions (e.g., SHA, MD5, etc.) are used for MAC computations.

The goals of SSL Protocol v3.0, in order of their priority, are:

A. Cryptographic security—SSL is used to establish a secure connection between two parties.
B. Interoperability—Allows programmers to be able to develop applications utilizing SSL 3.0 that will then be able to successfully exchange cryptographic parameters without knowledge of one another's code.
C. Extensibility—SSL seeks to provide a framework into which new public key and bulk encryption methods can be incorporated as necessary. This will also accomplish two sub-goals: to prevent the need to create a new protocol (and risking the introduction of possible new weaknesses) and to avoid the need to implement an entire new security library.
D. Relative efficiency—Cryptographic operations tend to be highly CPU intensive, particularly public key operations. For this reason, the SSL protocol has incorporated an optional session caching scheme to reduce the number of connections that need to be established from scratch. Additionally, care has been taken to reduce network activity.

Digital Certificates: Digital Certificates are based on public/private key technology (PKI). Each key is like a unique encryption device. No two keys are ever identical, which is why a key can be used to identify its owner.

Keys always work in pairs, one called the private key, and the other called the public key. What a public key encrypts, only the corresponding private key can decrypt, and vice versa. Public keys are distributed freely to anyone who wants to exchange secure information with you. Your private key is never copied or distributed and remains secure on your computer or server.

Digital certificates automate the process of distributing public keys and exchanging secure information. When you install a digital certificate on your computer or server, your computer or web site now has its own private key. Its matching public key is freely available as part of your digital certificate posted on your computer or web site. When another computer wants to exchange information with your computer, it accesses your digital certificate, which contains your public key. The other computer uses your public key to validate your identity and to encrypt the information it wants to share with you using SSL technology. Only your private key can decrypt this information, so it remains secure from interception or tampering while traveling across the Internet.

Database Security: Access to the Visual Enterprise database is restricted to only two sources. That is:

- Access to engineers and users through the Visual Enterprise Composer and Player environments.
- Access to the database administrators who installed and maintain the Visual Enterprise database.

The database administrator configures the account names and passwords when the database and Visual Enterprise are installed on the database and web application servers. They are not stored anywhere in the Visual Enterprise source code or in any other file controlled by Visual Enterprise. Standard network and firewall security can prevent access to the server by unauthorized persons.

Process Security: The business process engineers granted access by an organization to Visual Enterprise have complete control of the users who are granted access to each process. Users will not even be aware of the existence of processes to which they have not been granted access. For more information on Process Security, refer to the sections above in this VE blueprint section on Users, Groups, Processes, Process Views and Activities.

Attribute Security: Visual Enterprise gives the ability to a business process engineer to set attribute level security in one of two ways:

- A process view can be defined, which restricts access to particular attributes to specified users or groups. For more information, refer to the section earlier in this VE blueprint section on Process Views.
- A business rule can be defined which changes access to an attribute based on the current user or group to which he or she belongs. For more information, refer to the section earlier in this VE blueprint section on Business Rules.

From the outset, Visual Enterprise has been architectured with a classic N-tier component model in mind. The practical consequences of this approach are that two technologies are well suited for implementing the components that together comprise Visual Enterprise:

Microsoft's Distributed Network Architecture (Windows DNA)

Sun's J2EE specification and associated component models.

The first production version of Visual Enterprise has been implemented using Windows DNA, with a J2EE version to follow. More recently, focus has shifted from Microsoft's DNA to Microsoft's .NET strategy. It is intended that Visual Enterprise will follow this trend with the Microsoft DNA version being replaced with a Microsoft .NET version in the future.

The Microsoft DNA is straightforward in its approach to designing and constructing solutions. In reference to the Figures and particularly to FIG. 23, certain preferred-alternate preferred embodiments of the method of the present invention can and should be partitioned into the following areas, to obtain an optimum design in terms of ease of maintenance and scalability.

The specifics of how Visual Enterprise is implemented within .NET are contained in the following sections:

Presentation Services;
Business Logic; and
Data Services.

Presentation Services include all areas of a solution that provide a user interface. Microsoft's suggested approach is that in new solutions, all presentation services should be web based. Business Logic encompasses all areas of a solution that implement logic or rules specific to the solution. Microsoft recommends that business logic should be implemented using a reusable, stateless component technology, such as COM+. Data services include all areas of a solution that store or provide data. This includes database, email and directory servers.

Figure 24:
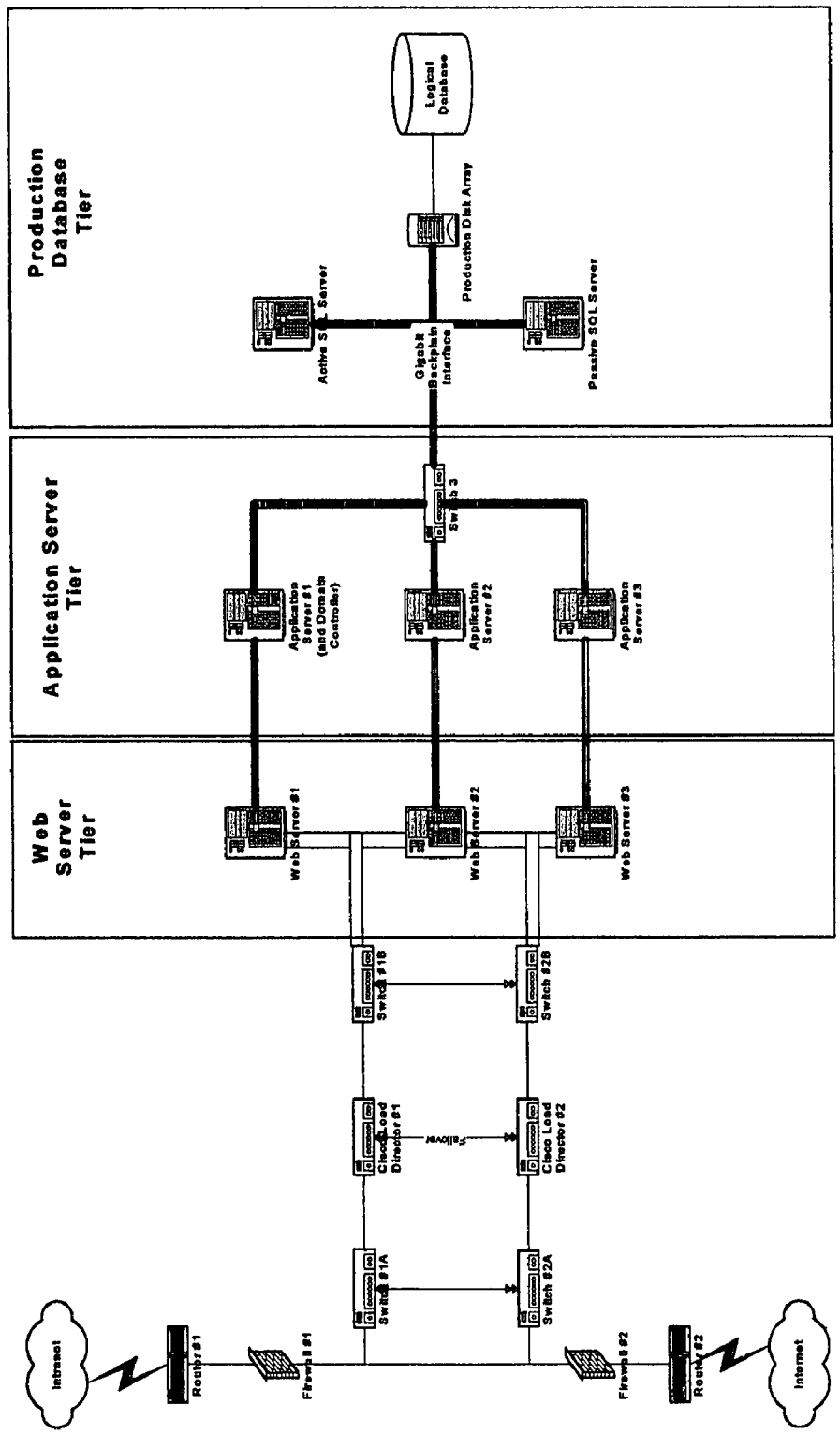
FIG. 24 is an implementation of another alternate preferred embodiment of the method of the present invention in a networked computing environment.

In reference to the Figures and particularly to FIG. 23, a first implementation of Visual Enterprise, as diagrammed in FIG. 24, has closely adhered to the DNA strategy. This is apparent in the high-level system architecture diagram of FIG. 24.

Client Requirements: Two distinct classes of user exist within the Visual Enterprise environment: Engineers and Users. As detailed earlier, engineers use the Composer interface for designing solutions, and users use the Player interface to run existing solutions. By design, all a user requires to utilize Visual Enterprise is a reasonably optioned IBM PC with Microsoft Internet Explorer (version 5.5 or above). Engineers have the additional requirement of needing to accept a one-time download of several ActiveX controls, used in the composer user interfaces.

A Visual Enterprise client application exists wholly within Microsoft Internet Explorer, making use of the following technologies to produce user interfaces and interact with the presentation services:

Hypertext Markup Language (HIM)

All web pages are rendered using standard HTML.

Dynamic Hypertext Markup Language (DHTML)

Significant use is made of the dynamic behavior of HTML to provide flexible user interfaces. The intention has been to use DHTML to build user interfaces similar to what can be achieved with client-server techniques.

ActiveX Controls

The Composer interface makes use of a number of ActiveX controls (e.g. tree control, flowchart control) to give a more flexible user interface The Player makes use of the Microsoft XML Parser control, which is made available though the Microsoft Internet Explorer installation.

JavaScript

JavaScript is the main procedural language for utilizing both DHTML and the ActiveX controls. Also, all client side logic is implemented using pure JavaScript Extended Markup Language (XML)

XML is used on the client for two purposes: for temporary storage of structure data, and for communication between the client and presentation services. Visual Enterprise has a large number of internal schemas designed for these purposes. The use of these schemas allows Visual Enterprise to manifest user interfaces more akin to a client-server implementation without the client installation overhead.

Presentation Services: The Presentation Services consist of several hundred Active Server Pages (ASPs) running under Microsoft Internet Information Server (version 5 or above). These pages respond to requests from the client and determine the HTML, client side JavaScript and/or XML required to answer the request. The following technologies are used by the presentation services:

JavaSctipt

JavaScript is the main procedural language for utilizing both custom COM+ components and the ActiveX controls. All presentation services logic is implemented using pure JavaScript ActiveX Controls The presentation services make use of server-side ActiveX controls to perform operations not specifically available through the ASP interface or JavaScript (e.g. a control is used to extract documents from multi-part HTML requests). The Presentation Services also make use of the Microsoft XML Parser control, which is made available though the Microsoft Internet Explorer installation.

COM+ Components

The Presentation Services access the required business logic via public COM+ interfaces, exposed by the business logic layer.

Extended Style Sheet Language Transformation (XSLT)

XSLT is used to transform internal player XML screen definitions to the required HTML and client-side JavaScript. The Presentation Services contain master XSLT style sheets used to produce all Player user interfaces. Currently these style sheets are fixed, but is intended that future Visual Enterprise releases will allow these style sheets to be engineer or even user defined.

Business Logic: The Business Logic consists of fifty custom-written COM+ components and one custom-written service. These components encapsulate all the business logic implemented in the Visual Enterprise application. Microsoft Visual C++ (version 6) has been the language of choice to implement these components. Due to the nature of Visual Enterprise, the components are the result of hundreds of thousands of lines of very complex source code.

The Business Logic implements a database independent layer that allows Visual Enterprise to be deployed on either Microsoft SQL Server 2000 or Oracle 8i Release 2. The database independence is achieved by abstracting all database operations required by Visual Enterprise to a single COM+ interface, with the given COM+ component having the knowledge of how to interact with the target database.

Integration with third-party systems is achieved through the business logic layer. This is achieved using web services constructed using Microsoft C# and the Microsoft NET framework. The traditional COM+ components interact with web services using standard SOAP techniques.

The business logic makes use of one or more of the following technologies:

Common Object Model (COM)

The Common Object Model is a technology developed by Microsoft for building components that expose interfaces that can be accessed in a language-independent way. For example, a COM component can be accessed from Visual C++ and Visual Basic.

Common Object Model + (COM+)

COM+ is an environment for hosting COM components. COM+ provides enterprise services to COM components (i.e. transactions, queuing, object pooling, connection pooling, publisher/subscriber event model) via components implementing standard COM interfaces. All Visual Enterprise business logic components make use of these services.

ActiveX Data Objects (ADO)

ActiveX Data Objects are a Microsoft technology that present a universal way to access data sources of any type. Visual Enterprise uses ADO to access the underlying Oracle or SQL Server database.

Microsoft Message Queue (MSMQ)

Microsoft Message Queue allows transactions to be queued and processed in the background. COM+ allows components to be marked as queued, and therefore all requests on the given component are handled asynchronously. Visual Enterprise makes use of these features for all background processes, including report production, automated activities, and event handling.

Collaborative Data Objects (CDO)

Collaborate Data Objects are a Microsoft technology for accessing SMTP (email) servers on the local network. Visual Enterprise uses this technology for dispatching emails.

Microsoft Scripting Engine (JavaScript)

The ability to execute JavaScript in Microsoft Internet Explorer is achieved through an ActiveX component called the Microsoft Scripting Engine. Any application that wishes to execute script can implement what is called a Scripting Host and invoke the Microsoft Scripting Engine. Visual Enterprise uses this technique to execute engineer defined business rules, which have been previously translated to JavaScript.

Extended Markup Language (XML)

The business rules layer uses XML to communicate structured data with the presentation service or with external systems via SOAP. XML is not used internally in the business logic layer, as small COM objects have proved more efficient for internal data communications.

Simple Object Access Protocol (SOAP)

Simple Object Access Protocol is an evolving technology, based on XML, which allows services to be accessed over the Internet Visual Enterprise uses this technology to integrate with third party database and systems through the use of web services.

Universal Description, Discovery and Integration (UDDI)

Universal Description, Discovery and Integration is an evolving technology for categorizing web services available over the Internet Visual Enterprise uses this technology to allow engineers to search for required functionality (e.g. a credit card check service) and to use Visual Enterprise's SOAP capability to include the external functionality natively into Visual Enterprise solutions.

Crystal Report Designer Component (RDC)

Visual Enterprise embeds a set of COM components called the Report Designer Component from Crystal Decisions, which allows report templates to be dynamically constructed and executed. This technology is used in conjunction with a custom reporting user interface to allow engineers to create customized reports on data contained within Visual Enterprise.

Data Services: Due to Visual Enterprise being a stateless web-based application, all system state and application data must be stored in a database. In the case of Visual Enterprise, either a SQL Server or Oracle database is required. The database consists of approximately two hundred tables and eighteen hundred stored procedures. The tables can be grouped into three distinct data sets:

Definitions: 80% of the tables are used to store the details of Visual Enterprise solutions. Effectively, the composer interface is a data entry system to correctly fill these tables. These tables include details of organizations, applications, events, processes, activities, packages, attributes etc.

Metadata: 16% of the tables are used to store metadata. Metadata at its most simple is data that describes other data. Although abstract in nature, a concrete example of metadata would be a library catalog, which contains information about the books in the library. The contents of the books are unstructured and varied, but the catalog categorizes the details of each book in a structured manner. (The same is true of Visual Enterprise, where engineers using the Composer interface define packages of data. These packages can then be included in activities in any manner the engineer sees fit, including the creation of package relationships on the fly. Visual Enterprise creates metadata to capture the details of the mapping of high-level packages to tables in the database designed for storing unstructured data and the relationships between that unstructured data.)

Data: 4% of the tables are used to store the actual data produced by users accessing Visual Enterprise solutions through the Player interface. It should be noted that this small number of tables is likely to be the largest in terms of storage requirements.

As stated earlier, the Visual Enterprise database contains a large number of stored procedures. This allows a database to present a high-level interface to the business rules layer, and thus abstracts the need for the business rules layer to have to deal with the specifics of one database to another. This is definitely true with SQL Server and Oracle, having quite different stored procedure languages and SQL requirements.

Integration: One of the key selling points of the Visual Enterprise environment is its ability to integrate with other products. From a technical perspective, Visual Enterprise supports five integration methods:

External Components

Visual Enterprise allows standard COM components to be utilized as part of the native business rule grammar. This is achieved by registering a given COM component using the Composer interface. Visual Enterprise examines that methods implemented by the components and maps all parameters to native Visual Enterprise attribute types. The methods are then dynamically added to the business rule grammar. At business rule execution time, Visual Enterprise performs the necessary interfacing required to make remote procedure calls to the relevant external components.

Remote Data

Visual Enterprise comes standard with a custom web service that can be deployed against any data source supported by the ActiveX Data Objects (ADO), which includes any data source that has an ODBC driver. Through Visual Enterprise accessing the web service, engineers are able to define "remote packages" based on tables in data sources supported by the web service. Such "remote packages" are treated as if they were native data of the given Visual Enterprise solution. The business rules layer performs all the necessary mechanics to update the data source taking into account the data source's referential integrity.

XML Messages

Visual Enterprise allows custom XML messages to be exchanged with external systems via the Internet. An engineer can construct definitions (i.e. using the XML Mapper interface) that describe how to interpret incoming XML messages and convert them to native Visual Enterprise packages and attributes, and vice versa Again, from the engineer's perspective the XML is treated as if it were native Visual Enterprise data, with the business rules layer performing all the mechanics necessary to convert between the defined XML schema and Visual Enterprise packages and attributes.

SOAP Messages

Visual Enterprise supports both the construction of external SOAP requests and the ability to respond to external systems making SOAP requests on Visual Enterprise. At its simplest, SOAP identifies a request XML message schema, a response XML message schema, and the mechanism for the communication of these schemas. Using the previously described XML mapping interfaces, engineers define the structure of both incoming and outgoing SOAP requests and treat the schemas involved in these requests as if they were native Visual Enterprise packages and attributes. Again, the business rules layer performs all the mechanics necessary to construct, interpret and dispatch SOAP requests.

Web Services

Visual Enterprise supports both the consumption of external web services and exposing Visual Enterprise processes as web services. The consumption of an external web service is essentially the same as making a SOAP request. The only difference is that an engineer can use the composer to search a UDDI registry to find the required web service. Visual Enterprise exposes two methods for consuming web services. Firstly, web services can be registered with Visual Enterprise in a similar manner to external components and thus used to extend the native rule grammar. Secondly, a web service can be used as part of a Visual Enterprise process. The second method has the advantage of supporting document based web services, whereas the first method only supports remote procedure call based web services (i.e. similar to making a call on a remote component, but in this case using SOAP as the mechanism instead of Distributed COM). Again, the business rules layer performs all of the mechanics necessary to construct, interpret and dispatch web service requests, including the capability for synchronous and asynchronous processing.

Processes defined through the Composer interface can be exposed as either a remote procedure call or document based web service. This is achieved by Visual Enterprise exposing a custom end-point to allow external systems to communicate back to the given process. From the engineer's perspective, incoming requests appear as native Visual Enterprise packages and attributes, which can be manipulated using all the power of the Visual Enterprise engine. The business rules layer performs all the necessary mechanics to receive, interpret, validate, construct and dispatch web service requests.

Scalability: The N-tier nature of the Visual Enterprise implementation allows for both horizontal and vertical scalability to be used to meet specific performance requirements. The following points detail how each of the layers can be scaled for increased performance.

Presentation Services

The Presentation Services layer consists of Microsoft Internet Information Server web servers. Given Visual Enterprise is stateless in nature, it is possible (and advisable) to configure an array of web servers where client requests are dispatched to the web servers in a "round-robin" or "least-workload" manner. The number of web servers in the array is only limited by the network infrastructure used to create the array. As demand increases, web servers can be added to the array at will.

The maximum throughput for each web server in the array can be achieved by correctly configuring such servers in terms of CPU bandwidth and memory. The more memory available, the more likely the web server will cache Active Server Pages in memory. It should be noted that the responses from Visual Enterprise Active Server Pages are highly dynamic in nature, and are not suited to traditional HTTP caching techniques. In fact such caching techniques can interfere with the correct operation of the Presentation Services and are usually disabled by default.

Business Logic

The business logic layer consists of application servers, which in practice consist of Windows 2000 Advanced Server configured with the custom components discussed above. Two options exist for configuring application servers: each web server can be statically tied to one application server, or application servers can be configured in an array, where requests from the web servers are routed in a "round-robin" or "least-workload" manner. As with the web servers, creating an array of application servers allows the business logic layer to be scaled as needed.

The maximum throughput for each application server in the array can be achieved by correctly configuring such servers in terms of CPU bandwidth and memory. The custom components are specifically designed to "read-only" cache static information in memory, thus reducing load on the data services layer. The trade-off for this performance enhancement is a greater need for memory. Also, the custom components perform CPU intensive operations, especially when dealing with XML documents or the Microsoft Scripting Engine. Practice has shown that an application server needs to have approximately twice the memory and CPU bandwidth to service an equivalent web server.

Data Services

The data services layer consists of either an Oracle or SQL Server database. Both Oracle and Microsoft have test cases of how their products can be scaled from the smallest enterprise installation up to the largest corporate installation. The stateless nature of Visual Enterprise has many advantages, but the trade-off is that more load is put on the database server. Although this is somewhat mitigated by caching techniques in the business logic layer, the configuration of a suitable database server needs-to take this into account.

In reference to the Figures and particularly to FIG. 24, certain preferred alternate preferred embodiments of the method of the present invention may comprise a recent Visual Enterprise installation, as diagrammed in FIG. 24, and how a modest level of scalability can be achieved.

FIG. 24 details a Visual Enterprise installation designed to handle tens of thousands of client requests. The following points detail the path a client request would follow.

Requests flow first through a firewall. Both the Internet and the organization's Intranet are firewalled for security.

Requests then flow through a set of switches in failover configuration. In this case "failover" means that if one of the switches fails the second switch will take up the load.

Requests then flow through a Cisco Load Director, which is a device designed to route HTTP requests based on a given algorithm. As mentioned above, Visual Enterprise is best suited to either a "round-robin" or "least-workload" approach. Again, the two Cisco Load Directors are deployed in failover configuration.

K Requests flow through a second set of switches. Again, the switches are deployed in failover configuration.

Based on the routing algorithm used by the Cisco Load Director, the request will be routed to one of the web servers in the array. The given web server will interpret the client requests and make one or more requests on the application server. It should be noted that this design has the application servers statically tied to a given web server. The above design could be modified to include another layer of Cisco Load Directors and switches between the web servers and application servers, thus giving. dynamic routing of application server requests.

In response to requests from the web server, the application servers will make one or more requests on the database server.

The application server will assemble the details of the response and forward the response to the given web server.

This VE blueprint section of paragraphs 00115 to 00364 of the present disclosure supports an understanding of the methods, models and structures of a preferred embodiment of the method of the present invention comprising the Visual Enterprise™ (VE) business process integration software platform. This VE blueprint summary describes, in a comprehensive fashion, the paradigm of VE and its purpose is twofold: 1) to outline how VE is architected, and 2) to establish technical credibility as to how VE's architecture is realized to employ certain alternate preferred embodiments of the method of the present invention.

VE is a single, unified modeling and execution software environment supporting all types of business transactions and processes. VE technically enables Business Process Management (BPM); the ability to discover, design, deploy, reliably execute, scale and optimize end-to-end complex business processes and transactions.

Creating adaptive models, not code, is the VE paradigm. When business processes change, multiple systems adapt according to certain alternate preferred embodiments of the method of the present invention that optionally comprise VE. VE includes a visual modeling, rules and data environment (VE Composer™) and an execution platform, which includes integration and web services (VE Player™). VE augments existing functionality, integrates with various systems, and provides for comprehensive solutions. VE makes the organization, policies, workflow, calendars and events available directly to system designers and business process experts. VE is built on open standards, such as LDAP, SOAP, SSL, XML, and WSDL/UDDI. VE operates in Microsoft's .NET environment, supports SQLServer and Oracle 9i databases and runs on IE. VE has a 'meta-data' architecture and can run through most enterprise portals and email systems.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A software method of composing, generating, integrating and executing business processes via a computer network, the method comprising:
    a. providing a plurality of software resources, the software resources being available over the computer network;
    b. providing a network browser, the network browser for accessing the software resources both at design time and at run time;
    c. providing a networked based, graphical user interface (GUI) business process model builder; the GUI business process model builder for directing the network browser to access and interweave at least two of the plurality of software resources;
    d. using the GUI business process model to generate a business process model by incorporating at least two software resources into the business process model;
    e. providing a networked based, runtime environment, the networked based, runtime environment encapsulating a process interpreter and a grammar engine allowing the business process model to be dynamically created in real-time, and the networked based, runtime environment operable to integrate data sources and processes from remote sources based on the business process model; and
    f. using the networked based, runtime environment to initiate business process activities for purposes of completing internal and external collaborative business processes and transactions;
    wherein the process interpreter and the grammar engine encapsulated within the networked based, runtime environment encapsulates software resources necessary to complete a business process;
    wherein a workflow determines the order in which business process activities are undertaken; and
    wherein business process activities forming the internal and external collaborative business processes are linked together according to the workflow.

2. The method of claim 1, wherein no programming, coding or scripting is required to create the business process model or execute the resultant software applications.

3. The method of claim 1, further comprising:
    a. a user definition GUI to define users within an organization who are authorized to view, modify, or define a plurality of data attributes, activities, transactions and events of the business process model; and
    b. an administration GUI to define security or access control of the user.

4. The method of claim 3, wherein programming is not required to modify the data attributes, the activities, the processes or the business process model.

5. The method of claim 3, wherein the data attributes include remote data attributes available in at least one external system.

6. The method of claim 3, wherein the data attributes include attribute relationship information of each of the data attributes with one or more other data attributes.

7. The method of claim 6, wherein an implicit attribute relationship is established among data attributes referenced by a common activity.

8. The method of claim 6, wherein related data attributes are grouped to form a package.

9. The method of claim 8, wherein an implicit attribute relationship is established among data attributes in the package.

10. The method of claim 9, wherein a package relationship is established between one package and at least one other package.

11. The method of claim 10, wherein the Package relationship exists among packages when these packages are referenced by a common activity.

12. The method of claim 8, wherein a set of business rules comprise attributes business rules to apply to the plurality of data attributes, activity business rules to apply to the activities, package business rules to apply to the packages, and application business rules to apply to the business process model.

13. The method of claim 12, wherein the set of business rules are defined with at least one associated exception condition.

14. The method of claim 12, wherein the set of business rules are applied at multiple stages of development of the business process model.

15. The method of claim 14, wherein business rules conflict resolution is applied to the business process model after the development of the business process is completed and prior to execution of the business process model.

16. The method of claim 3, wherein each of a plurality of activities is associated with data attributes information, activity business rules information, and link information.

17. The method of claim 16, wherein the link information provides information about preceding and succeeding activities to a current activity.

18. The method of claim 1, wherein at least one software resource is selected from the group including a database, a grammar rule, a software object, a data structure, a datum, a universal resource locator, a network address, a data type definition, and a data pointer.

19. A method, comprising:
  a. using a network browser interface to provide an application specification for an application, the application specification including data attributes, activities that reference the data attributes, processes formed using the activities, and business rules applied to the data attributes, the activities and the processes; and
  b. dynamically generating the application using the application specification without requiring programming code generation;
  c. using a networked based, runtime environment to initiate the activities for purposes of completing internal and external collaborative processes and transactions;
  wherein a process interpreter and a grammar engine encapsulated within the networked based, runtime environment encapsulates software resources necessary to complete the processes, the networked based, runtime environment allowing the application to be dynamically generated;
  wherein a workflow determines the order in which the activities are undertaken; and
  wherein the activities forming the internal and external collaborative processes and transactions are linked together according to the workflow.

20. The method of claim 19, wherein the method further comprises providing a grammar engine and using the grammar engine to structuring the logical flow of the application.

21. The method of claim 19 using the network browser interface to establish an organization identification and to provide an organization calendar associated with the organization, the organization calendar to be applied with the business rules in providing the application specification.

22. The method of claim 21, wherein an attribute dialog box is used to define details about the data attributes.

23. The method of claim 22, wherein the details about the data attributes include attributes relationship information associated with at least one other data attribute.

24. The method of claim 23, wherein at least one activity is associated with link information concerning at least one other activity.

25. The method of claim 19, wherein at least one activity is represented graphically to the user.

26. The method of claim 19, wherein at least one activity is represented graphically as an icon.

27. The method of claim 19, wherein dragging and dropping, point and click or voice activating forms the processes the icons associated with at least one activity.

28. The method of claim 19, wherein the business rules consist of attributes business rules to apply to the data attributes, activity business rules to apply to the activities, package business rules to apply to the packages, and application business rules to apply to the application.

29. The method of claim 28, wherein the business rules are defined with at least one associated exception condition.

30. The method of claim 29, wherein at least one business rule is applied while providing the application specification.

31. The method of claim 30, wherein ambiguous rules are resolved after the application specification is completed.

32. A computer-readable medium storing a sequence of instructions thereon, the medium comprising:
  a. means for defining an organization calendar for an organization, the organization calendar including time zones, working hours, holidays, and events applicable to the organization;
  b. means for defining business rules and processes followed by the organization and consistent with the organization calendar;
  c. means for defining a data attribute library used by the organization;
  d. means for defining activities performed for the organization using data attributes in the data attribute library, the activities constrained by the business rules and represented graphically as activity icons; and
  e. means for using a networked based, runtime environment to initiate the activities for purposes of completing internal and external collaborative processes and transactions;
  wherein a process interpreter and a grammar engine encapsulated within the networked based, runtime environment encapsulates software resources necessary to complete the processes;
  wherein a workflow determines the order in which the defined activities are undertaken; and
  wherein the activities forming the internal and external collaborative processes and transactions are linked together according to the workflow.

33. A method of integrating a first business process software program with a second business process software program, the first business process software program and the second business process software program communicating via a computer network, the method comprising:
- a. interrogating the second business process software program via the computer network to determine how a message containing data may be structured in order to enable the second business process software program to accept the data;
- b. detecting a set of data that the first business process software program may provide to the second business process software program;
- c. structuring a message for transmission to and acceptance by the second business process software program, the message containing the set of data;
- d. transmitting the message to the second business process software program via the computer network; and
- e. using a networked based, runtime environment to initiate activities for purposes of completing internal and external collaborative processes and transactions;

wherein a process interpreter and a grammar engine encapsulated within the networked based, runtime environment encapsulates software resources necessary to complete a process;

wherein a workflow determines the order in which the activities are undertaken; and wherein the activities forming the internal and external collaborative processes and transactions are linked together according to the workflow.

34. The method of claim 33, wherein the computer network comprises a network selected from the group including the Internet, an Extranet, or an Intranet.

35. A computer readable medium having stored thereon sequences of instructions which are executable by a system, and which, when executed by the system, cause the system to perform a method, comprising:
- a. using a network browser interface to provide an application specification for an application, the application specification including data attributes, activities that reference the data attributes processes formed using the activities, and business rules applied to the data attributes, the activities and the processes;
- b. dynamically generating the application using the application specification without requiring programming, coding or scripting; and
- c. using the networked based, runtime environment to initiate the activities for purposes of completing internal and external collaborative processes and transactions;

wherein a process interpreter and a grammar engine encapsulated within the networked based, runtime environment encapsulates software resources necessary to complete the processes;

wherein a workflow determines the order in which the activities are undertaken; and wherein the activities forming the internal and external collaborative processes and transactions are linked together according to the workflow.

36. The computer readable medium of claim 35, further comprising using the network browser interface to establish an organization identification and to provide an organization calendar associated with an organization, the organization calendar to be applied with the business rules in providing the application specification.

37. The computer readable medium of claim 35, wherein an attribute dialog box is used to define details about the data attributes.

38. The computer readable medium of claim 35, wherein at least one detail about at least one data attribute includes attributes relationship information concerning at least one other data attribute.

39. The computer readable medium of claim 35, wherein at least one activity includes link information concerning at least one other activity.

40. The computer readable medium of claim 35, wherein at least one activity is represented graphically as an icon.

41. The computer readable medium of claim 40, wherein at least one business rule comprises attributes business rules that optionally to apply to the data attributes, activity business rules to apply to the activities, package business rules to apply to the packages, and application business rules to apply to the application.

42. The computer readable medium of claim 41, wherein at least one business rule is defined with at least one associated exception condition.

43. The computer readable medium of claim 35, wherein the browser interface enables dropping and dragging of at least two icons, and dragging and dropping the icons form at least one process associated with at least one activity.

44. The computer readable medium of claim 35, wherein the business rules are applied and ambiguities resolved while providing the application specification.

45. A system comprising:
a network;
at least one remote processor in bidirectional communication with the network, each of the at least one remote processors having at least one software application residing thereon to result in at least two software applications residing on the at least one remote processors; and
a system processor in bidirectional communication with the network, the system processor capable of receiving and sending data to each of the at least one software applications residing on each of the at least one remote processors, and the system processor operable to generate an executable business process model, the executable business process model comprising at least one activity between at least two of the at least one software applications residing on the at least one remote processors;
the system processor using a networked based, runtime environment to initiate the at least one activity for purposes of completing internal and external collaborative processes and transactions;
wherein a process interpreter and a grammar engine encapsulated within the networked based, runtime environment encapsulates software resources necessary to complete a process;
wherein a workflow determines the order in which the at least one activity are undertaken; and
wherein the at least one activity forming the internal and external collaborative processes and transactions are linked together according to the workflow.

46. The system of claim 45, wherein the at least one remote processor comprises a single remote processor, and wherein the at least one software application comprises a first software application residing on the single processor and a second software application residing on the single remote processor.

47. The system of claim 45, wherein the at least one remote processor comprises a first remote processor and a second remote processor, and wherein the at least one software application comprises a first software application residing on the first remote processor and a second software application residing on the second remote processor.

48. A system comprising:

a network;

at least one remote processor in bidirectional communication with the network, each of the at least one remote processor having at least one software application residing thereon to result in at least two software applications residing on the at least one remote processors; and a system processor in bidirectional communication with the network, the system processor capable of receiving and sending data to each of the at least one software applications residing on each of the at least one remote processors, the system processor operable to generate an executable business process model, the executable business process model comprising at least one activity between at least two of the at least one software applications residing on the at least one remote processors, and the system processor further operable to execute the generated executable business process model;

the system processor using a networked based, runtime environment to initiate the at least one activity for purposes of completing internal and external collaborative processes and transactions;

wherein a process interpreter and a grammar engine encapsulated within the networked based, runtime environment encapsulates software resources necessary to complete a process;

wherein a workflow determines the order in which the at least one activity are undertaken; and wherein the at least one activity forming the internal and external collaborative processes and transactions are linked together according to the workflow.

49. The system of claim 48, wherein the at least one remote processor comprises a single remote processor, and wherein the at least one software application comprises a first software application residing on the single remote processor and a second software application residing on the single remote processor.

50. The system of claim 48, wherein the at least one remote processor comprises a first remote processor and a second remote processor, and wherein the at least one software application comprises a first software application residing on the first remote processor and a second software application residing on the second remote processor.

* * * * *